(12) United States Patent
Redeker et al.

(10) Patent No.: US 11,534,733 B2
(45) Date of Patent: Dec. 27, 2022

(54) ELECTRIC-POWERED, CLOSED-LOOP, CONTINUOUS-FEED, ENDOTHERMIC ENERGY-CONVERSION SYSTEMS AND METHODS

(71) Applicant: Montauk Renewables, Inc., Pittsburgh, PA (US)

(72) Inventors: Martin Redeker, Pittsburgh, PA (US); Joseph P. Carroll, Jr., Pittsburgh, PA (US)

(73) Assignee: Montauk Renewables, Inc., Pittsburgh, PA (US)

( * ) Notice: Subject to any disclaimer, the term of this patent is extended or adjusted under 35 U.S.C. 154(b) by 0 days.

(21) Appl. No.: 17/409,159

(22) Filed: Aug. 23, 2021

(65) Prior Publication Data

US 2021/0379551 A1 Dec. 9, 2021

Related U.S. Application Data

(63) Continuation of application No. 16/622,684, filed as application No. PCT/US2018/037445 on Jun. 14, 2018, now Pat. No. 11,097,245.

(Continued)

(51) Int. Cl.
*B01J 8/00* (2006.01)
*B01J 8/02* (2006.01)
(Continued)

(52) U.S. Cl.
CPC ......... *B01J 19/0013* (2013.01); *B01J 8/0285* (2013.01); *B01J 19/20* (2013.01); *C10J 3/723* (2013.01); *C22C 19/051* (2013.01)

(58) Field of Classification Search
CPC ..... B01J 8/00; B01J 8/02; B01J 8/0285; B01J 19/00; B01J 19/0006; B01J 19/0013;
(Continued)

(56) References Cited

U.S. PATENT DOCUMENTS

| 4,538,916 A | 9/1985 | Zimmerman |
| 5,010,808 A * | 4/1991 | Lanham ................... A21B 1/48 34/147 |

(Continued)

FOREIGN PATENT DOCUMENTS

| GB | 245869 A | 6/2009 |
| WO | 2012096900 A2 | 7/2012 |
| WO | 2017042597 A2 | 3/2017 |

OTHER PUBLICATIONS

International Search Report and Written Opinion issued in counterpart PCT Application No. PCT/US2018/037445 dated Oct. 30, 2018 (fifteen (15) pages).

*Primary Examiner* — Natasha E Young
(74) *Attorney, Agent, or Firm* — E. Eric Mills; Nexsen Pruet, PLLC

(57) ABSTRACT

Electric-powered, closed-loop, continuous-feed, endothermic energy-conversion systems and methods are disclosed. In one embodiment, the presently disclosed energy-conversion system includes a shaftless auger. In another embodiment, the presently disclosed energy-conversion system includes a drag conveyor. In yet another embodiment, the presently disclosed energy-conversion system includes a distillation and/or fractionating stage. The endothermic energy-conversion systems and methods feature mechanisms for natural resource recovery, refining, and recycling, such as secondary recovery of metals, minerals, nutrients, and/or carbon char.

10 Claims, 56 Drawing Sheets

Related U.S. Application Data

(60) Provisional application No. 62/519,213, filed on Jun. 14, 2017.

(51) Int. Cl.
  B01J 19/00 (2006.01)
  B01J 19/18 (2006.01)
  B01J 19/20 (2006.01)
  C22C 19/05 (2006.01)
  C10J 3/72 (2006.01)

(58) Field of Classification Search
  CPC .. B01J 19/18; B01J 19/20; C10B 7/00; C10B 7/06; C10B 47/00; C10B 47/28; C10B 47/32; C10B 47/44; C10B 53/00; C10G 1/00; C10G 1/002; C10G 1/008; C10G 1/02; C10G 1/10; C10G 2300/00; C10G 2300/10; C10G 2300/1003; C10G 2300/1011; C10G 2300/1014; C10G 2300/1018; C10J 3/00; C10J 3/005; C10J 3/007; C10J 3/72; C10J 3/723; C10J 2200/00; C10J 2200/15; C10J 2200/158; C10J 2300/00; C10J 2300/09; C10J 2300/0903; C10J 2300/0909; C10J 2300/0913; C10J 2300/0946; C10J 2300/12; C10J 2300/1246; C10K 1/00; C10K 1/02; C10K 1/024; C10K 1/04; C10K 1/08; C10K 1/16; C10K 1/18; C10K 1/34; C22C 19/00; C22C 19/05; C22C 19/051; Y02P 30/00; Y02P 30/20
  See application file for complete search history.

(56) References Cited

U.S. PATENT DOCUMENTS

| | | | |
|---|---|---|---|
| 5,037,293 A | | 8/1991 | Kirby |
| 5,648,042 A | * | 7/1997 | Miller, Jr. ............. F27D 5/0068 432/239 |
| 8,518,218 B2 | * | 8/2013 | Ali ........................ C10G 1/10 202/117 |

* cited by examiner

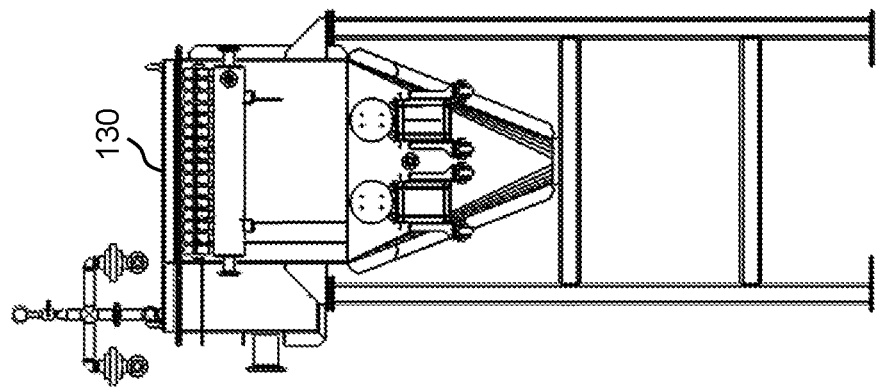
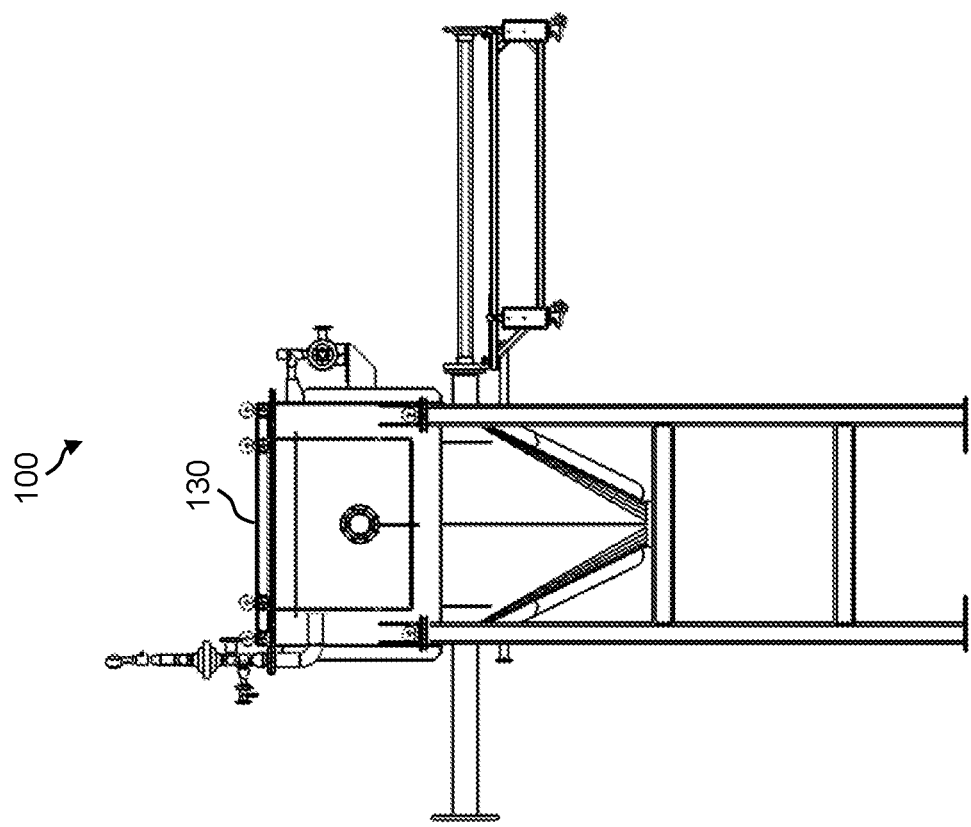
FIG. 20

FIG. 38 (CROSS-SECTION)

FIG. 48 (CROSS-SECTION)

FIG. 50 (CROSS-SECTION)

FIG. 52 (CROSS-SECTION)

FIG. 55 (CROSS-SECTION)

ELECTRIC-POWERED, CLOSED-LOOP, CONTINUOUS-FEED, ENDOTHERMIC ENERGY-CONVERSION SYSTEMS AND METHODS

CROSS-REFERENCE TO RELATED APPLICATIONS

This application is a continuation and claims priority to U.S. patent application Ser. No. 16/622,684, now U.S. Pat. No. 11,097,245, filed Dec. 13, 2019, which is a 35 U.S.C. § 371 U.S. National Phase entry of International Application No. PCT/US2018/037445, now WO 2018/232059, entitled "Electric-Powered, Closed-Loop, Continuous-Feed, Endothermic Energy-Conversion Systems and Methods" having an international filing date of Jun. 14, 2018, which claims the benefit of U.S. Provisional Patent Application Ser. No. 62/519,213 filed Jun. 14, 2017, the entire disclosures of which are incorporated herein by reference.

TECHNICAL FIELD

The presently disclosed subject matter relates generally to energy-conversion processes and more particularly to electric-powered, closed-loop, continuous-feed, endothermic energy-conversion systems and methods.

BACKGROUND

Current energy-conversion processes, such as incineration, gasification, fluidized beds, updraft, downdraft, and low-temperature pyrolysis, all result in heavily regulated air emissions, waste water effluents, and/or other by-products, which can often limit the operating parameters and permitting of the system.

Further, current energy-conversion processes, such as incineration bio-digesters, low-temperature pyrolysis, and gasification systems, focus primarily on the capture of bio-gases yet only recover a small fraction of the available energy, and only minimally reduce the volume of feedstock solids, if at all. Conventional systems operate in heat ranges that cannot isolate metals, minerals, and nutrients in a reusable format. Consequently, the residuals must be landfilled or land applied, which is highly regulated if not prohibited in many jurisdictions. Disposal is further complicated by the presence of hazardous contaminates, medical residuals, and pathogens. Accordingly, there are both regulatory and financial implications with regard to disposal of these solids.

SUMMARY

In accordance with a first aspect of the present invention there are provided systems and methods for energy conversion. The systems and methods may include electric-powered, closed-loop, continuous-feed, endothermic energy-conversion systems and methods featuring mechanisms for natural resource recovery, refining, and/or recycling, such as secondary recovery of metals, minerals, nutrients, and/or carbon char.

Certain embodiments of the invention envisage a system comprising: a controller; a reactor managed by the controller; a shaftless auger in the reactor; and a heater surrounding the reactor and shaftless auger, wherein the system is closed-loop. In other embodiments, the system may further include components such as a scale, mixer, feedstock hoper metering stage, infeed sensor, and airlock. In still other embodiments, the system may include a compensator for maintaining pressure within the reactor. In yet other embodiments, the system may include a vapor pre-heating stage, a ceramic hot gas filter, a quench stage, a pass-through multi-tube plunging condenser, a compensator with an associated recirculator, a vacuum buffer tank, a regulator, a vacuum pump, a syngas buffer tank, and a catalytic scrub. Further, the system may include an automated plunging system. Still further, the system may include a pressure transition component.

In other embodiments, the system of the present invention may include a drag conveyor instead of a shaftless auger as described above. This embodiment may include an airlock with a high-temperature fluid bath. In still other embodiments, the system may include a multi-zone quench station and atmosphere fractioning unit.

Certain embodiments of the present invention envisage a method that may include, but is not limited to, the following steps: providing an energy-conversion system as described above; supplying feedstock material to the energy-conversion system; processing the feedstock material; supplying the processed feedstock material to the inlet of the reactor; advancing the processed feedstock through the reactor while the reactor facilitates a phase-change process of the feedstock from solid to liquid to vapor; maintaining through multi-zone heater accurate and consistent temperature within reactor; maintaining a positive pressure in the system; discharging from reactor outlets char and vapor obtained from reacted feedstock; removing particulates from the discharged vapor; quenching discharged vapor to prevent tar, grease, and/or wax build-ups; after quenching step, transitioning from the positive pressure to a negative pressure in the system; supplying the quenched vapor to a vacuum buffer tank; removing liquid from the vapor cooling the vapor performing a filter-less quenching gas clean-up operation and discharging syngas; and balancing the energy-conversion system through a closed-loop.

Other aspects and features of the present invention will become evident from a review of the Drawing and Detailed Description provided.

BRIEF DESCRIPTION OF DRAWINGS

Figure 1:
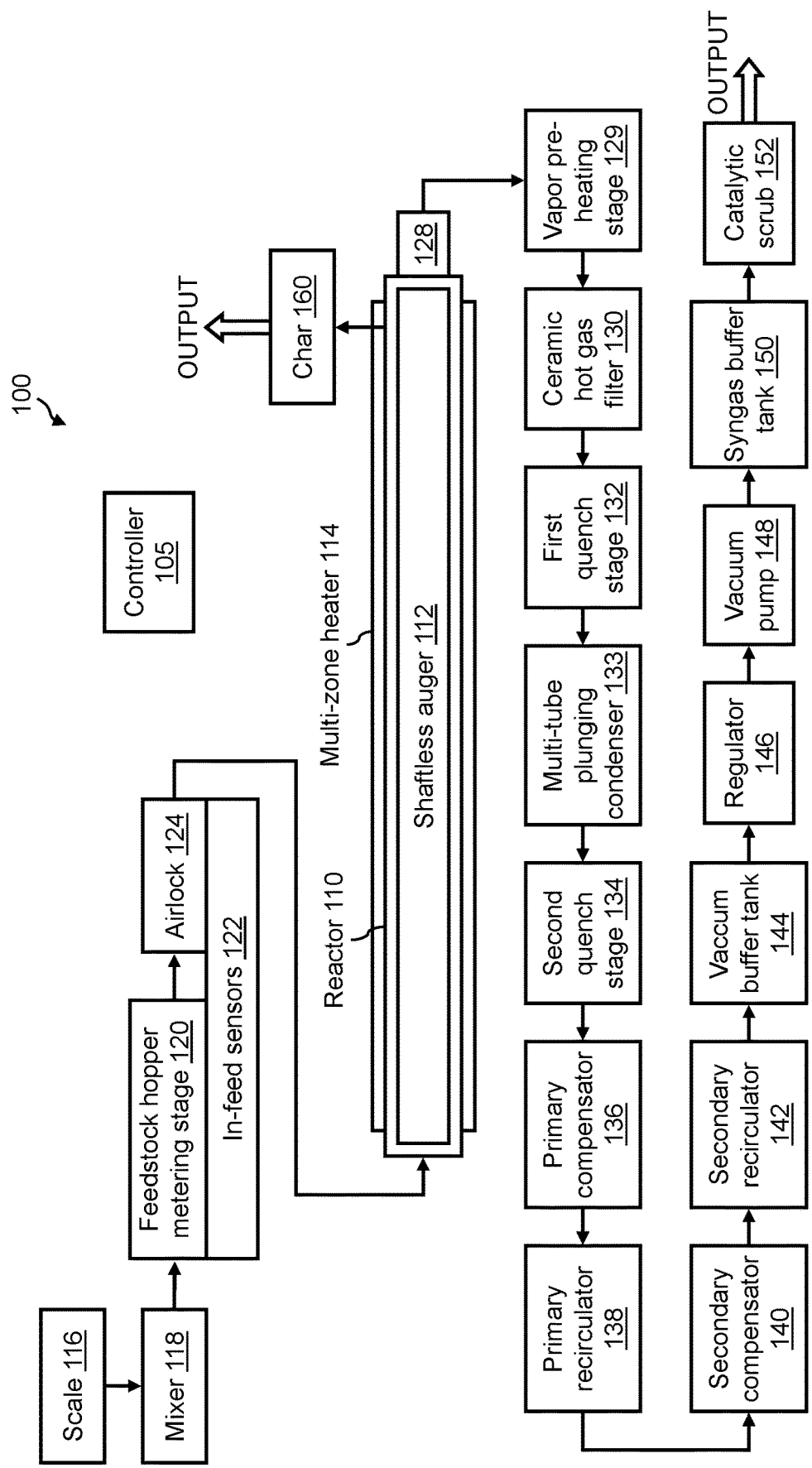
Figure 2:
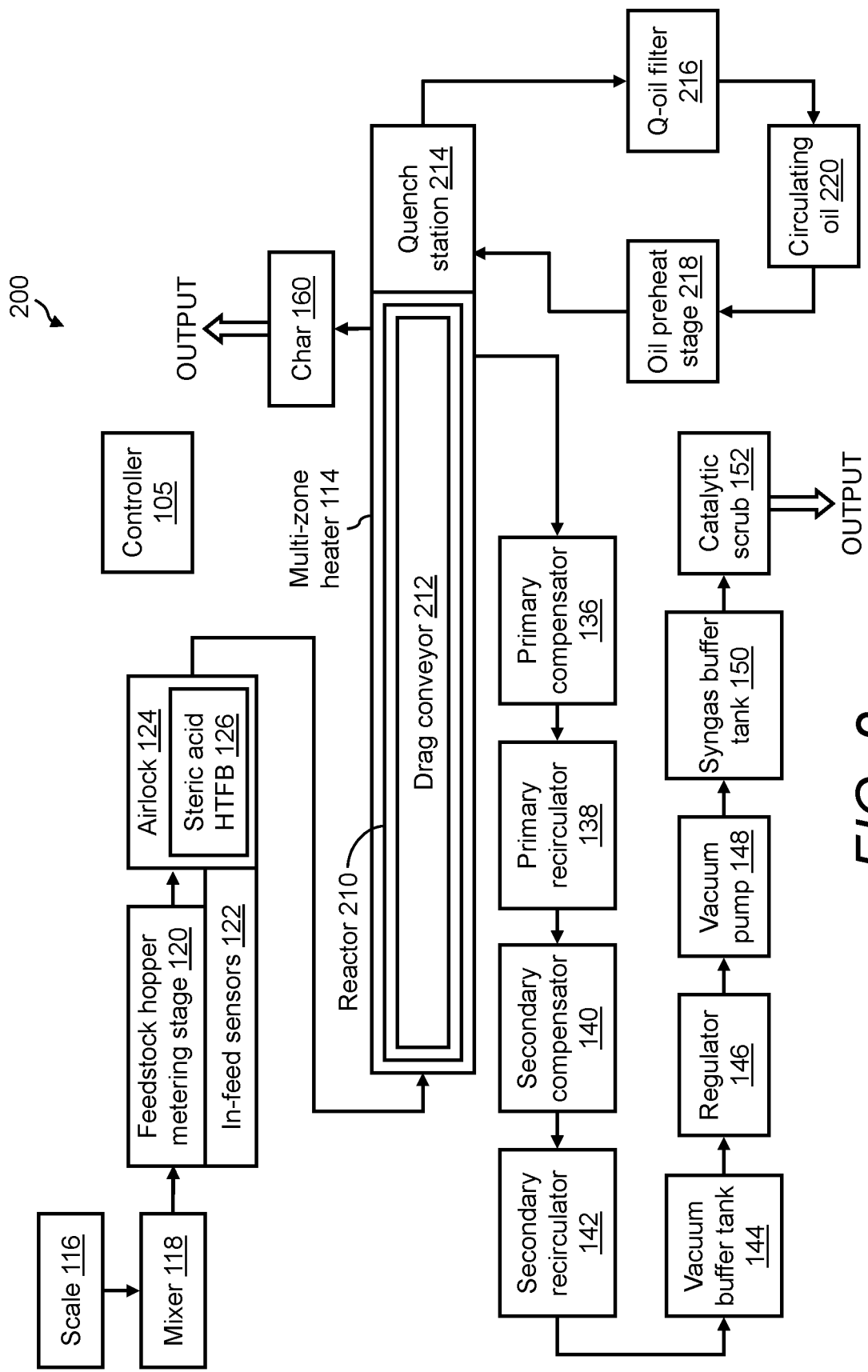
Figure 3:
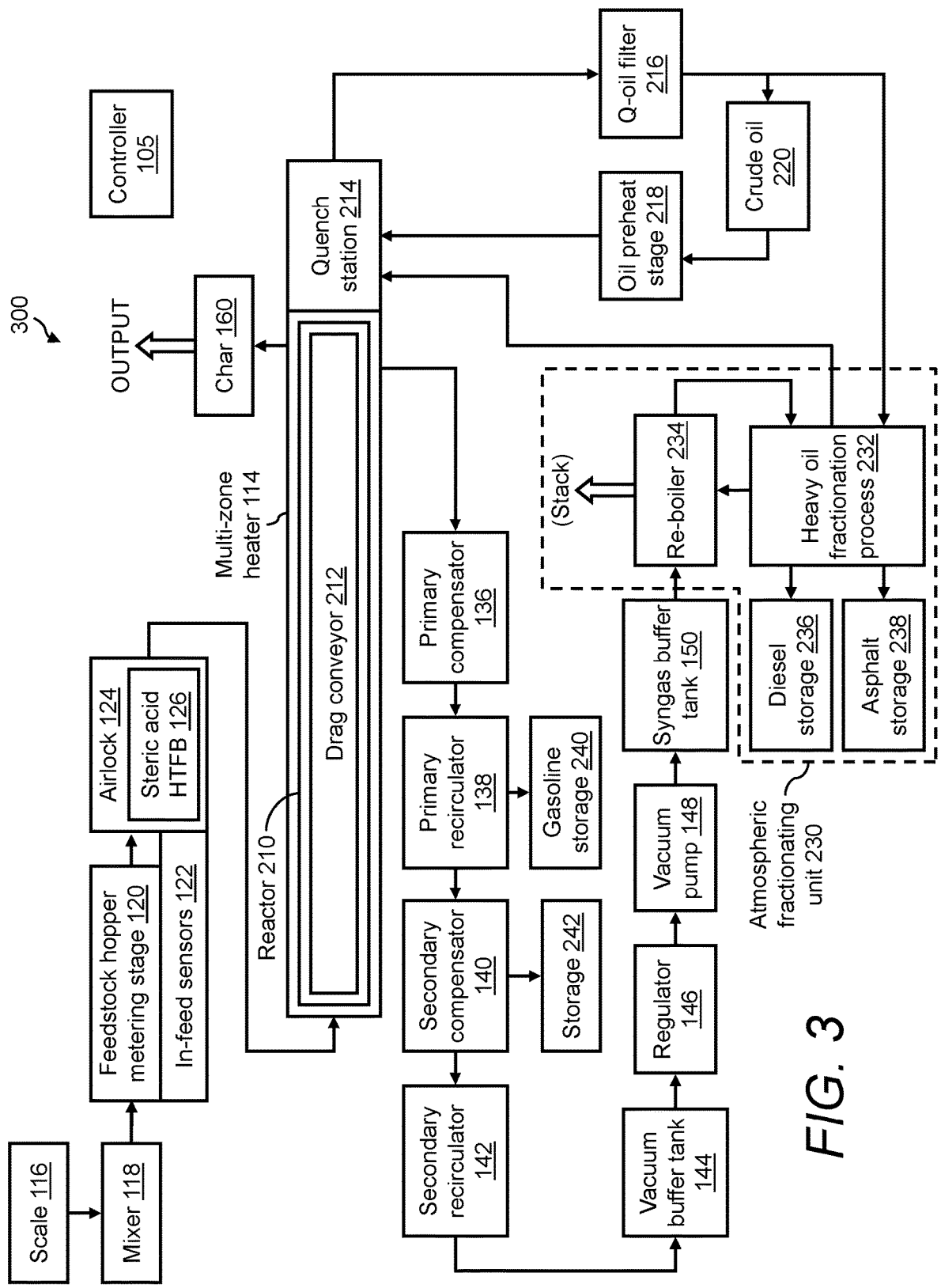
Figure 26:
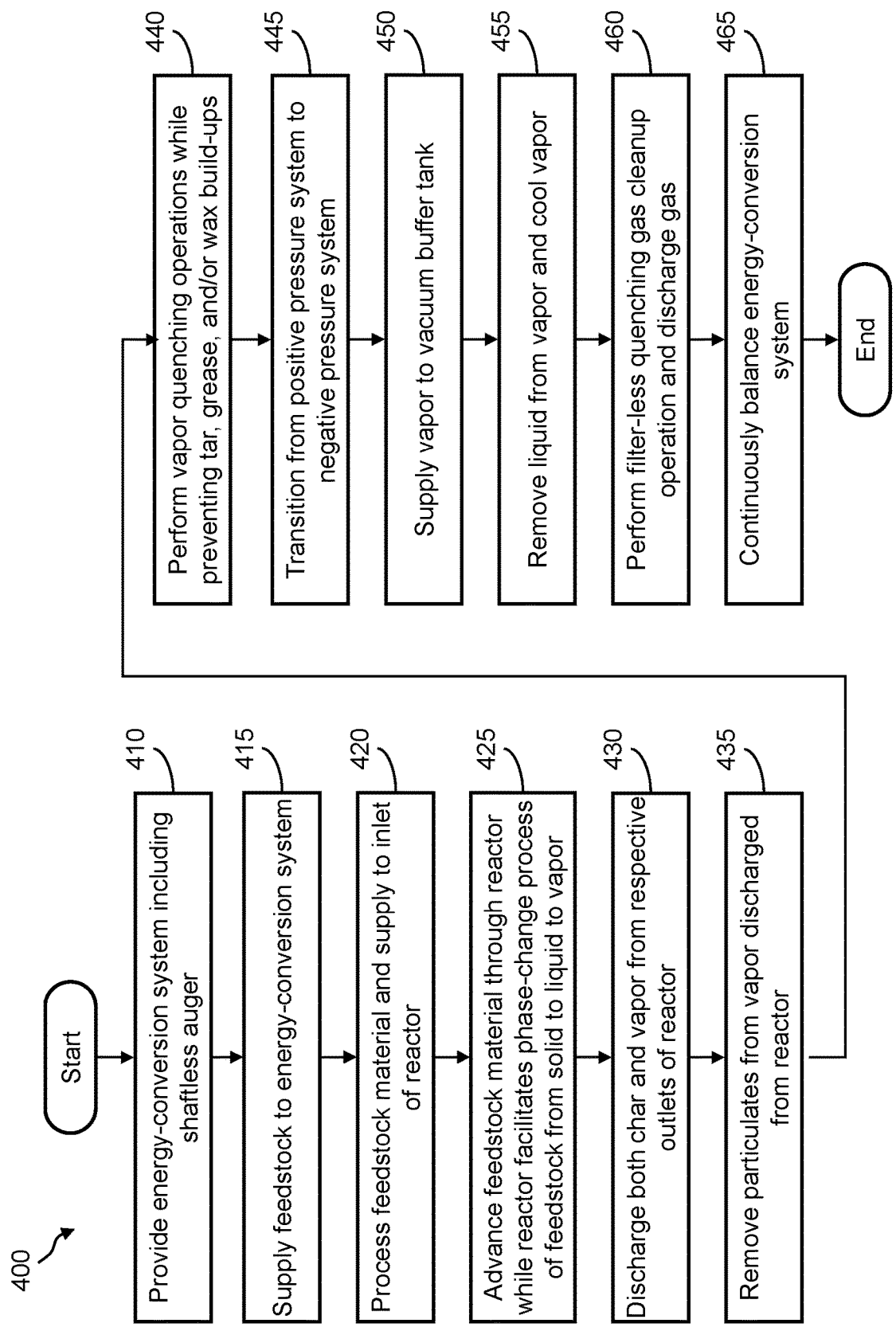
Figure 27:
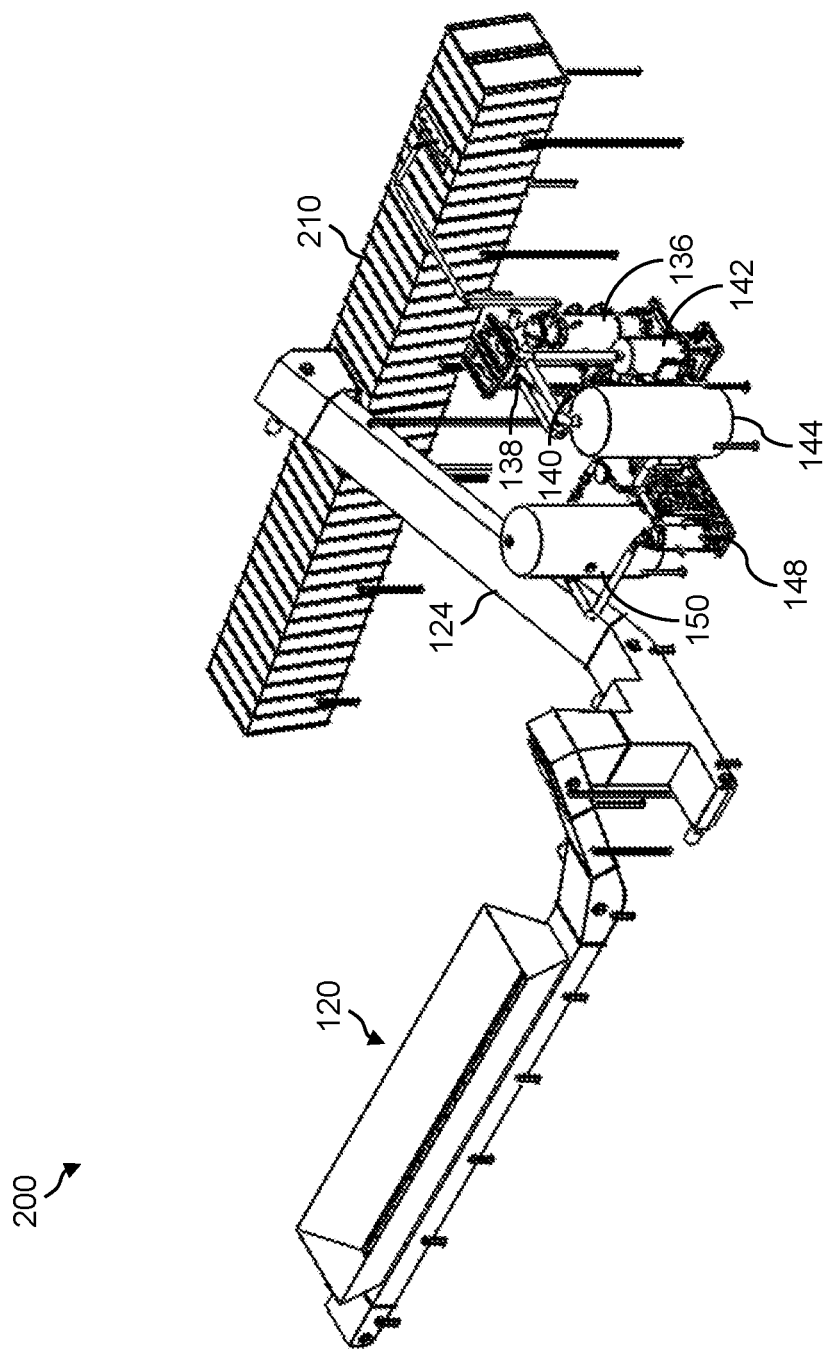
Figure 28:
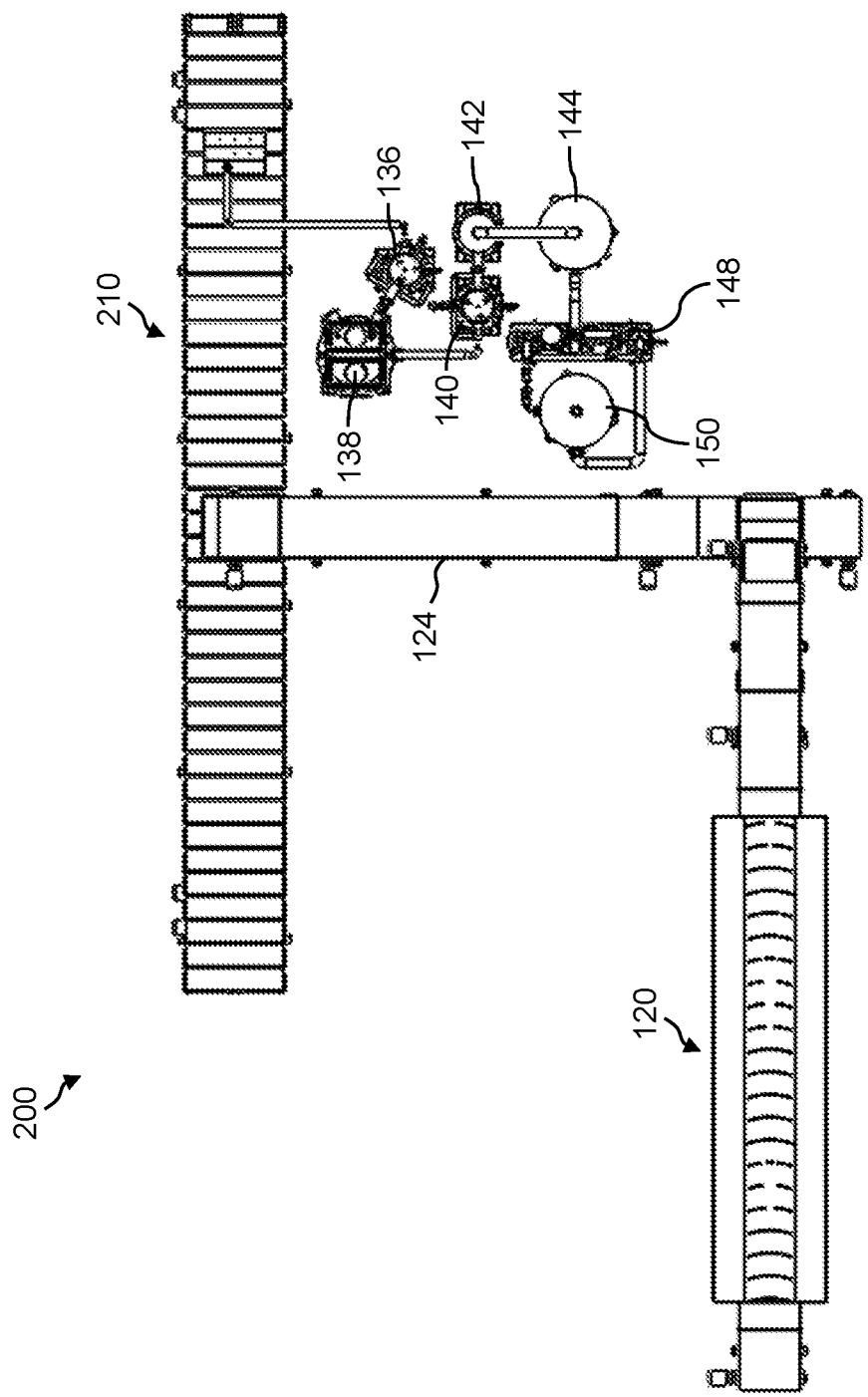
Figure 29:
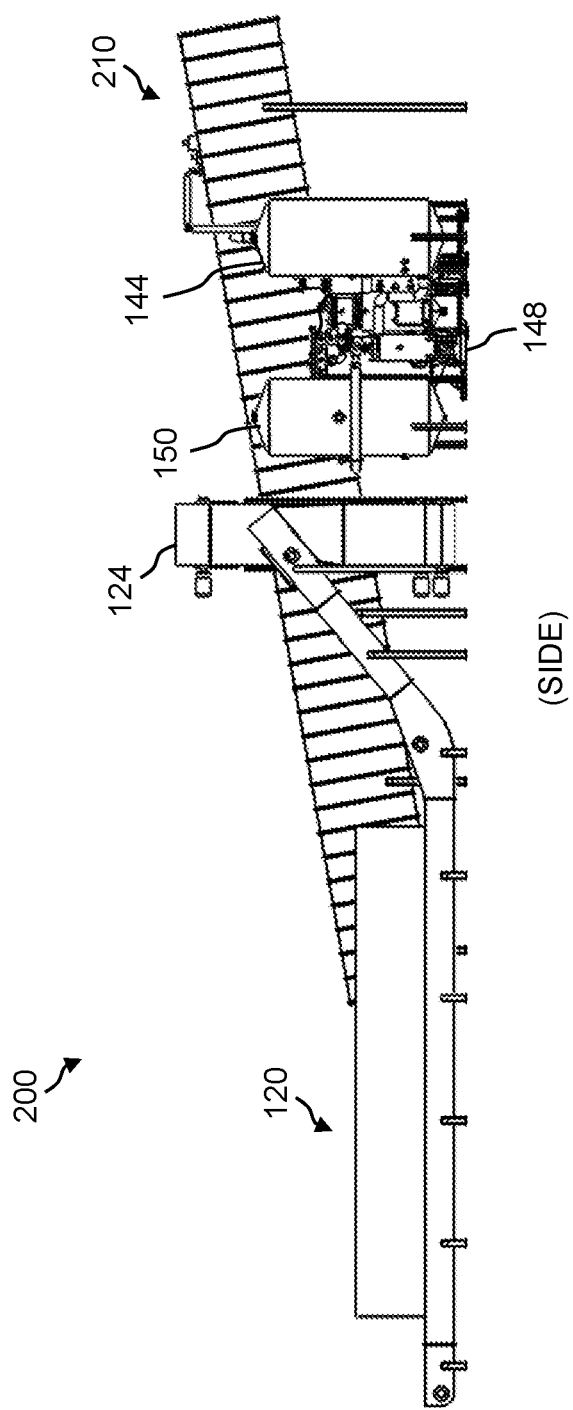
Figure 30:
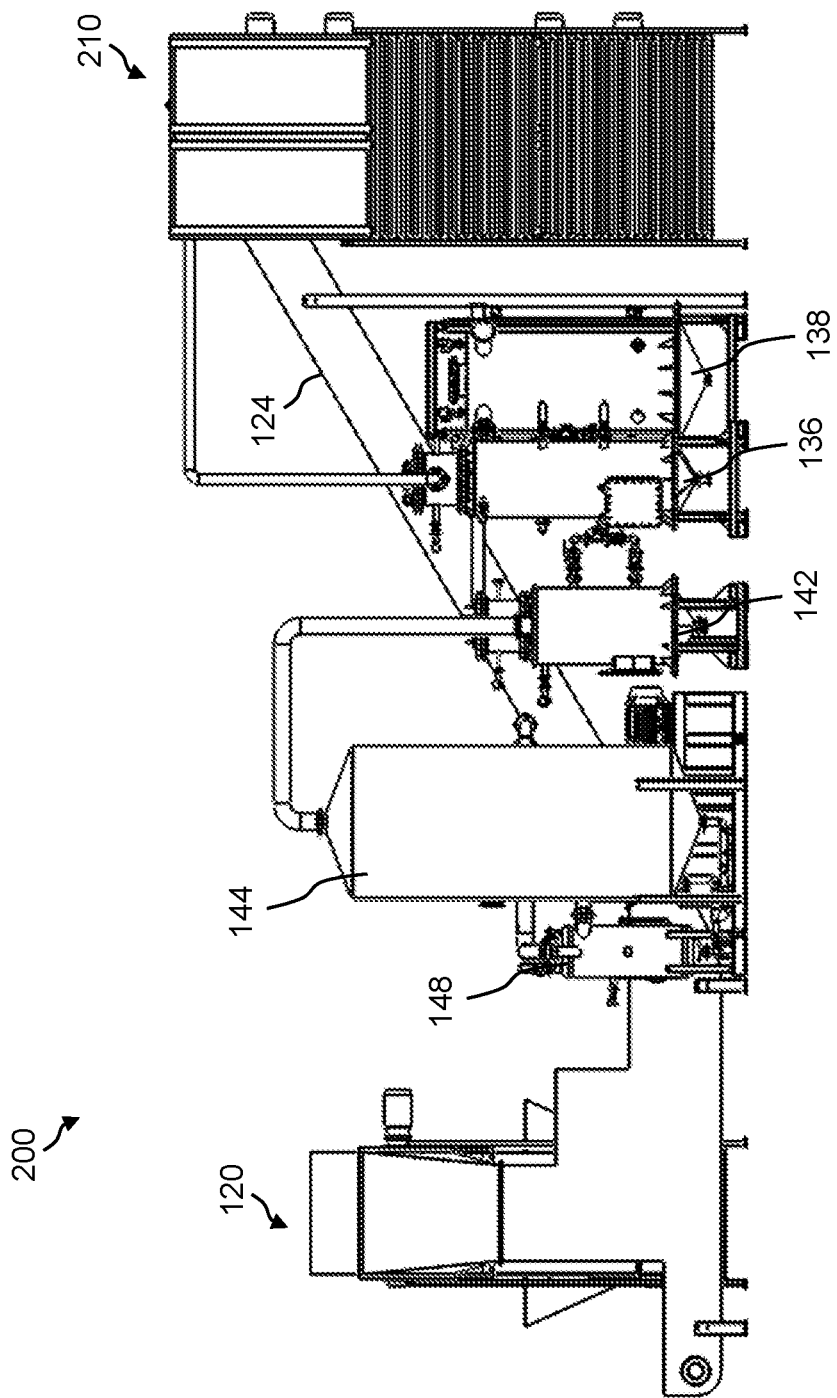
Figure 31:
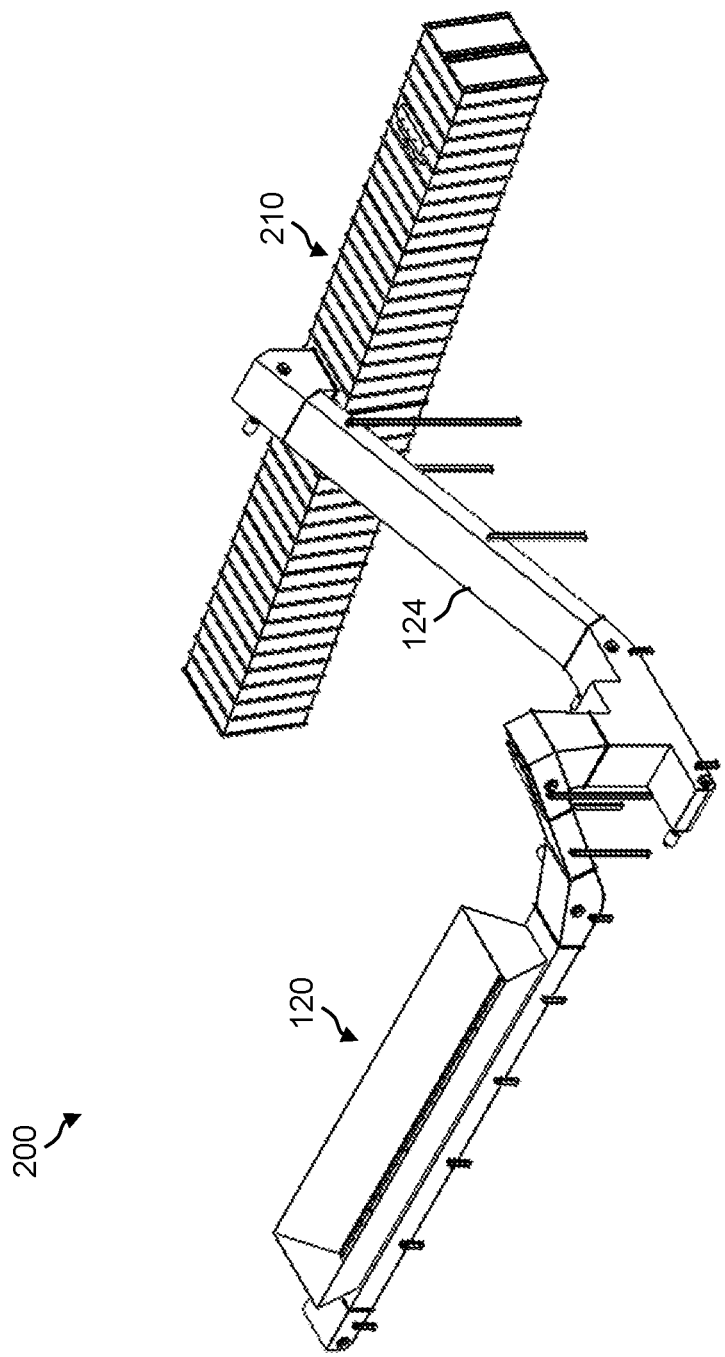
Figure 32:
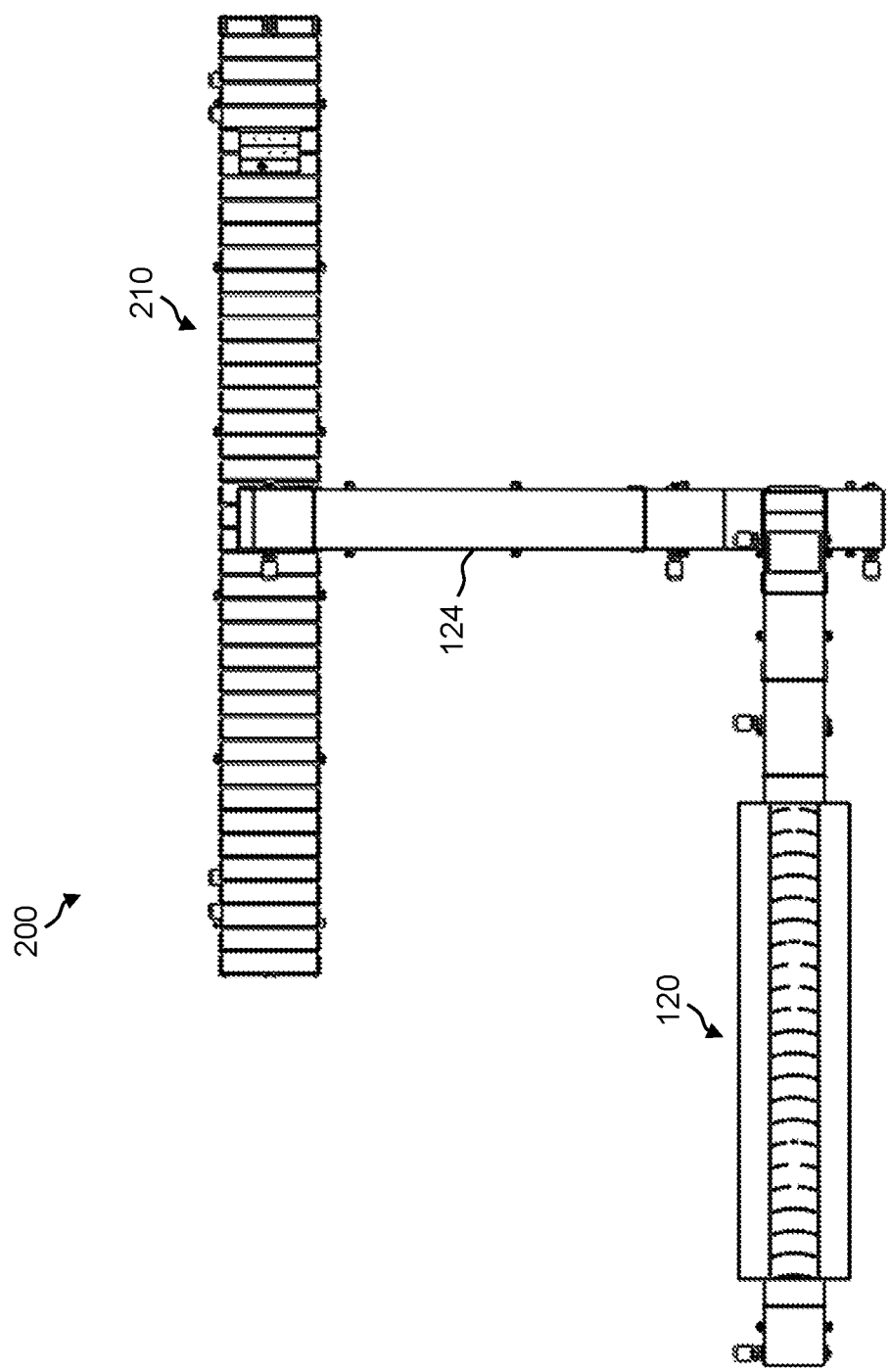
Figure 33:
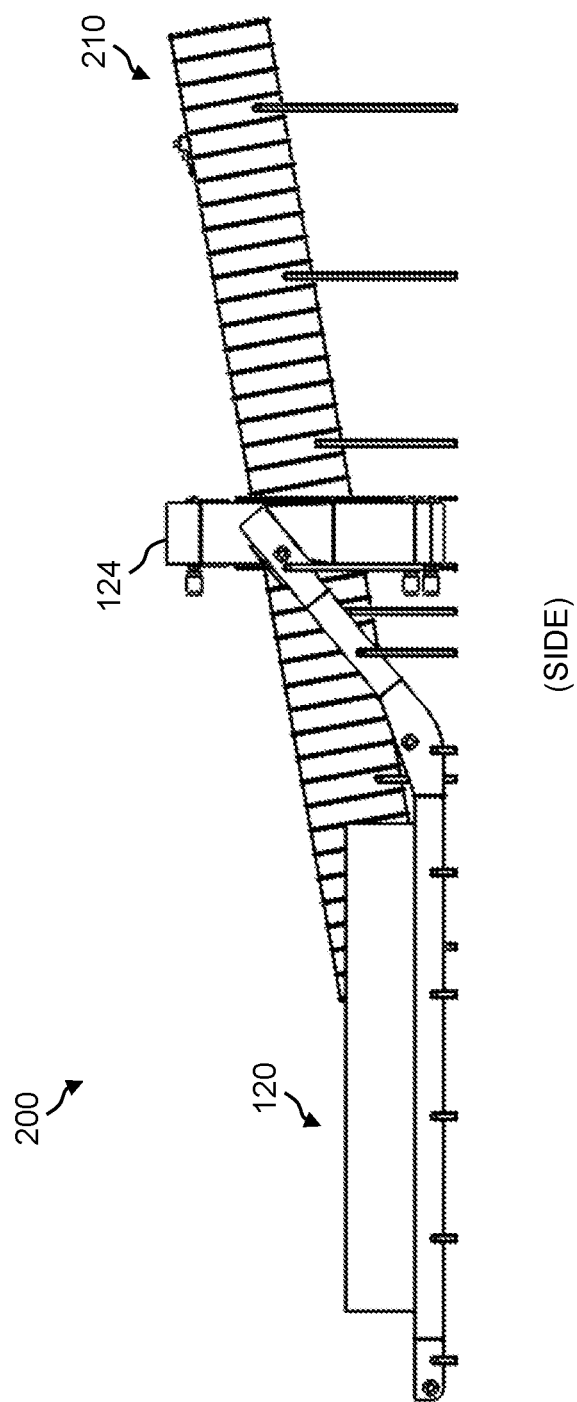
Figure 34:
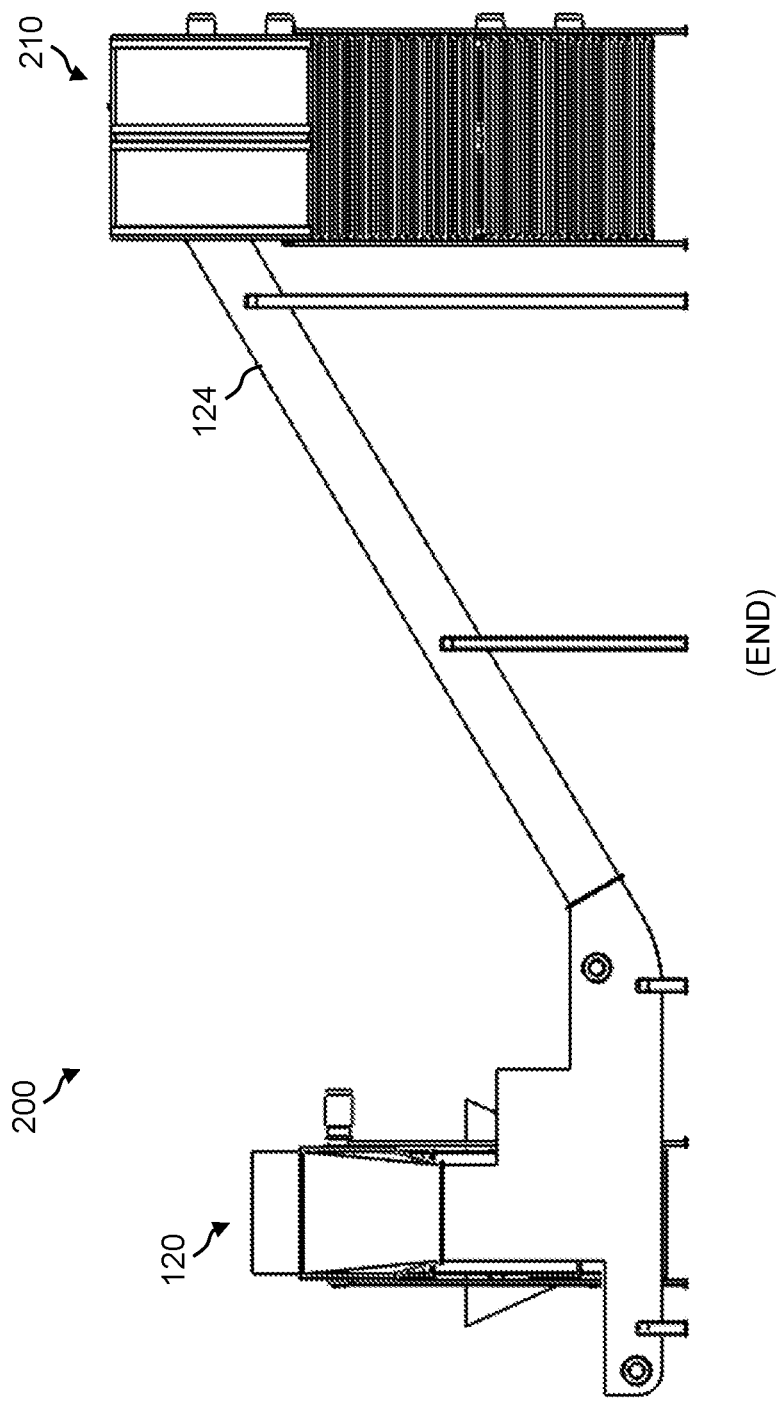

Having thus described the presently disclosed subject matter in general terms, reference will now be made to the accompanying Drawings, which are not necessarily drawn to scale, and wherein:

FIG. 1 illustrates a block diagram of an energy-conversion system that includes a shaftless auger, according to one embodiment of the presently disclosed electric-powered, closed-loop, continuous-feed, endothermic energy-conversion system;

FIG. 2 illustrates a block diagram of an energy-conversion system that includes a drag conveyor, according to another embodiment of the presently disclosed electric-powered, closed-loop, continuous-feed, endothermic energy-conversion system;

FIG. 3 illustrates a block diagram of an energy-conversion system that includes a distillation and/or fractionating stage, according to yet another embodiment of the presently disclosed electric-powered, closed-loop, continuous-feed, endothermic energy-conversion system;

FIG. 4 through FIG. 25 show various views of one example instantiation of the shaftless auger-based energy-conversion system shown in FIG. 1;

FIG. 26 illustrates a flow diagram of an example of a method of operation of the shaftless auger-based energy-conversion system shown in FIG. 1; and FIG. 27 through FIG. 56 show various views of one example instantiation of the drag conveyor-based energy-conversion system shown in FIG. 2.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides electric-powered, closed-loop, continuous-feed, endothermic energy-conversion systems and methods. The presently disclosed endothermic energy-conversion systems and methods feature mechanisms for natural resource recovery, refining, and recycling, such as secondary recovery of metals, minerals, nutrients, and/or carbon char.

In one embodiment, the presently disclosed electric-powered, closed-loop, continuous-feed, endothermic energy-conversion system includes a shaftless auger. In another embodiment, the presently disclosed electric-powered, closed-loop, continuous-feed, endothermic energy-conversion system includes a drag conveyor. In yet another embodiment, the presently disclosed electric-powered, closed-loop, continuous-feed, endothermic energy-conversion system includes a distillation and/or fractionating stage or component. In still another embodiment, the presently disclosed electric-powered, closed-loop, continuous-feed, endothermic energy-conversion system includes a catalytic-heated reactor.

In some embodiments, the presently disclosed endothermic energy-conversion systems and methods provide a positive energy balance. For example, in the endothermic energy-conversion systems and methods, any feedstock that is about >3000 BTU/pound dry basis will result in positive net energy.

In some embodiments, the presently disclosed endothermic energy-conversion systems and methods is substantially emissions-free and provides substantially effluent-free conversion of animal-waste, bio-mass, coal, rubber and/or municipal-solid-waste into renewable energy formats including syngas, gasoline, diesel, electricity. Namely, the presently disclosed endothermic energy-conversion systems and methods provide a closed-loop system that has substantially no air emissions/pollution, waste water effluent/pollution, and produces no additional unmarketable products. As a result, there may be few or no regulatory constraints on operations and permitting.

In some embodiments, the presently disclosed endothermic energy-conversion systems and methods has capability to recover the non-energy fraction of the feedstock into a prescriptive carbon-char that has commercial re-sale value as a soil amendment, an animal feed supplement, or as a filtration media. Further, it has capability to recover the liquid condensable fraction of the conversion process. Further, it allows marketing and selling commercially recovered product where possible and refining product to allow re-sale into the market where needed. Further, the non-condensable fraction of the conversion process can be fractionated into a producer gas.

In some embodiments, the presently disclosed endothermic energy-conversion systems and methods may: (1) reduce feedstock volume by up to about 85% while preserving the resident metals, minerals, and nutrients; (2) condense the residual metals, minerals, and nutrients into a pathogen-free, medical residual-free carbon char that can be further fractionated into its component parts; (3) because of the reduced feedstock volume, minimize shipping expense and maximize re-sale/radius; (4) provide substantially pathogen-free, medical residual-free status that reduces or entirely eliminates regulatory barriers to beneficial reuse or use in whole as an animal feed supplement or a soil amendment to minimize with no regulatory constraint on commercial re-sale; (5) provide improved economics of char recycling/re-sale, which allows for an economically viable self-sustaining renewable energy loop; and (6) receive the residuals from current energy-conversion systems and process them as a feedstock.

In some embodiments, the presently disclosed endothermic energy-conversion systems and methods require no-landfilling or land-application of residuals. Namely, the system may allow for full conversion of substantially the entire feedstock by converting substantially all volatiles into renewable energy and then reformatting the residuals metals, minerals, and nutrients into byproducts with commercially viable beneficial extended life reuse. For example, the presently disclosed endothermic energy-conversion systems and methods may: (1) reduce or entirely eliminate the need for landfilling or land application of residuals; (2) reduce or entirely eliminate the expense of landfilling; (3) reduce or entirely eliminate regulatory burden and expense; and (4) be used to clean up large stockpiles of residual waste from existing current energy-conversion systems.

Referring now to FIG. 1 is a block diagram of an energy-conversion system 100 that includes a shaftless auger, according to one embodiment of the presently disclosed electric-powered, closed-loop, continuous-feed, endothermic energy-conversion system. Energy-conversion system 100 is typically a closed-loop system that (1) eliminates substantially all emissions and effluents; (2) recovers substantially all residual carbon, metals, minerals, and nutrients for beneficial reuse; (3) reuses residual/waste heat; and (4) reduces or entirely eliminates parasitic loss of potential energy.

Energy-conversion system 100 includes a controller 105. Controller 105 is used to manage the overall operations of energy-conversion system 100. Controller 105 can be any computing device that is capable of executing program instructions. Controller 105 can be, for example, a server, a desktop computer, a laptop computer, a tablet device, a smartphone, a smartwatch, a cloud computing device, and the like.

Energy-conversion system 100 also includes a reactor 110, also known as a conversion chamber or conversion reactor. Reactor 110 is an electrically controlled and heated reactor. Reactor 110 is typically a pipe or tube that is equipped with multi-zoned electric heat. Namely, a shaftless auger 112 is installed in reactor 110. Further, a multi-zone heater 114 surrounds the assembly of the reactor 110 and shaftless auger 112. In one example, reactor 110 is a pipe or tube that is about 30 feet (about 9.1 meters) long and about 12 inches (about 30.48 cm) in diameter. However, reactor 110 can be any length and diameter and the shaftless auger 112 can be sized accordingly. Namely, the length of reactor 110 may be determined by the amount of residence time needed in the system. Further, reactor 110 can be formed, for example, of carbon steel, stainless steel, or specialized alloys, such as, but not limited to, selected Inconel alloys (i.e., a family of austenitic nickel-chromium-based superalloys).

Conventional continuous-feed energy-conversion systems often utilize shafted auger systems that are problematic with exposure to high heat. In these systems, the shafted auger is aligned and centered with bearings at both ends of the conversion chamber, as the auger is subjected to heat creep or thermal growth occurs. The conversion chamber (i.e., the pipe), shaft, and flights may expand (i.e., thermal expansion) at different rates. This creates alignment problems because the shaft expands slower than the flights and therefore the shaft often experiences warping. The shaft additionally carries the weight of the auger and when subjected to heat will sag or deflect depending on the length. Further, in conventional systems, the weld connections between the flight and shaft also are stressed with creep and will ultimately fail. Tolerances from pipe to flight on the shafted auger have to be adequate to allow rotation in the presence of a warping and/or sagging shaft.

The inclusion of shaftless auger 112 in energy-conversion system 100 mitigates many of the problems associated with shafted augers. Namely, shaftless auger 112 is designed to rotate in direct contact to reactor 110 (i.e., the pipe or trough) and, at elevated temperature, can experience galling. Shaftless auger 112 is allowed to be supported by the pipe, which ensures alignment and removes the length limitation created by weight. Additionally, centering shaftless auger 112 on the non-drive-end of shaftless auger 112 is eliminated, which allows shaftless auger 112 to experience creep growth with no effect on bearings or seals. Shaftless auger 112 being in direct contact with the inner walls of reactor 110 (i.e., the pipe or trough) also promotes scouring and maintaining of direct surface contact with feedstock, thereby ensuring thermal conductivity. The mass of auger 112 being in direct contact with reactor 110 (i.e., the pipe or trough) also increases thermal conductive surface area, which ensures high conduction rate of heat energy to feedstock.

Shaftless auger 112 is typically a single penetration auger that reduces wear and tear on bearings and seals as compared with multiple penetration augers of conventional conversion chambers. Shaftless auger 112 is in direct contact with the inner walls of reactor 110 (i.e., the pipe or trough), which increases scouring and self-cleaning as compared with augers of conventional conversion chambers that have no contact with the pipe and provide minimal scouring. Shaftless auger 112 ensures high thermal conduction and energy efficiency by substantially eliminating deposited material between reactor 110 and shaftless auger 112. Because there is no shaft, shaftless auger 112 eliminates differential growth rates between shaft and flights which cause metal fatigue and failure. Because there is no shaft, shaftless auger 112 eliminates chronic issues that conventional conversion chambers have with respect to warping of the shaft. Because there is no shaft, shaftless auger 112 eliminates high-heat weld failure on the auger as there is no need to connect flights to the shaft. Shaftless auger 112 allows fixed creep and growth direction of the auger in reactor 110 without a second penetration point. Shaftless auger 112 can be formed of specialized alloys, such as, but not limited to, selected Inconel alloys, and protected with dissimilar alloy wear strips to prevent galling of similar metals with direct contact of the auger to the pipe or trough. Galling is adhesive wear caused by microscopic transfer of material between metallic surfaces, during transverse motion/sliding. Galling occurs frequently whenever metal surfaces are in contact, sliding against each other, especially with poor lubrication. Also, shaftless auger 112 can be formed of the specialized alloys (e.g., Inconel 625 alloys) to prevent chlorine migration and hydrogen embrittlement. However, in other embodiments, shaftless auger 112 can be formed of carbon steel or stainless steel. Shaftless auger 112 creates an agitating and stirring effect of the feedstock, which facilitates more efficient heat distribution.

Using multi-zone heater 114, reactor 110 is an electric heat conversion chamber; namely, a multi-zone electrically heated oven. In one example, multi-zone heater 114 provides six (6) individually controlled heating zones within reactor 110. Multi-zone heater 114 provides heat energy for both start-up and the feedstock conversion process. Multi-zone heater 114 provides precisely controlled chamber temperatures for prescriptive outcomes, such as pathogen-free and/or medical residual-free. Multi-zone heater 114 provides for very precise control of temperature bands for prescriptive fractioning and refining of distillates and chars. Multi-zone heater 114 is capable to provide heat ranging from about 100° F. (about 38° C.) to about 2500° F. (about 1371° C.). Multi-zone heater 114 provides for substantially instantaneous response to sensor driven heat demand. Using multi-zone heater 114 eliminates air emissions and the need for an exhaust stack. Using multi-zone heater 114 eliminates atmospheric heat loss through exhaust stack. Further, the use of electric heat in reactor 110 eliminates natural gas or propane emissions from the conversion process. As a result, the use of the electric-heat reactor 110 requires no air permit for the conversion process. Further, reactor 110 in not limited to electric heat only. In another example, reactor 110 can be a catalytically-heated reactor.

Processing the feedstock (or in-feed) that supplies the inlet of reactor 110 is a scale 116, a mixer 118, a feedstock hopper metering stage 120, one or more in-feed sensors 122, and an airlock 124.

In energy-conversion system 100, the feedstock can be, in one example, any biomass (i.e., any organic matter or organic waste that can be used as a fuel), such as, but not limited to, manure, coal, trash, rubber, and plastic. In another example, the feedstock can be mining waste, such as, but not limited to, mine tailings and water-based and/or oil-based drilling mud. However, the system configuration of energy-conversion system 100 is particularly well suited for processing "sticky" feedstock, such as rubber and plastic. At the site of energy-conversion system 100, the feedstock is typically received at a scale 116 for weighing the bulk feedstock material. The feedstock then enters mixer 118. Mixer 118 is used to ensure a homogenous mixture of feedstock entering the system.

Feedstock hopper metering stage 120 is used for metering the feedstock into reactor 110 at a certain rate. Feedstock hopper metering stage 120 can include, for example, an auger-driven metering mechanism and/or a belt-driven conveyor. Further, feedstock hopper metering stage 120 functions to pre-heat and dry the feedstock. Accordingly, feedstock hopper metering stage 120 includes a dryer mechanism, such as bed dryer that allows conduction drying rather than using convection drying with heated air or a combination of both conduction and convection. Drying is completed in a closed-loop environmentally friendly manner, which dramatically slows the heat dissipation and dramatically improves the energy balance. In feedstock hopper metering stage 120, waste heat can be captured. Additionally, soluble nutrients can be recaptured with condensing of vapor from the dryer. Further, hot oil from heat recovery can be used to dry the feedstock while metering.

Further, feedstock hopper metering stage 120 includes a metered sorbent application that can be used for pre-combustion sequestration of contaminants, such as sulfur, chlorine, and dioxins. The metered sorbent application pre-treats gas while still in the vapor state. Namely, metered sorbents and reagents are added to feedstock prior to or just after the conversion process to sequester contaminates like sulfur and chlorine. Sorbent and reagents can be, for example, finely milled lime, trona, bentonite, sodium bentonite, sodium, and/or sodium bicarbonate, depending on the contaminate. Sorbents and reagents are subjected to minimum heat to promote active bond to contaminants.

In-feed sensors 122 are used to automatically control feedstock bed-depth and rate into reactor 110, which enables an ultra-efficient conversion of the feedstock. In-feed sensors 122 include a positive flow advancement sensor that ensures a scouring effect at the inlet of reactor 110 by the introduction of feedstock at or below reactor level.

The outlet of feedstock hopper metering stage 120 supplies an inlet of airlock 124, which is a passive airlock that is used to remove the air from the feedstock. In airlock 124, feedstock material is advanced via a conical auger. The conical auger compresses the loose materials into a tube. The compressing action of the conical auger is the mechanism for removing the air from the feedstock material. Namely, the conical auger automatically compresses the loose materials to form about 45 pounds/cubic foot (about 720 kilogram/cubic meter) to about 50 pounds/cubic foot (about 800 kilogram/cubic meter) density plug/airlock, which enables oxygen-free feedstock supply into reactor 110. The auger automatically creates an airlock plug with advancing material. The outlet of airlock 124 supplies the inlet of reactor 110. Reactor 110 may have multiple outlets.

In energy-conversion system 100, the dried and air free, or liquid soaked and drained feedstock is then processed through reactor 110. Namely, shaftless auger 112 is used to advance the feedstock through reactor 110. Increased heat transfer rates are achieved by the large amount of surface contact created by the increased density of feedstock with liquid increasing the phase-change process to vapor. Feedstock is turned and stirred through reactor 110 to ensure uniform conversion process. Continuous process vapor is mixed throughout the process and equalized prior to reaching the outlets. Feedstock exposure to heat energy is limited to ensure production of a market driven product meeting end users' specifications. Reactor process pressure is less than about 10 inches (about 25.4 cm) of pressure to relieve stress on structural components, reduce constraints on seals, and to ensure that no air can enter reactor 110. Pressure is maintained within reactor 110 with vapor created in phase change of feedstock and relieved by compensators (e.g., a primary compensator 136 and a secondary compensator 140 as described hereinbelow). By contrast, conventional energy-conversion systems are designed for positive or negative pressure. The regulation of pressure is challenged with clogging at discharge, feedstock input process, and even uniform heat throughout the reactor with utilization of burners, augers, and the inability to create and maintain an airtight environment. The presently disclosed energy-conversion systems can mitigate these drawbacks.

The electric multi-zone heater 114 also allows for extremely accurate consistent temperature settings for controlled reaction, thereby eliminating the cyclical nature of overheating and then under heating typically seen on a reactor with the combustion of product. This accuracy and elimination of cyclical heating increases helps ensure products that can meet specifications to allow marketability.

Further, in energy-conversion system 100, the electric generated zoned heat (via multi-zone heater 114) supplies the energy required to facilitate the conversion process, which allows for a truly closed-loop system. Namely, as feedstock progresses through reactor 110, the feedstock changes from a solid to a liquid and then to a vapor. If the feedstock has a quantified BTU per given mass, it can be accounted for in the sum of the gas, liquid, and char fractions. By contrast, conventional energy-conversion systems often utilize a percentage of the feedstock, produced gas, and/or the produced liquid to supply the energy required to advance the conversion process. Further, in energy-conversion system 100, the amount of total energy generated from the conversion process is far more than the energy consumed by the process. That is, energy-conversion system 100 has a positive energy balance. Namely, in energy-conversion system 100, any feedstock that is about >3000 BTU/pound (about >6613 BTU/kilogram) dry basis will result in positive net energy.

Additionally, reactor 110 has a specified "pathogen and medical residual destruction zone" in which the temperature and duration is controlled and monitored by imbedded electronic sensors (i.e., thermocouples, pressure indicators, and residence time sensors). Information from the sensors can be used to calculate and ensure that the FDA heat exposure standard of 5-logarithmics iterations for "pathogen-free" and "medical residual-free" classifications are achieved, recorded, and stored remotely in triplicate.

Energy-conversion system 100 further includes a vapor pre-heating stage 129, a ceramic hot gas filter 130, a first quench stage 132, a pass-through multi-tube plunging condenser 133, a second quench stage 134, a primary compensator 136 with an associated primary recirculator 138, a secondary compensator 140 with an associated secondary recirculator 142, a vacuum buffer tank 144, a regulator 146, a vacuum pump 148, a syngas buffer tank 150, and a catalytic scrub 152.

Namely, an outlet of reactor 110 supplies an inlet of vapor pre-heating stage 129, an outlet of vapor pre-heating stage 129 supplies an inlet of ceramic hot gas filter 130, an outlet of ceramic hot gas filter 130 supplies an inlet of first quench stage 132, an outlet of first quench stage 132 supplies an inlet of multi-tube plunging condenser 133, an outlet of multi-tube plunging condenser 133 supplies an inlet of second quench stage 134, an outlet of second quench stage 134 supplies an inlet of primary compensator 136, an outlet of primary compensator 136 supplies an inlet of a primary recirculator 138, an outlet of a primary recirculator 138 supplies an inlet of secondary compensator 140, an outlet of secondary compensator 140 supplies an inlet of secondary recirculator 142, an outlet of secondary recirculator 142 supplies an inlet of vacuum buffer tank 144, an outlet of vacuum buffer tank 144 supplies an inlet of regulator 146, an outlet of regulator 146 supplies an inlet of vacuum pump 148, an outlet of vacuum pump 148 supplies an inlet of syngas buffer tank 150, and an outlet of syngas buffer tank 150 supplies an inlet of catalytic scrub 152.

Conventional energy-conversion systems operate in heat ranges that cannot isolate the metals, minerals, and nutrients in a reusable format. By contrast, energy-conversion system 100 features commoditized natural resource recovery. Namely, energy-conversion system 100 operates in a heat range that prescriptively chelates or electrostatically bonds the targeted commodities to the carbon matrix created by the conversion process. The resulting char has commercial re-sale value as a soil amendment or and animal feed supplement. For example, energy-conversion system 100 produces a char 160 (discharged at an outlet of reactor 110). Generally, any feedstock material that remains solid (i.e., that does not turn to vapor) when processed through reactor 110 is discharged as char 160. Char 160 can be, for example, a solid carbon char and other nutrients that can be sold to market. For example, char 160 can be sold to market as a soil amendment, or due to its pathogen-free, medical residual-free status, as a high-end animal feed supplement.

Vapor that is at a critical heat temperature of, for example, from about 900° F. (about 482° C.) to about 1000° F. (about 538° C.) exits reactor 110 through ceramic hot gas filter 130. Ceramic hot gas filter 130 is a multi-zone ceramic hot gas filter that provides active vapor filtration to remove any particulate prior to condensing. Ceramic hot gas filter 130 allows systematic pulsing for purging of chars and contaminants. Ceramic hot gas filter 130 uses a supply of producer gas for pulsing. Ceramic hot gas filter 130 provides economic advantages by not supplying inert gas. Pre-heating pulse gas reduces the opportunity for a condensing moment, which would result in tar and/or wax build-up.

The outlets of reactor 110 through which the hot vapor exits utilize an automated plunging system 128. For example, automated plunging system 128 features integrated multi-vapor discharge nozzles, wherein the nozzles may be integrated into filtering (e.g., ceramic hot gas filter 130), quenching stages, (e.g., first quench stage 132 and second quench stage 134), multi-tube plunging condenser 133, and any combinations thereof. In reactor 110, the nozzles are continuously scoured by automated plunging system 128, which includes a set of continuous "shaft and shell" pneumatic or hydraulic plungers that are used to scour residual char deposit to maintain clear pathways for more efficient vapor discharge and collection. Continuous plunging slows gas velocities and allows suspended particles to drop out of vapor creating a cleaner gas prior to condensation. Reactor 110 features multi-port vapor discharge that is based on automated plunging system 128. The presence of multi-port plunged vapor outlets ensures vapor discharge at a prescribed maximum velocity.

Maintaining a minimum temperature of entire vapor discharge system to the first stage of vapor condensing eliminates the opportunity to form and deposit waxes, tars, and/or acids. Conventional energy-conversion systems rely on vapor to heat the system as the system becomes active. Until the system reaches critical temperature, condensation occurs, thereby allowing deposits and acids to form. Once deposits are formed the system becomes coated, which promotes clogging and adding to system downtime and maintenance. By contrast, in energy-conversion system 100, vapor pre-heating stage 129 (together with ceramic hot gas filter 130) reduces pre-condensing opportunities, minimizes corrosive build-up, reduces tar and wax deposits minimizing clogging opportunities, reduces acidic formation, reduces maintenance expense and downtime, and increases lifespan of capital equipment. Namely, vapor pre-heating stage 129 is used to pre-heat the gas leading into and flowing out of ceramic hot gas filter 130 in order to prevent the gases from condensing and clogging ceramic hot gas filter 130. Using vapor pre-heating stage 129, the gas can be heated to from about 450° F. (about 232° C.) to about 500° F. (about 260° C.). In operation, in pre-heating stage 129, the vapor is heated by heating the components through which the vapor flows. Heating can be performed, for example, using heat trace tubing, hot oil, and/or steam.

Quenching of vapor with produced liquid fraction product is accomplished using first quench stage 132 and second quench stage 134. Quenching promotes the elimination of tars, resins, and waxes (i.e., the heavy tars or oils) in gas fraction, removes particulate for the vapor stream, and allows for collection of specific fraction of condensable liquid. The vapor can be quenched using, for example, mineral oil or any other oil that can be used to absorb the tars, resins, and waxes. In some embodiments, quenching liquid can be filtered into a high temperature fluid bath (HTFB) to recapture nutrient and/or char. Any vapor remaining after processing by first quench stage 132, multi-tube plunging condenser 133. and second quench stage 134 is passed to primary compensator 136 with its primary recirculator 138. Multi-tube plunging condenser 133 is arranged between first quench stage 132 and second quench stage 134. Current condensing systems experience deposits of waxes, heavy oils, greases and tars. As deposits occur, condensing rate decreases, creating vapor carry over effects, clogging, higher maintenance costs and ultimately increased downtime. Multi-tube plunging condenser 133 mitigates these problems. For example, multi-tube plunging condenser 133 includes an open ended plunged shell and tube heat exchange condenser to eliminate tar, grease, and/or wax build-ups. Supported by automated plunging system 128. Multi-tube plunging condenser 133 eliminates clogging of waxes, tars and heavy oils; promotes advancement of any condensed liquid; promotes heat transfer from vapor to condensing tubes; and reduces maintenance and down time.

In energy-conversion system 100, there may be a pressure transition component. In particular, the system may include a transition from a positive pressure system to a negative pressure system. For example, reactor 110 through first quench stage 132 and second quench stage 134 is pressurized to about 7 inches (about 17.78 cm) of water column pressure. However, at primary compensator 136 the system begins to transition to a negative pressure system. Accordingly, primary compensator 136 and primary recirculator 138 allow for low-pressure vapor supply to negative pressure vapor removal. Further, primary compensator 136 acts as condenser that: (1) provides first phase tube-to-shell heat exchange, (2) provides second phase direct contact with cooling fluid, (3) provides cooling fluid the same as condensable liquid, (4) provides cooling fluid that creates turbulence with multi-port feed, and (5) allows for specific fraction collection on vapor. In one example, primary compensator 136 includes a tube that is about 53 inches (about 134.6 cm) tall. The amount of pressure can be set by adjusting the height of the tube. In one example, there is about 46 inches (about 116.8 cm) of negative water column pressure at primary compensator 136. Further, the vapor enters primary compensator 136 and primary recirculator 138 at about 300° F. (about 149° C.) and exits primary compensator 136 and primary recirculator 138 at about 100° F. (about 38° C.) (at about ambient temperature).

Secondary compensator 140 with its secondary recirculator 142 allow for increased negative pressure vapor removal. Like primary compensator 136, secondary compensator 140 acts as condenser that: (1) provides first phase tube-to-shell heat exchange, (2) provides second phase direct contact with cooling fluid, (3) provides fluid the same as condensable liquid, (4) provides cooling fluid that creates turbulence with multi-port feed, and (5) allows for multiple specific fraction collection on vapor. There is a heat exchange in secondary compensator 140 and secondary recirculator 142. Therefore, vapor enters secondary compensator 140 and secondary recirculator 142 at about 100° F. (about 38° C.) (at about ambient temperature) and exits secondary compensator 140 and secondary recirculator 142 at about 34° F. (about 1.1° C.) or 35° F. (about 1.7° C.). It is important to maintain a temperature above freezing in case there is water present.

Accordingly, the primary compensator 136 and the secondary compensator 140 allow a continuous flow transition of the reactor vapor from positive pressure to negative pressure, acting as a system non-clogging or sticking pressure regulator. At the same time, the compensators act as first stage shell and tube heat exchange condenser and then second stage direct liquid contact heat exchange with similar circulated liquid being condensed. Specific temperature of circulating fluid is maintained with heat exchange to promote collection of desired fraction of vapor. Additional fractions and condensing stages can be achieved by placing multiple compensators in line. Additionally, as consecutive compensators are placed in line, vapor will enter the compensator with negative pressure and, as with primary compensator 136, continuous flow transition will occur but to increased negative pressure while still condensing to desired fraction design temperature. Current systems operate either at positive or negative pressure and do not have the ability to make continuous flow transition. Reactor vapor that has not been condensed to it limits can deposit liquids, tars, and waxes, thereby causing sticking, clogging, and regulator failure.

Using primary compensator 136 and primary recirculator 138 and secondary compensator 140 and secondary recirculator 142, anything that is condensable is condensed so that vapor only moves on to vacuum buffer tank 144. Namely, vapor from secondary recirculator 142 supplies vacuum buffer tank 144. Reactor gas processing systems, such as energy-conversion system 100, are designed for continuous even flow. However, the production of vapor is often irregular and the use of buffering tanks (e.g., vacuum buffer tank 144) helps even the vapor flow and balance of the system.

Vapor then passes from vacuum buffer tank 144 to vacuum pump 148 via regulator 146. Regulator 146 is used to precisely control the vacuum level. In vacuum pump 148, vacuum is generated by a liquid ring compressor. Vacuum pump 148 is used to remove liquid from vapor and to cool gas on the pressure side of the vacuum. In vacuum pump 148, the fluid is chilled by heat exchange. In one example, vacuum pump 148 is a 15 PSI vacuum pump. In vacuum pump 148, the utilization of a liquid ring compressor allows the cooling of gas as it is being compressed. Further, in the event that any tars have made it past the condensing process, diesel can be utilized as circulating cooled liquid for maintaining the integrity of the compressor. The liquid ring compressor of vacuum pump 148 requires constant air circulation. Accordingly, the combination of vacuum buffer tank 144 on the upstream side of vacuum pump 148 and the pressurized syngas buffer tank 150 on the downstream side of vacuum pump 148 provides a control loop for balancing the system.

In energy-conversion system 100, filter-less quenching gas cleanup can be performed using a multi-pass catalytic gas polishing system, such as catalytic scrub 152. For example, catalytic scrub 152 provides a three-pass catalytic scrub operation. Catalytic scrub 152 is used for scrubbing pre-combusted gas, wherein the gas is easier to scrub while still condensed. Catalytic scrub 152 includes a unique vessel (not shown) through which the gas flows. Further, catalytic scrub 152 performs a gas polishing operation that ensures high quality gas in which sulfur, chlorine, and other gas contaminants have been substantially eliminated. Catalytic scrub 152 is a gas polishing system that incorporates a unique concept, in that it is designed to pass the gas through a multiple chambered system utilizing catalysis previously used to scrub or clean post combustion or reaction exhaust gases, yet in catalytic scrub 152 pre-combusted gas is scrubbed. By contrast, conventional gas polishing systems typically flow scrubbed exhaust to atmosphere, not requiring an airtight structure. The polished syngas discharged from catalytic scrub 152 can be supplied to an electricity generator, boiler, heater, and the like. Syngas, or synthesis gas, is a fuel gas mixture consisting primarily of hydrogen, carbon, methane, propane, butane, carbon monoxide, and very often some carbon dioxide.

Further, in energy-conversion system 100, the primary compensator 136 and the secondary compensator 140 in combination with the vacuum buffer tank 144—vacuum pump 148—syngas buffer tank 150 loop is the mechanism used to control the pressure inside reactor 110. For example, this control loop can be used to hold the pressure inside reactor 110 at about 7 inches (about 17.78 cm) of water column.

Energy-conversion system 100 provides an emission free process. Namely, because of the absence of combustion of one or more of the products there is no requirement for stacks and no emissions created or emitted. In addition to the fact there are no emissions, an additional benefit of energy-conversion system 100 is that no loss of energy to the stack is present. By contrast, in conventional energy-conversion systems, a percentage of the energy is created from the feedstock and/or the products, which creates the requirement for heat exchange. Consequently, capturing 100% of that spent energy is next to impossible, which allows a large percentage of the energy to escape with the emissions up the stack to the environment.

Referring now to FIG. 2 is a block diagram of an energy-conversion system 200 that includes a drag conveyor, according to another embodiment of the presently disclosed electric-powered, electric- or catalytically-heated, closed-loop, continuous-feed, endothermic energy-conversion system. Energy-conversion system 200 is substantially the same as energy-conversion system 100 shown in FIG. 1 except that the shaftless auger is replaced with a drag conveyor. Further, the quenching portion of energy-conversion system 200 differs from the quenching portion of energy-conversion system 100.

Like energy-conversion system 100 shown in FIG. 1, energy-conversion system 200 is a closed-loop system that (1) eliminates substantially all emissions and effluents; (2) recovers substantially all residual carbon, metals, minerals, and nutrients for beneficial reuse; (3) reuses residual/waste heat; and (4) eliminates parasitic loss of potential energy.

Energy-conversion system 200 includes controller 105. Energy-conversion system 200 also includes a reactor 210, also known as a conversion chamber or conversion reactor. Reactor 210 is an electrically controlled and electrically- or catalytically-heated reactor. Reactor 210 is a channel that is equipped with multi-zoned electric heat (e.g., multi-zone heater 114). Namely, reactor 210 is enclosed within multi-zone heater 114. Further, reactor 210 in not limited to electric heat only. In another example, reactor 210 can be a catalytically-heated reactor.

In one example, reactor 210 is a channel that is about 54 inches (about 137.1 cm) wide, about 7 inches (about 17.78 cm) high, and about 75 feet (about 22.8 meters) long making multiple passes. However, reactor 210 can be any dimensions. Namely, the length of reactor 210 may be determined by the amount of residence time needed in the system. Further, reactor 210 can be formed, for example, of carbon steel, stainless steel, or specialized alloys, such as, but not limited to, selected Inconel alloys. The system configuration of energy-conversion system 200 is particularly well suited for processing a homogenous feedstock, such as manure or coal.

Further, instead of shaftless auger 112 shown in FIG. 1, a drag conveyor 212 is installed in reactor 210 for moving the feedstock. A drag conveyor (aka chain conveyor) is a conveyor in which an endless chain, having wide links carrying projections or wings, is dragged through a trough into which the material to be conveyed is fed. A drag conveyor is generally used for moving loose material. In energy-conversion system 200, drag conveyor 212 is used to carry feedstock through reactor 210. In reactor 210, drag conveyor 212 may be used to: (1) provide a large surface area for maximum thermal conduction (i.e., collectively, the links of the chain provide a large heated surface area), (2) allow for an adjustable bed depth of feedstock, and (3) minimize the drive horsepower requirement for conveyance. Using, for example, manure feedstock in reactor 210, the feedstock bed depth on drag conveyor 212 for optimal heat transfer (optimal cooking) is from about 4 inches (about 10.16 cm) to about 7 inches (about 17.78 cm) in one example, or is about 4.5 inches (about 11.43 cm) in another example.

Drag conveyor 212 may also be used for scouring the inside surfaces with flight design, which: (1) maximizes thermal conduction by minimizing material deposits, and (2) minimizes rotational balling of material. The components of drag conveyor 212 can be formed of specialized alloys, such as, but not limited to, selected Inconel alloys. The use of the specialized alloys (1) prevent galling of similar metals with direct contact, (2) prevent chlorine migration and hydrogen embrittlement, and (3) eliminate differential creep rate by controlling take up of the drag chain conveyor. However, in other embodiments, the components of drag conveyor 212 can be formed of carbon steel or stainless steel.

In energy-conversion system 200 and using drag conveyor 212, feedstock can be conveyed through reactor 210 at high temperature if dissimilar metals are utilized for all contact surfaces including chain pins, links, flights, and sprockets. The thermal creep growth can be addressed using automatic tensioners on one end of drag conveyor 212. A multi-pass drag chain allows for feedstock advancement in both or opposing directions on the same chain and creates the opportunity for prolonged residence time, rotation, turning, and stirring of feedstock. Certain feedstocks can experience a balling effect when conveyed using an auger, making uniform exposure to heat energy impossible. However, using drag conveyor 212, the feedstock bed depth can be adjusted to ensure uniform exposure without rotation, thereby eliminating the balling effect. In conventional energy-conversion systems, drag chain conveyors have not been utilized due to galling and system airtight structure limits caused by pressure or vacuum.

Energy-conversion system 200 may also include the scale 116, mixer 118, feedstock hopper metering stage 120, in-feed sensors 122, and airlock 124, wherein the scale 116, mixer 118, feedstock hopper metering stage 120, in-feed sensors 122, and airlock 124 are used for processing the feedstock (or in-feed) that supplies the inlet of reactor 210. The outlet of airlock 124 supplies the inlet of reactor 210.

Also different from energy-conversion system 100, feedstock hopper metering stage 120 of energy-conversion system 200 features auger-less in-feed metering; namely, a multi-metered, drag conveyor-based in-feed mechanism that includes a dryer. Conventional systems rely on batch feeding or auger-driven in-feeds. Generally, systems are challenged either by inconsistent characteristics of feedstock and/or extremely difficult calculations to maintain an equal and consistent feed rate as moisture, surface tension, density, temperature, and pressure are all variables. A non-consistent feed rate can translate to inefficient, inconsistent, incomplete and/or over exposure to the heating and conversion process of the feedstock. To mitigate these drawbacks, feedstock hopper metering stage 120 of energy-conversion system 200 provides the multi-metered, drag conveyor-based in-feed that creates a uniform feedstock depth and width that maintains a balanced relationship to the heat-source throughout the conveyance process. The feedstock is subjected to metering at the dryer and prior to entering reactor 210 to ensure uniform and predictable bed depth. The customized dryer drag conveyer advances the uniformly shaped feedstock into a hot oil and steric acid mixture or similar oil/acid mixture, high-temperature fluid bath (HTFB) 126 of airlock 124. Further, the dewatering airtight drag conveyor delivers the feedstock to the drag conveyor 212 in reactor 210.

Rather than using a conical auger, airlock 124 of energy-conversion system 200 includes the steric acid HTFB 126. Steric acid HTFB 126 can be used to displace air without a vacuum pump or the addition of inert gas. Namely, using steric acid HTFB 126, the air in the feedstock is displaced with oil. The addition of steric acid to the HTFB accelerates and intensifies the moisture flash-off, which increases the de-polymerization of complex hydrocarbons and minimizes the formation of tars and heavy oils. The hot oil, steric acid mixture HTFB 126 may be used to: (1) increase the density of feedstock without mechanical interaction, (2) create an airlock without need for valves or slide-gates, (3) eliminate any remaining moisture from feedstock, (4) increase the exposed surface area of the feedstock, and (5) maximize the heat transfer rate in reactor 210. Further, convention airlocks often include a negative-pressure vessel, which is a safety hazard and a historic point of failure. By contrast, hot oil, steric acid mixture HTFB 126 does not require a negative-pressure vessel and therefore the safety hazard and historic point of failure is eliminated.

In conventional reactor based conversion systems, feedstock moisture removal has always been a challenge and often the fatal flaw. However, using steric acid HTFB 126, the "combustion-less flash-off" of all remaining moisture dramatically reduces both the time and the energy required to dry the feedstock, which in-turn dramatically improves the energy balance and the economics. The steric acid also promotes the conversion of problematic tars and waxes into lighter, smaller carbon chains.

Airlock 124 eliminates all moving parts as feedstock is subjected to the hot liquid bath (of steric acid HTFB 126) displacing all air, flashing off all remaining moisture, and allowing delivery to a dewatering conveyor of feedstock hopper metering stage 120. Feedstock is advanced past the liquid barrier on the dewatering conveyor, which is an airlock secondary metering device. The passive airlock system of airlock 124 also creates a built-in pressure relief system for reactor 210. Further, the exhaust heat from the backend electricity generator can be cycled back to feedstock hopper metering stage 120 and/or airlock 124 and used for drying.

In summary with respect to feedstock hopper metering stage 120 and airlock 124, manure feedstock, for example, becomes fluffy and fibrous when dried, and full of air. Air is an insulator and prevents the feedstock from heating. Accordingly, using feedstock hopper metering stage 120 and airlock 124, (1) the manure feedstock becomes saturated with oil (e.g., mineral oil), which displaces the air and provides a medium that absorbs heat readily; (2) the density of the feedstock material entering reactor 210 is increased; and (3) the manure feedstock that is saturated with oil maximizes the contact ratio to the heating mechanism (e.g., multi-zone heater 114) in reactor 210 (i.e., maximizes heat transfer rate between heater and feedstock). A further benefit of having oil in the feedstock is that the latent energy required to drive out oil is about less than 95 BTU/pound. By contrast, the latent energy required to drive out water is much greater at about 950 BTU/pound.

Additionally, in energy-conversion system 200, rather than allowing the gas to exit the reactor to a separate quenching stage as described in FIG. 1, a gas collection system is provided at a certain portion along reactor 210. The gas collection system supplies a multi-zone quench station 214 that is integrated directly into reactor 210. The presence of multi-zone quench station 214 eliminates the need for automated plunging system 128. Multi-zone quench station 214 along with a quench oil (Q-oil) filter 216 and an oil preheat stage 218 provides a closed-loop arrangement wherein a quantity of circulating oil 220 is circulated therethrough. Circulating oil 220 can be, for example, mineral oil or diesel fuel. Together, multi-zone quench station 214, Q-oil filter 216, oil preheat stage 218, and circulating oil 220 provide a recirculating filtered hot oil quenching system that is used to remove any particulate prior to condensing. For example, circulating oil 220 is circulated through multi-zone quench station 214, then through Q-oil filter 216, then through oil preheat stage 218, then returning to multi-zone quench station 214. Q-oil filter 216 is a commercially available continuous self-cleaning hot oil filter. The solids that accumulate in Q-oil filter 216 can be fed back into the feedstock (or in-feed) and processed through reactor 210.

Using multi-zone quench station 214, hot circulating oil 220 is recirculated back onto the gas in reactor 210 at about 300° F. (about 149° C.), wherein oil preheat stage 218 is used to preheat circulating oil 220 to the critical temperature for quenching, which is typically about 300° F. (about 149° C.). In so doing, the gas is cooled to about 300° F. (about 149° C.). Some portion of the cooled gas condenses and the liquid recirculates. However, the lighter gases above about 300° F. (about 149° C.) that do not condense will pass onto the arrangement of primary compensator 136, primary recirculator 138, secondary compensator 140, secondary recirculator 142, vacuum buffer tank 144, regulator 146, vacuum pump 148, syngas buffer tank 150, and catalytic scrub 152 as described with reference to energy-conversion system 100 of FIG. 1. Again, reactor 210 will be held at about 7 inches (about 17.78 cm) of water column pressure. Again, in energy-conversion system 200 there is a transition from a positive pressure system to a negative pressure system. Further, char 160 is discharged from one or more outlets of reactor 210.

Referring now to FIG. 3 is a block diagram of an energy-conversion system 300 that includes a distillation and/or fractionating stage, according to yet another embodiment of the presently disclosed electric-powered, electric- or catalytically-heated, closed-loop, continuous-feed, endothermic energy-conversion system. Energy-conversion system 300 is substantially the same as energy-conversion system 200 of FIG. 2 except that it additionally includes an atmospheric fractionating unit 230. Further, crude oil 220 is used for the circulating oil in the multi-zone quench station 214.

In pyrolysis, which is a thermochemical decomposition of organic material at elevated temperatures in the absence of oxygen (or any halogen), there is always the generation of char, liquid, and syngas. However, coal feedstock produces a larger liquid and syngas fraction than, for example, manure feedstock. The liquid fraction is needed to produce, for example, gasoline, diesel, and/or asphalt. Accordingly, energy-conversion system 300 that includes the distillation and/or fractionating stage is particularly well suited for processing coal feedstock.

In order to process the liquid fraction, energy-conversion system 300 will typically include optional equipment to dilute the heavier liquids resulting from some feedstocks. Accordingly, energy-conversion system 300 includes the optional atmospheric fractionating unit 230 that further includes a heavy oil fractionation process 232 and a gas-fired or catalytically-heated re-boiler 234. Further, diesel generated using heavy oil fractionation process 232 is discharged to diesel storage 236. Likewise, asphalt generated using heavy oil fractionation process 232 is discharged to asphalt storage 238.

Additionally, to support atmospheric fractionating unit 230, energy-conversion system 300 must provide a supply of additional diluting or cutting oil, such as crude oil 220. Further, in energy-conversion system 300, if oil or gasoline is to be generated, the gasoline fraction is processed through the compensators (e.g., primary compensator 136 and secondary compensator 140,) while the diesel and heavy oils remain in the circulating oil. Additional separation can also occur through atmospheric fractionating unit 230. Namely, in energy-conversion system 300, crude oil 220 is used as the circulating oil for multi-zone quench station 214. In multi-zone quench station 214, oil preheat stage 218 is used to preheat crude oil 220 to the critical temperature for quenching, which is typically about 300° F. (about 149° C.). In reactor 210, as quenching occurs, vapor is also created, wherein the lighter gases above about 300° F. (about 149° C.) that do not condense will pass onto primary compensator 136. Namely, the gasoline and other light fractions are taken out of the crude oil. The gasoline and light fractions to pass through reactor 210 and are passed on to the arrangement of primary compensator 136, primary recirculator 138, secondary compensator 140, secondary recirculator 142, vacuum buffer tank 144, regulator 146, vacuum pump 148, and syngas buffer tank 150, which supplies the gas-fired or catalytically-heated re-boiler 234. In so doing, the gasoline and other light fractions are condensed and discharged to, for example, gasoline storage 240 and other storage 242 (e.g., water storage), wherein the gasoline and other light fractions can be sold. Additionally, if stripping gas is required for fractionating, it can be blended with syngas and utilized in the gas-fired or catalytically-heated re-boiler 234.

In energy-conversion system 300, a portion (about half) of the crude oil 220 circulating through multi-zone quench station 214 is pulled off downstream of Q-oil filter 216 and supplied to the atmospheric fractionating unit 230 or any typical refining or fractionation system. Heavy oil fractionation process 232 of atmospheric fractionating unit 230 is used to fractionate the oil using the syngas from syngas buffer tank 150 and the gas-fired or catalytically-heated re-boiler 234. Heavy oil fractionation process 232 is used to break down the crude oil 220 to a diesel fraction and asphalt fraction, wherein the light fractions that typically come off a refinery are recaptured into reactor 210. This allows the pressure in a fractionation tower to be maintained to the same 7 inches (17.78 cm) of water column pressure that is in reactor 210. In heavy oil fractionation process 232, the light fractions are condensed and scrubbed. The gas, after it has been scrubbed, can be utilized in heavy oil fractionation process 232 as gas energy that is needed to reheat the heavy oil fraction. Namely, heating to about 700° F. (about 371° C.), which allows separation into diesel and asphalt fractions.

Typical large-scale refineries operate under high temperatures and very high pressure (many times atmospheric pressure) in the fractionation process. As a result, large-scale refineries include high temperature processes and ultra-high pressure vessels that are highly regulated. By contrast, a main benefit of energy-conversion system 300 is that atmospheric fractionating unit 230 operates at low temperature and at atmospheric pressure, wherein any vessels are not highly pressurized and therefore are not typically subject to regulatory compliance. Namely, atmospheric fractionating unit 230 is called "atmospheric" because it operates at or below atmospheric pressure, not at high pressure or ultra-high pressure.

Further, in a gas-fired re-boiler much of the heat and most of the pollutants are lost up the stack. However, with respect to processing the gas through a catalytically-heated re-boiler (e.g., catalytically-heated re-boiler 234), the primary byproducts are carbon dioxide ($CO_2$) and water ($H_2O$), which can be recaptured and thereby eliminating the requirement for a stack. The dioxide ($CO_2$) and water ($H_2O$) can be easily re-purposed for hydroponics, aquaculture, green houses, algae beds, and similar sustainable food initiatives. In aggregate, the environmental efficiency (decreased pollution/increased recycling) of the catalytic conversion system is far superior to that of the gas-fired alternative In summary, energy-conversion system 300 provides a process of commoditized natural resource recovery and refining. Namely, the un-gasified feedstock residual will consist of both a liquid fraction and a solid carbon char. The liquid fraction will resemble crude oil, which can be further refined into gasoline, diesel fuel, or naphtha based on end-user specification. The solids fraction will be a carbon char that can prescriptively bond to and/or chelate any commoditized natural resources present in the feedstock, such as nitrogen, phosphorus, zinc, manganese, magnesium. The resulting char can then be re-formatted for beneficial reuse as a soil amendment, or due to its pathogen-free, medical residual-free status, as a high-end animal feed supplement. Further, energy-conversion system 300 features integration of selective fractional condensing. Namely, through a series of quenchings with a proprietary combination of circulating fluids, and the utilization of compensators at critical temperatures ranges, the liquid fraction of the processed feedstock can yield fractionated products including, but not limited to, gasoline, diesel, heavy fuel oil, asphaltenes, and lubricants which can be stored on-site in tanks or transported off-site by truck, rail, or pipeline.

Figure 4:
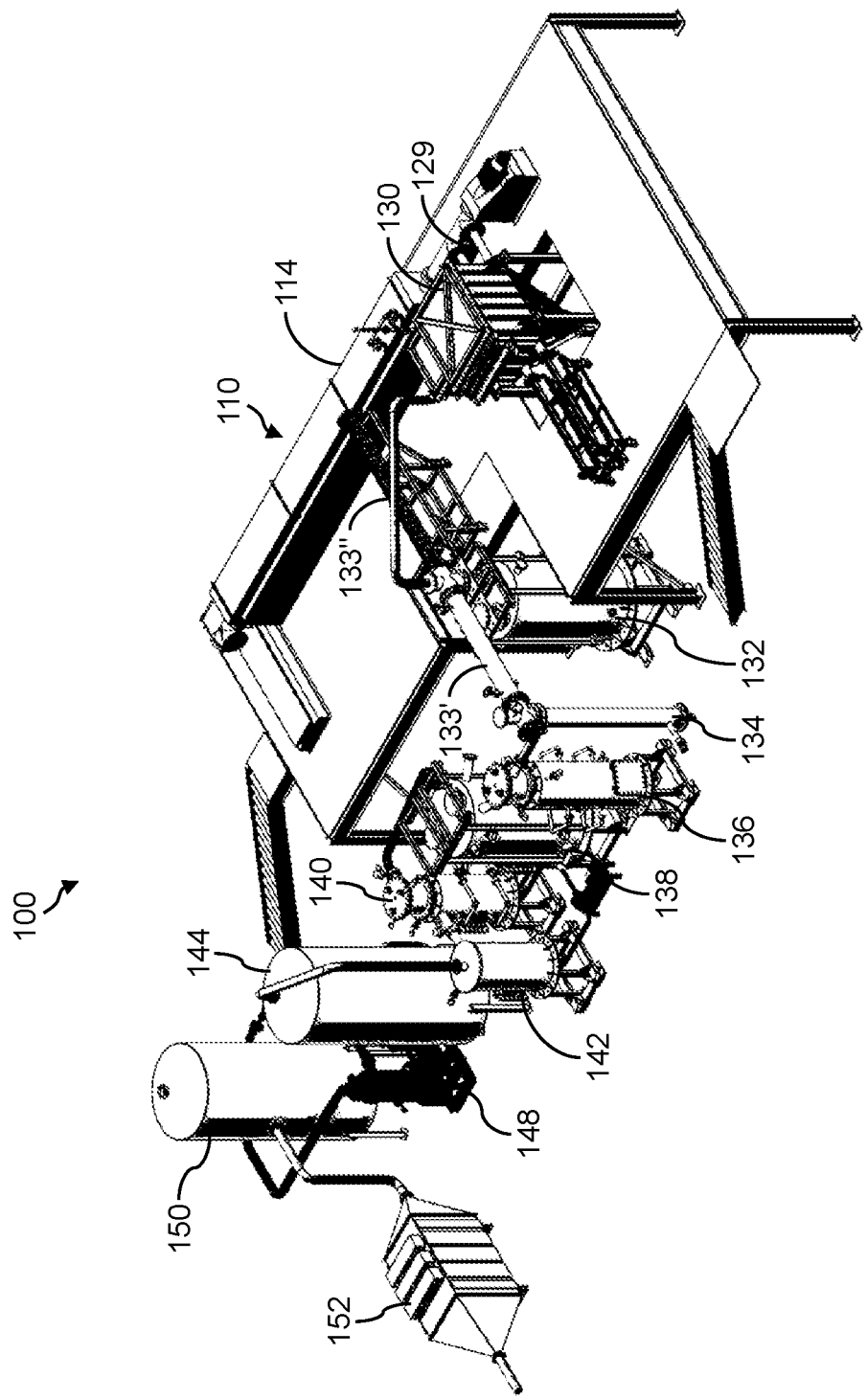
Figure 5:
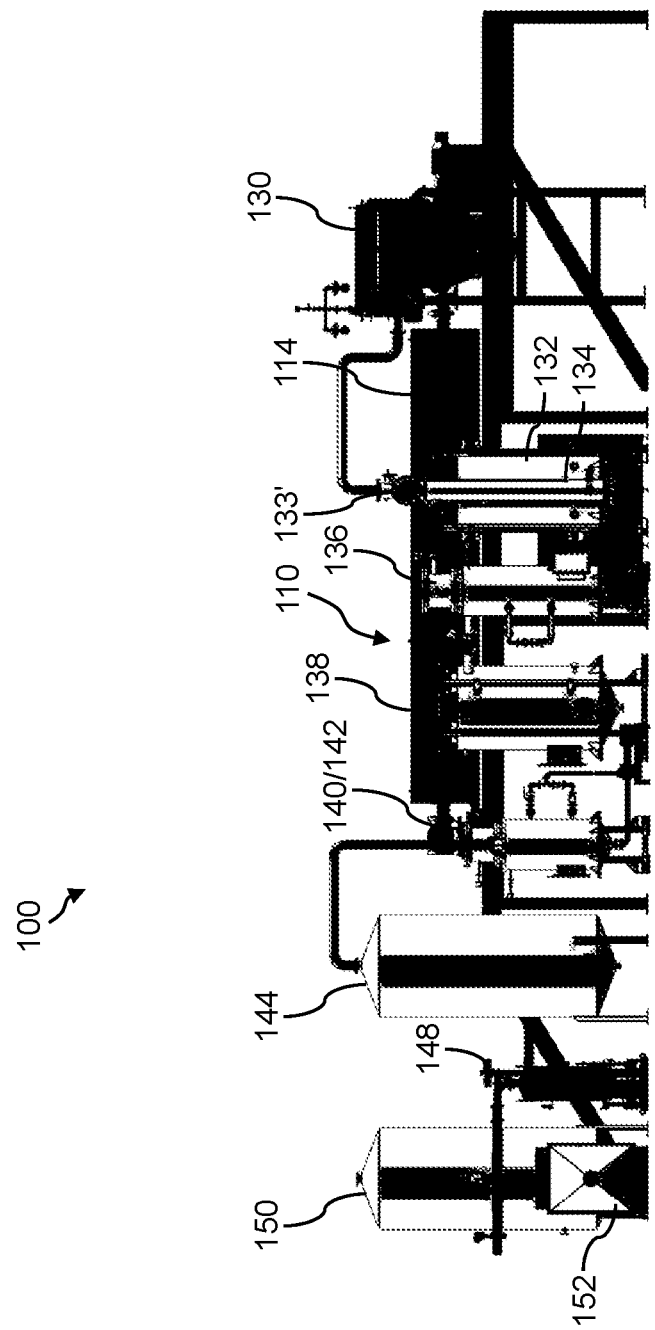
Figure 6:
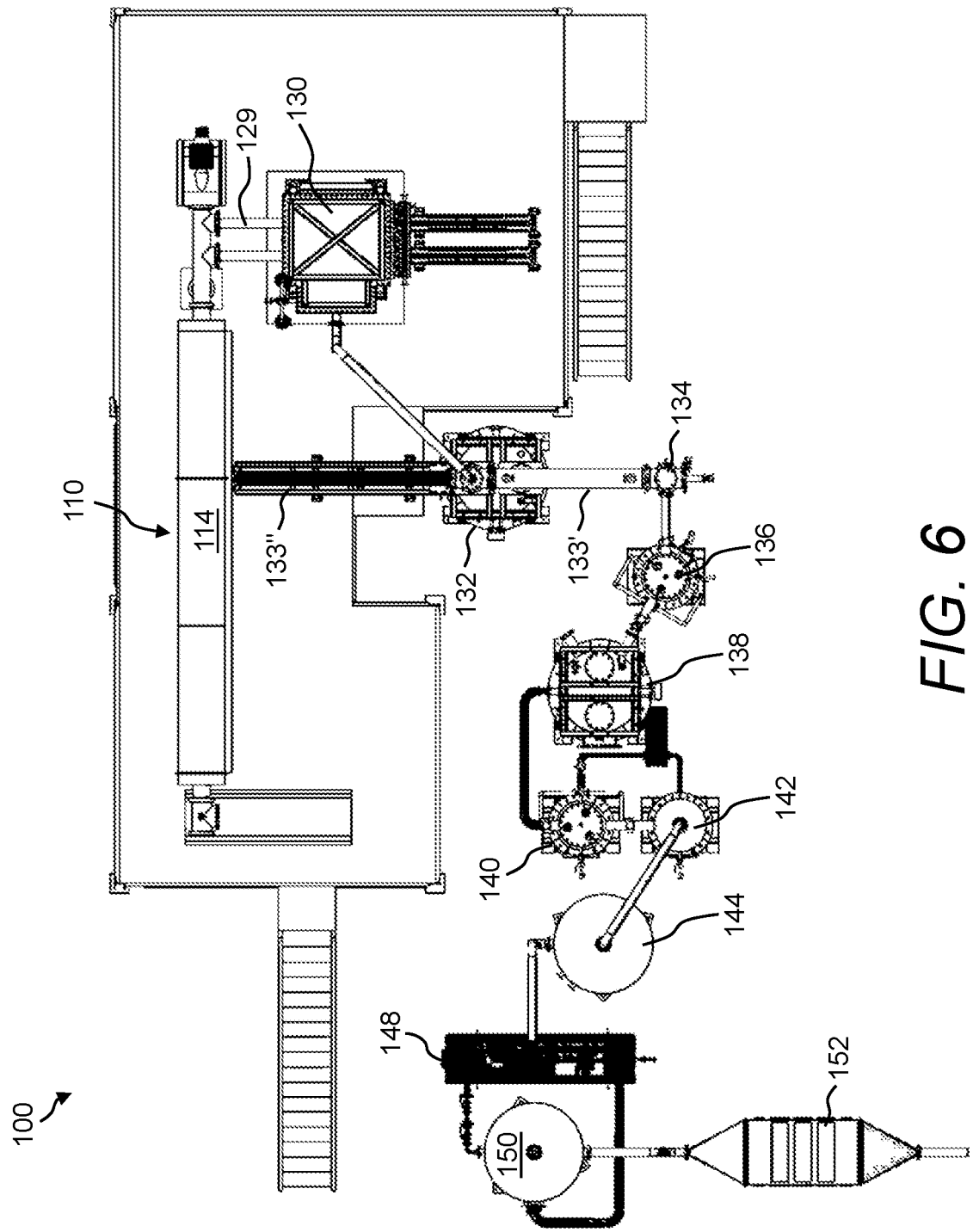
Figure 7:
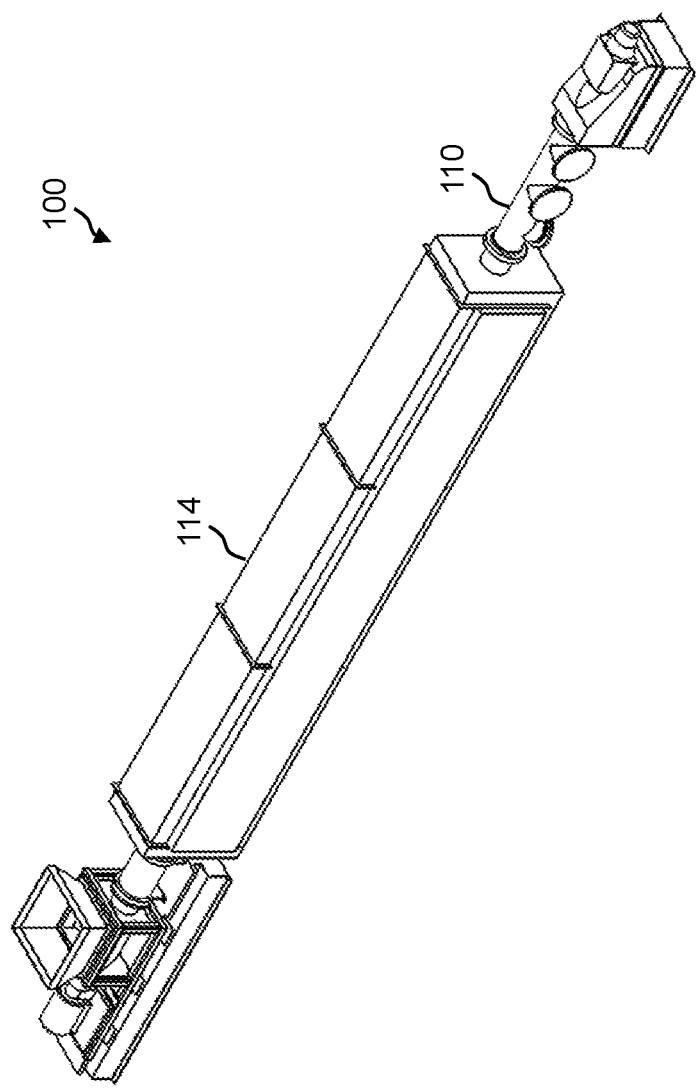
Figure 8:
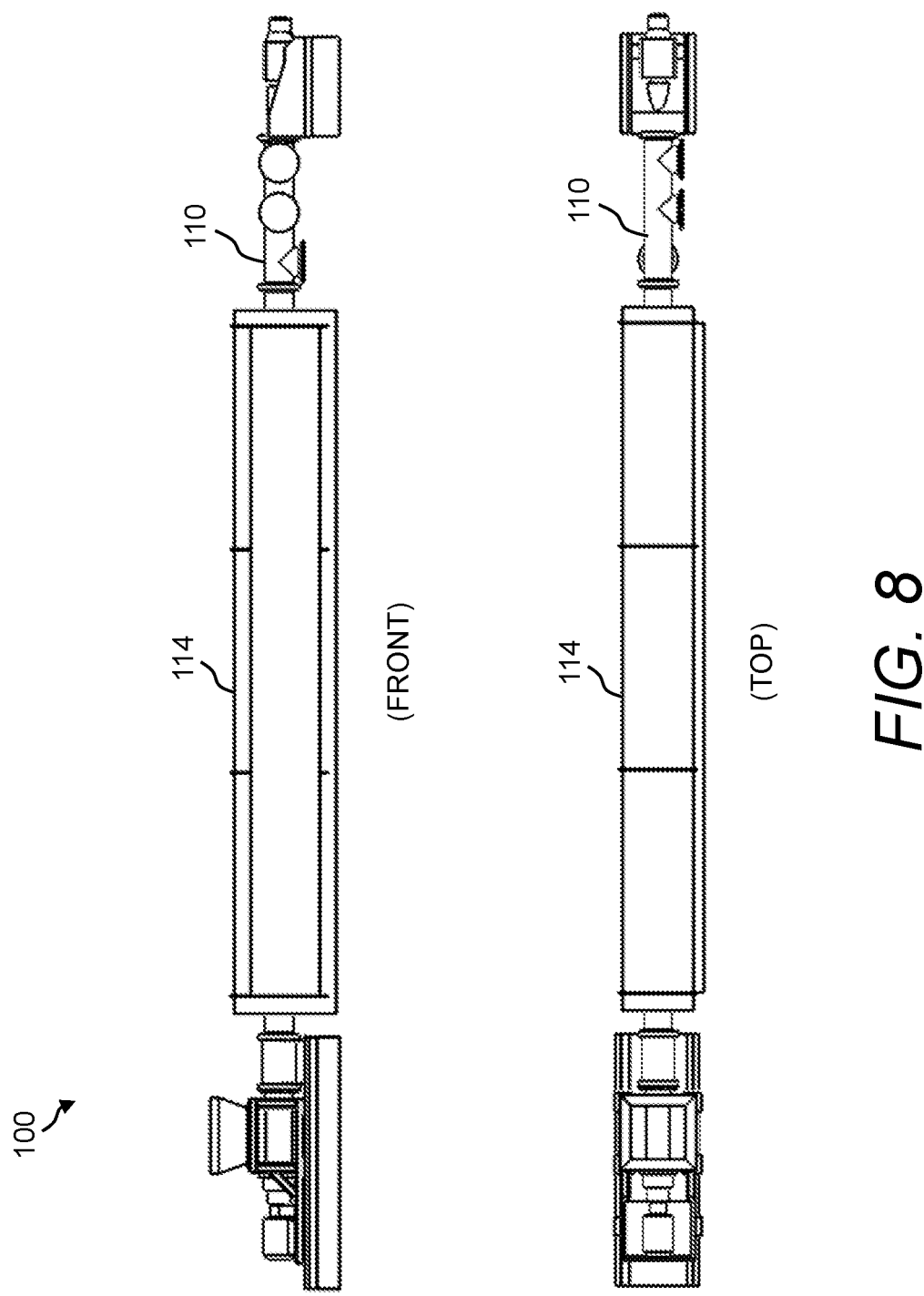
Figure 9:
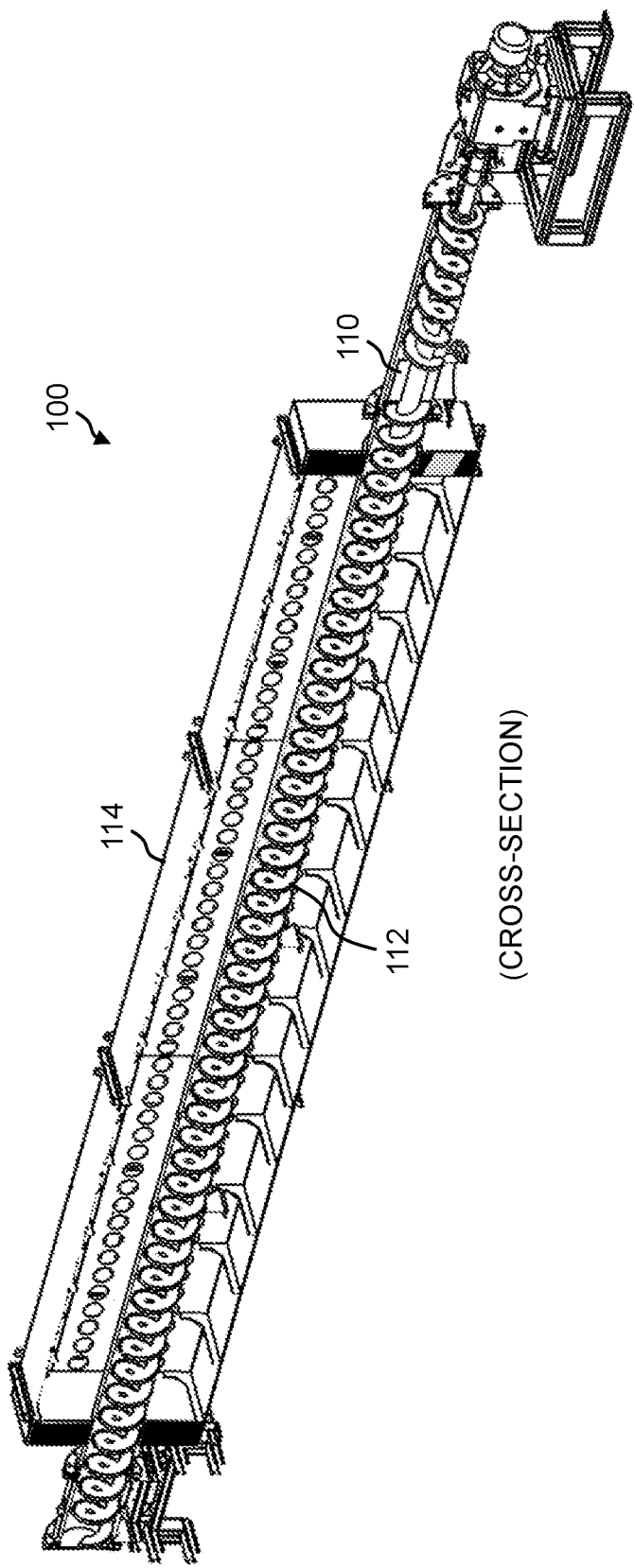
Figure 10:
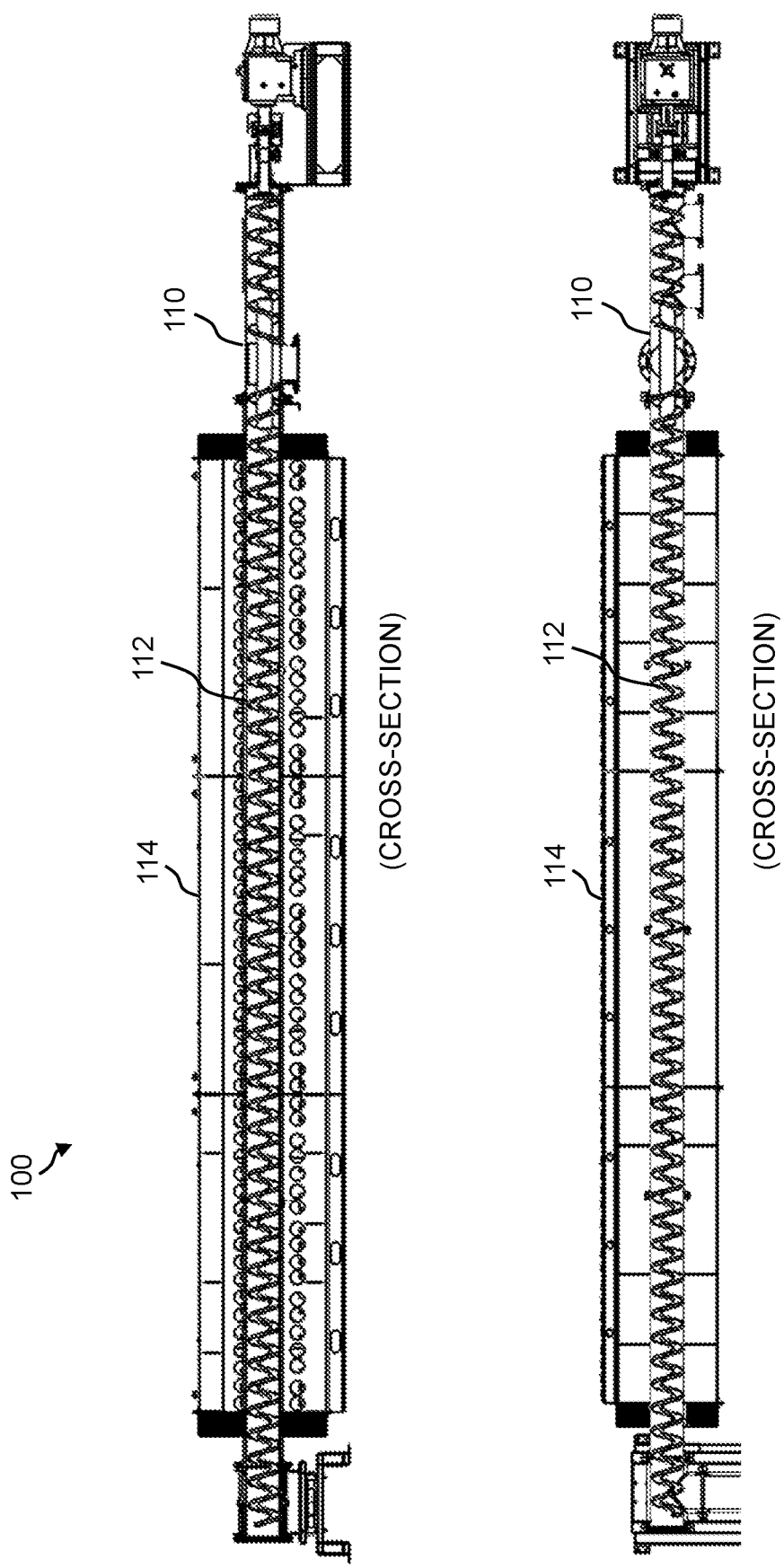
Figure 11:
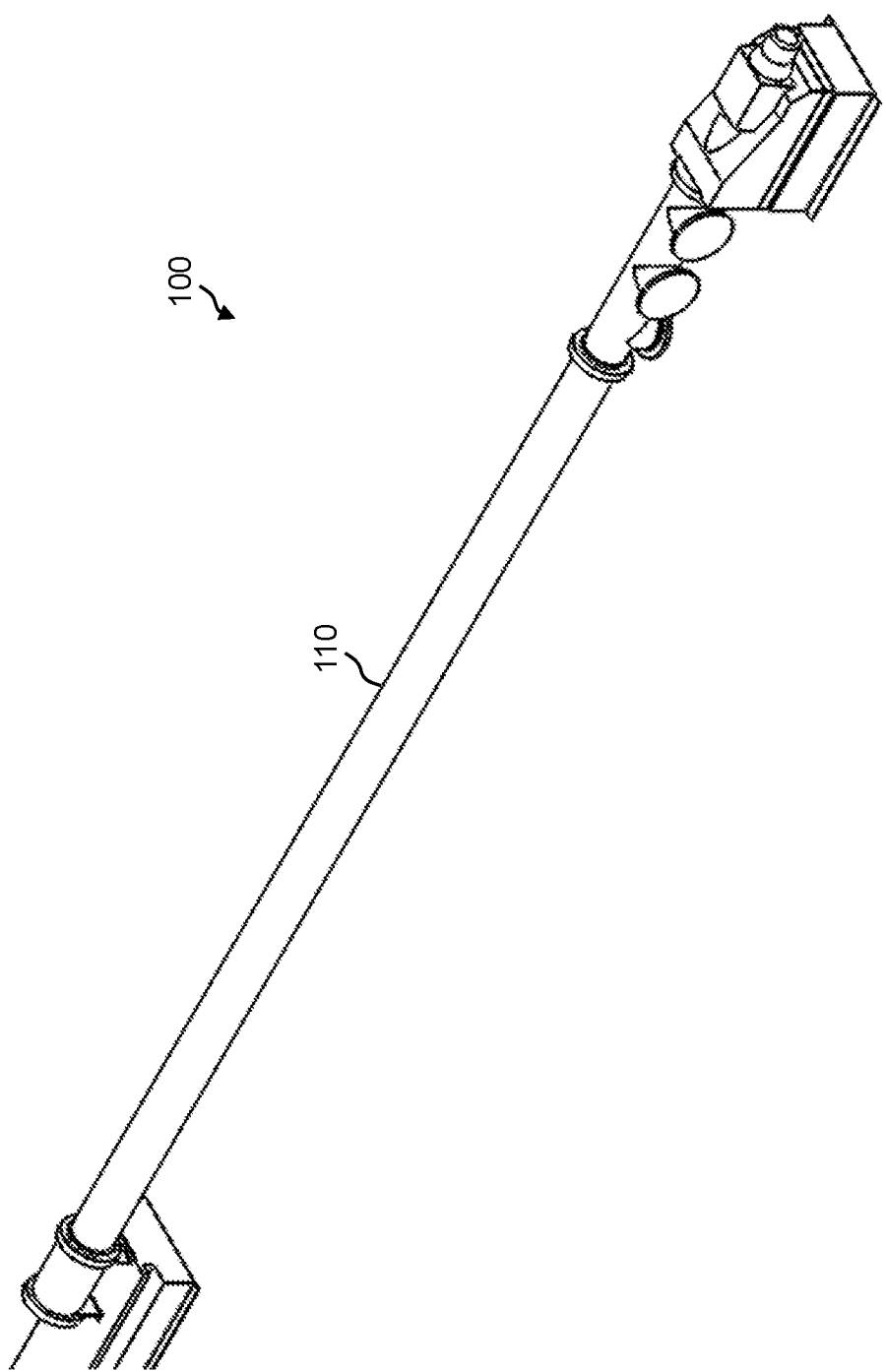
Figure 12:
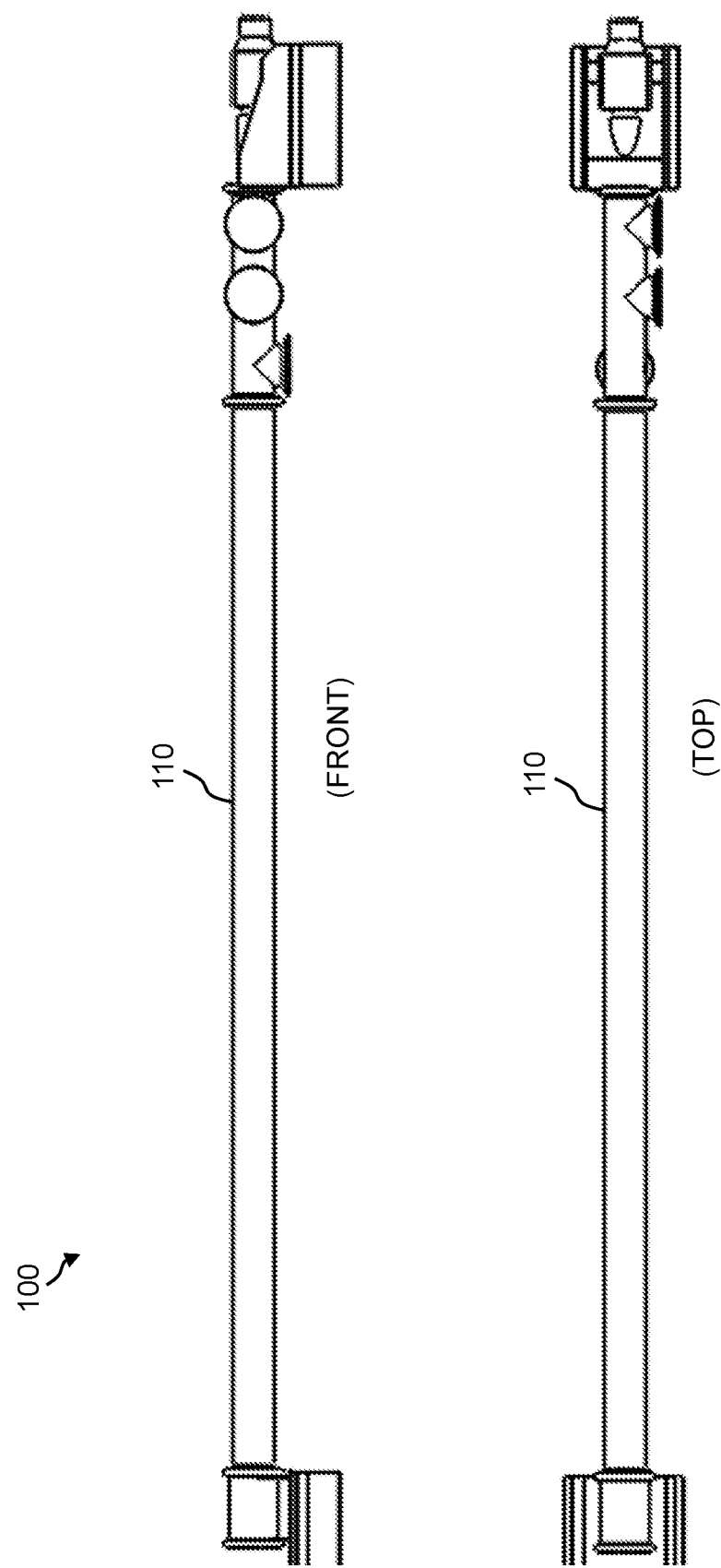
Figure 13:
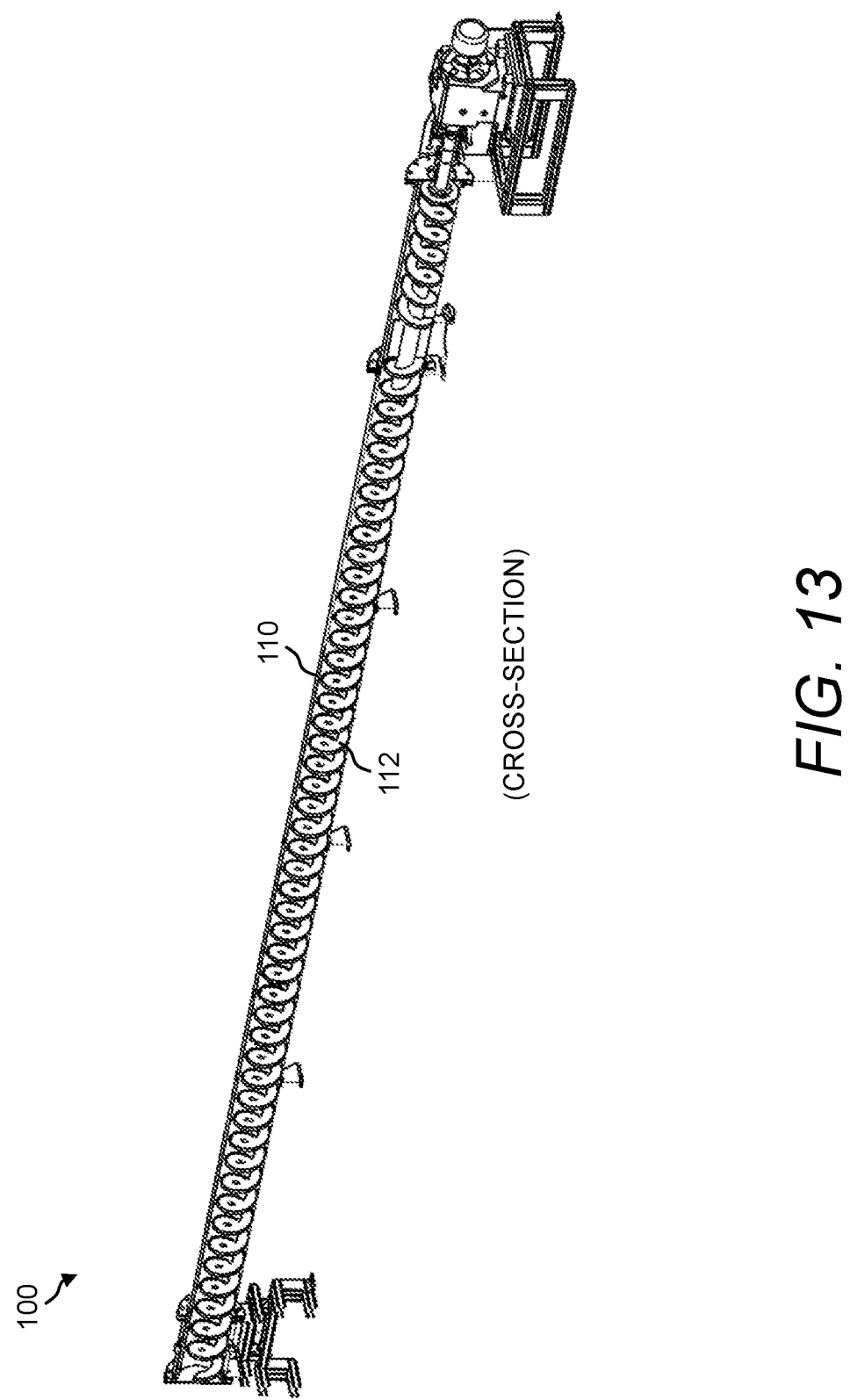
Figure 14:
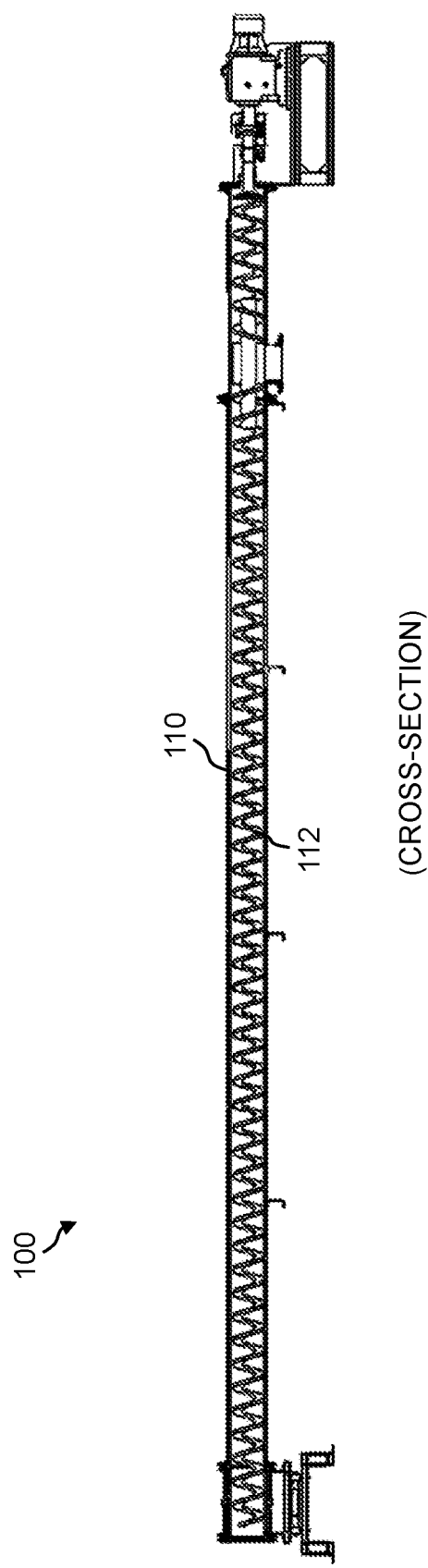
Figure 15:
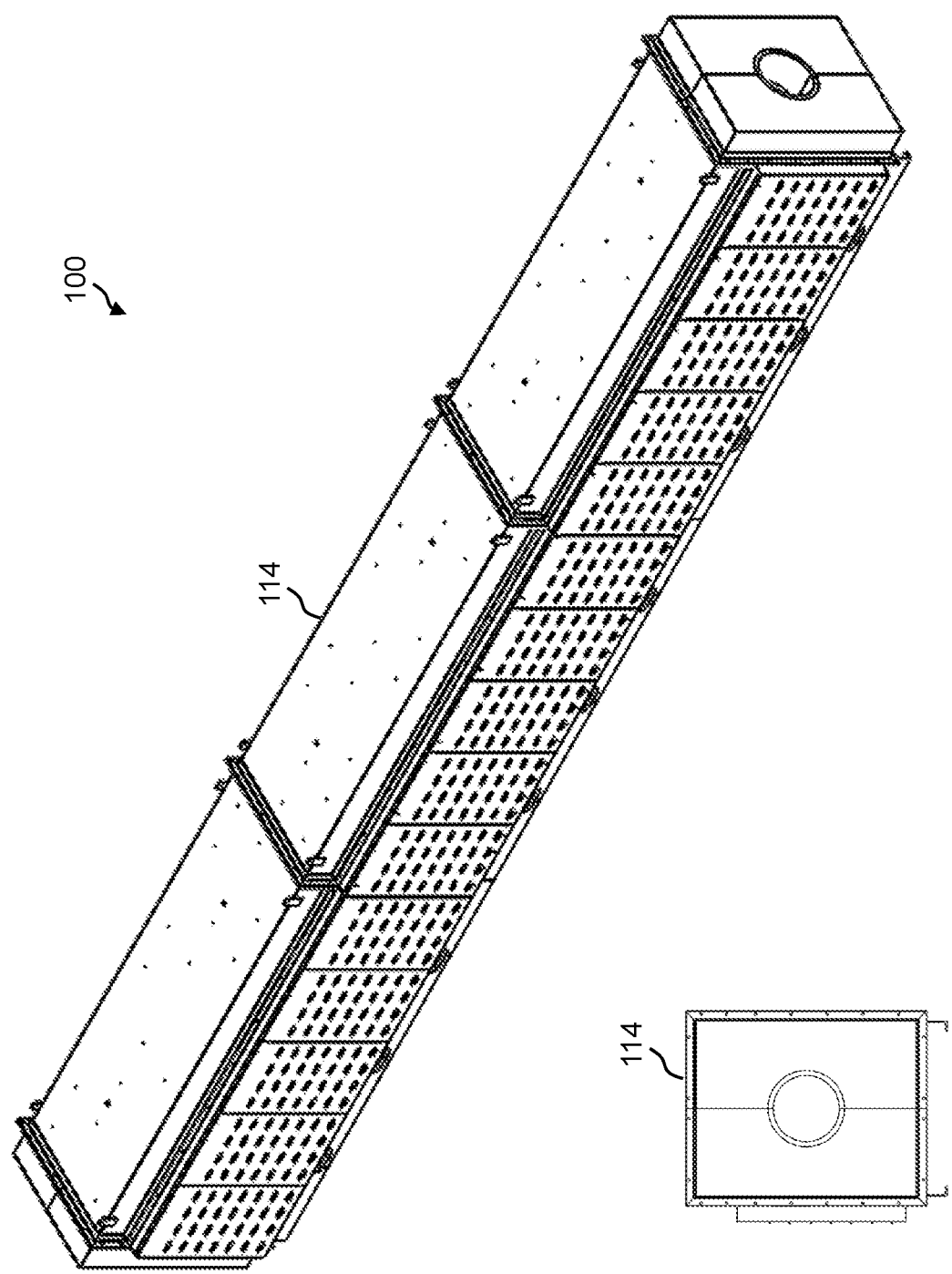
Figure 16:
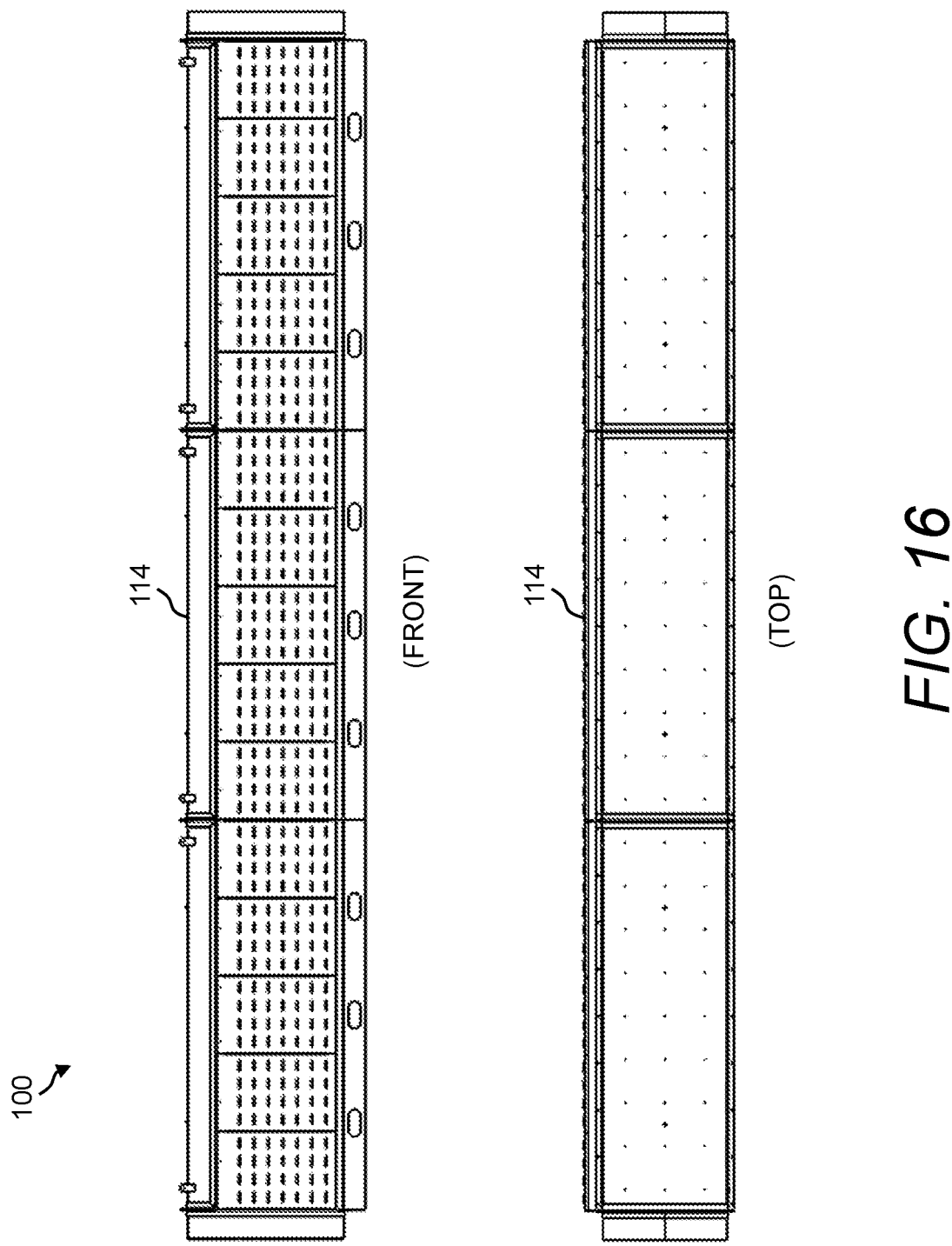

FIG. 4 through FIG. 25 show various views of one example instantiation of the shaftless auger-based energy-conversion system 100 shown in FIG. 1. Namely, FIG. 4, FIG. 5, and FIG. 6 show an isometric view, a side view, and a top down view, respectively, of energy-conversion system 100 in its entirety. FIG. 7 through FIG. 25 show various portions of the shaftless auger-based energy-conversion system 100 shown in FIG. 1. For example, FIG. 7 shows an isometric view and FIG. 8 shows a front view and a top down view of the reactor 110 and multi-zone heater 114 portion of energy-conversion system 100. FIG. 9 and FIG. 10 show various cross-sectional views of the reactor 110 and multi-zone heater 114—portion of energy-conversion system 100 and now showing shaftless auger 112. FIG. 11 shows an isometric view and FIG. 12 shows a front view and a top down view of the reactor 110—portion of energy-conversion system 100. FIG. 13 and FIG. 14 show cross-sectional views of the reactor 110—portion of energy-conversion system 100 and now showing shaftless auger 112. FIG. 15 shows an isometric view and an end view of the multi-zone heater 114—portion of energy-conversion system 100. FIG. 16 shows a front view and a top down view of the multi-zone heater 114—portion of energy-conversion system 100.

Figure 17:
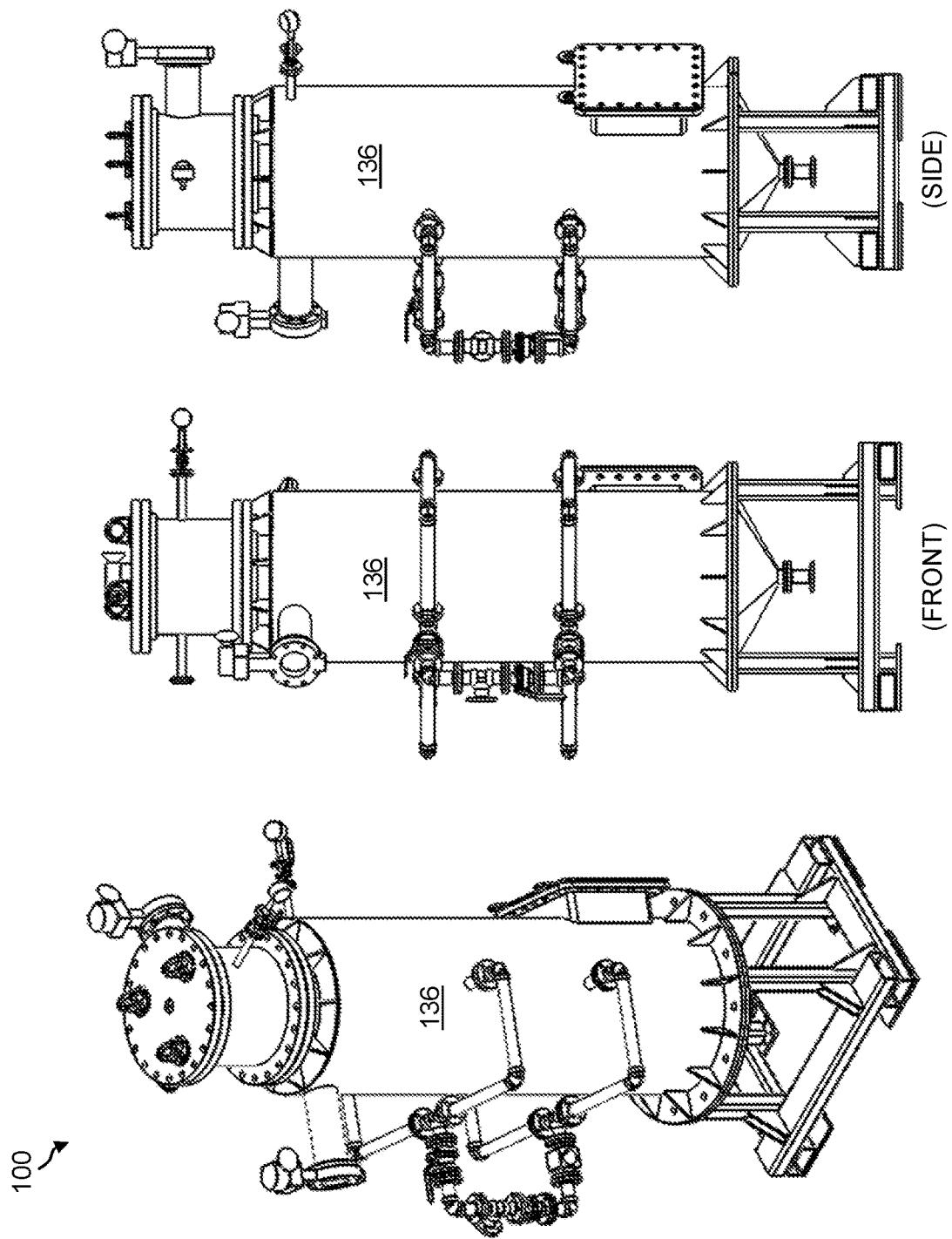
Figure 18:
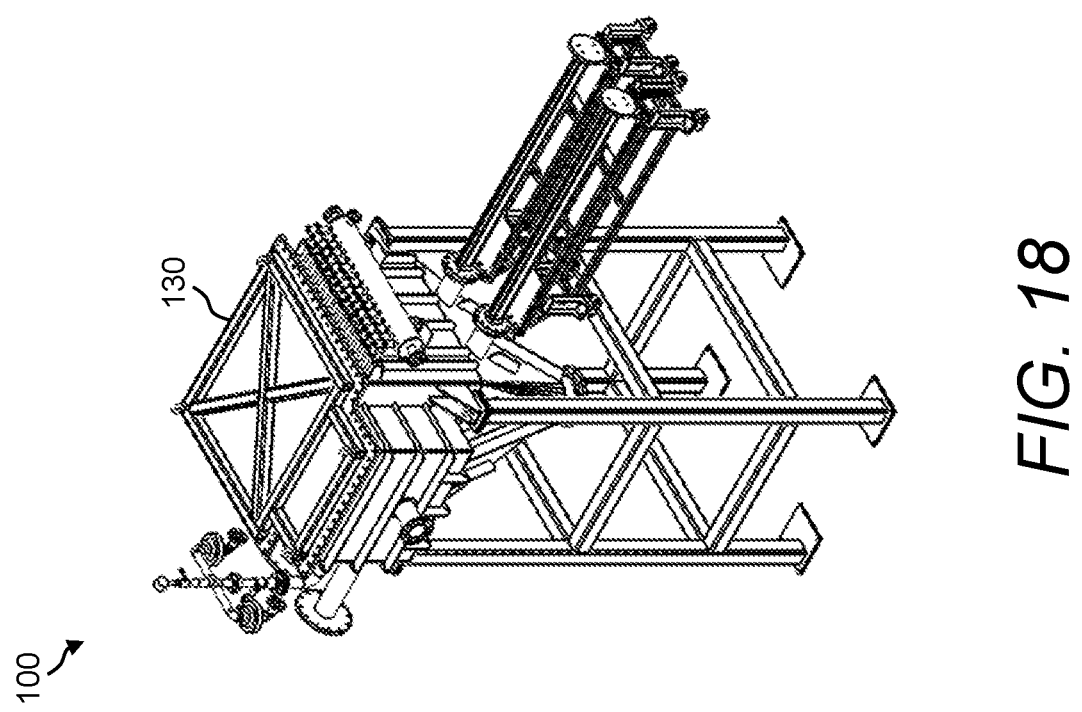
Figure 19:
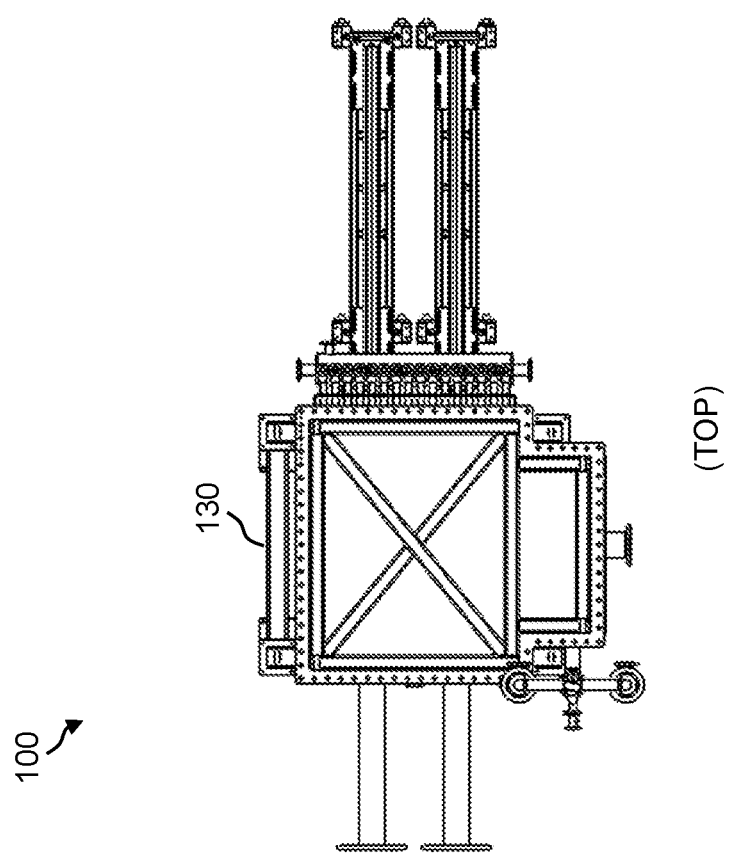
Figure 21:
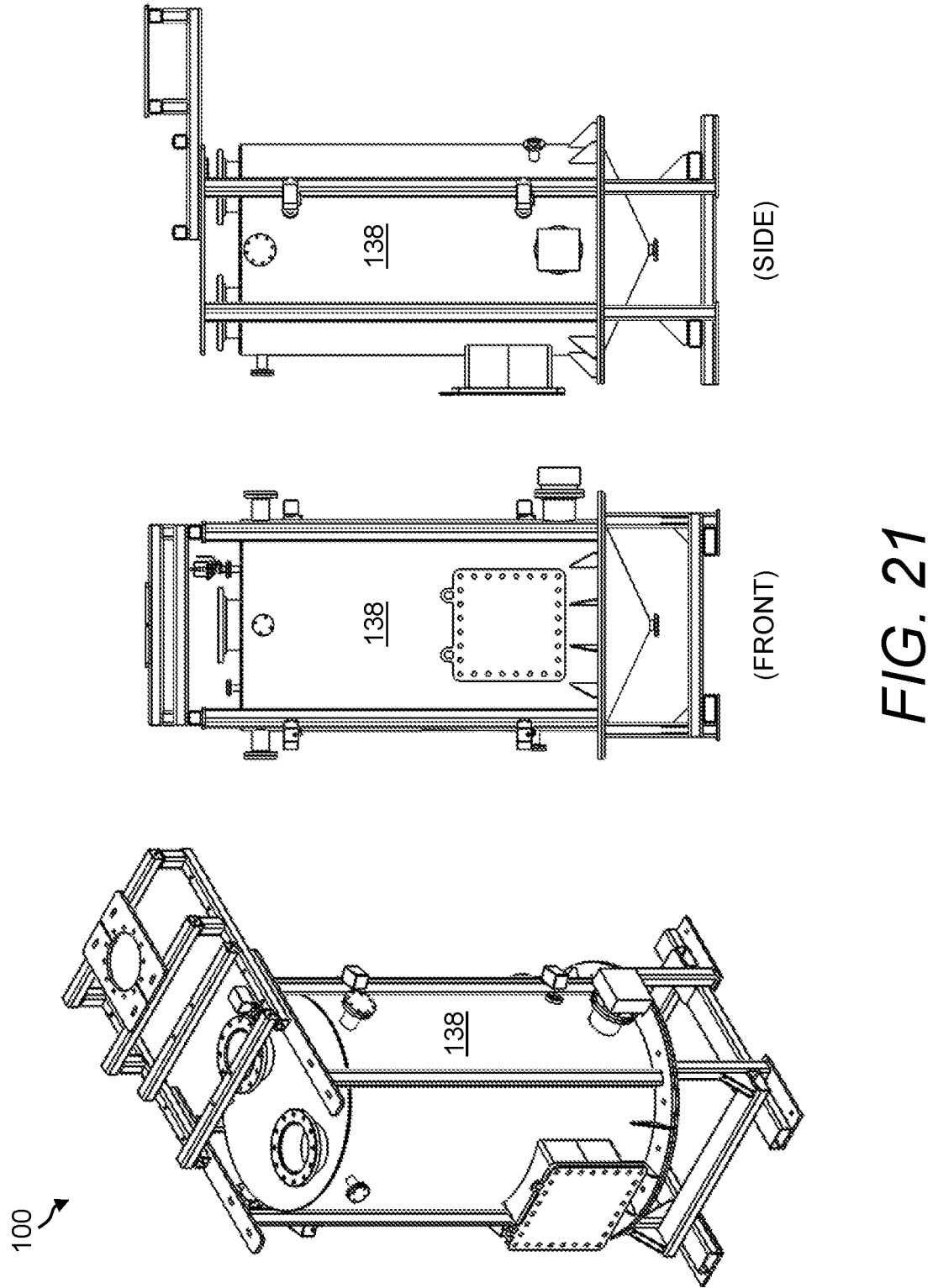

FIG. 17 shows an isometric view, a front view, and a side view of the primary compensator 136—portion of energy-conversion system 100. FIG. 18 shows an isometric view, FIG. 19 shows a top down view, and FIG. 20 shows a front view and a side view of the ceramic hot gas filter 130—portion of energy-conversion system 100. FIG. 21 shows an isometric view, a front view, and a side view of the primary recirculator 138—portion of energy-conversion system 100.

Figure 22:
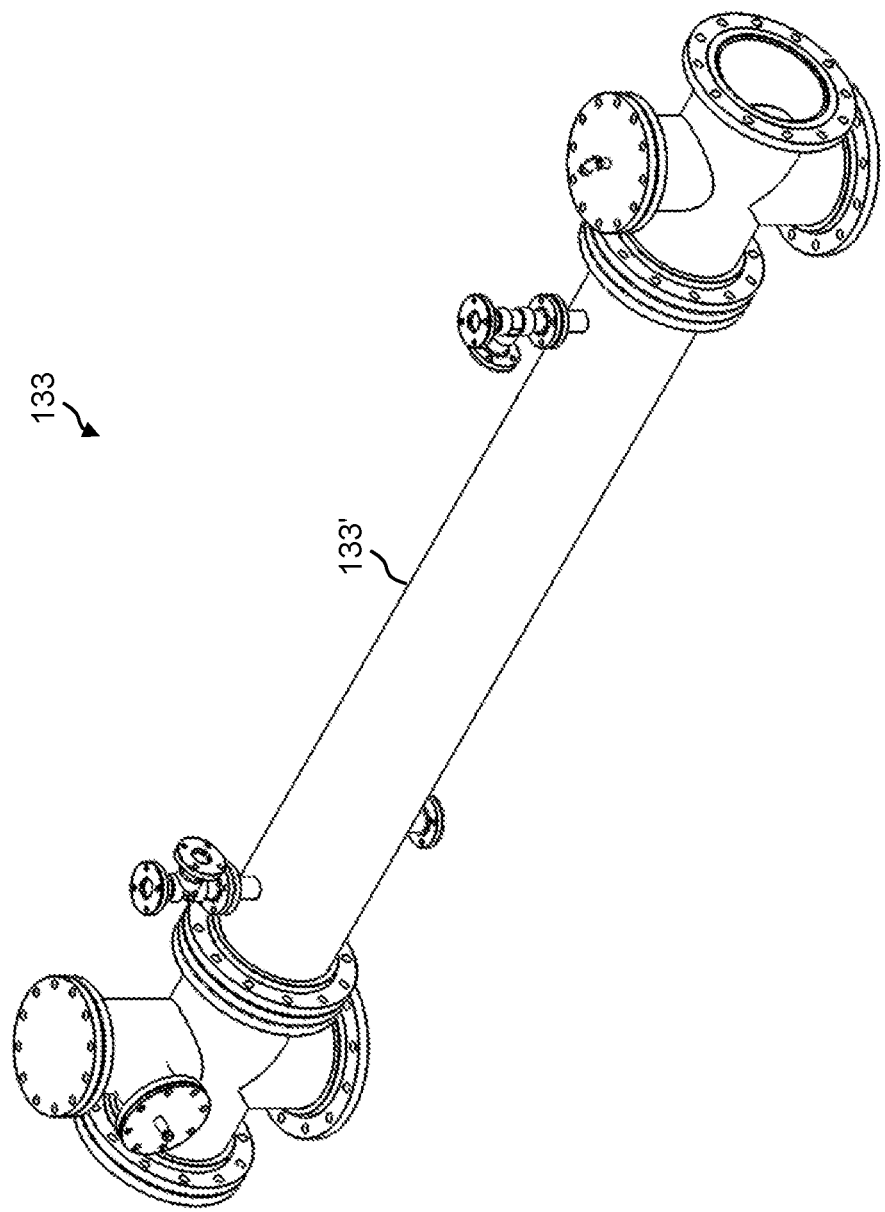
Figure 23:
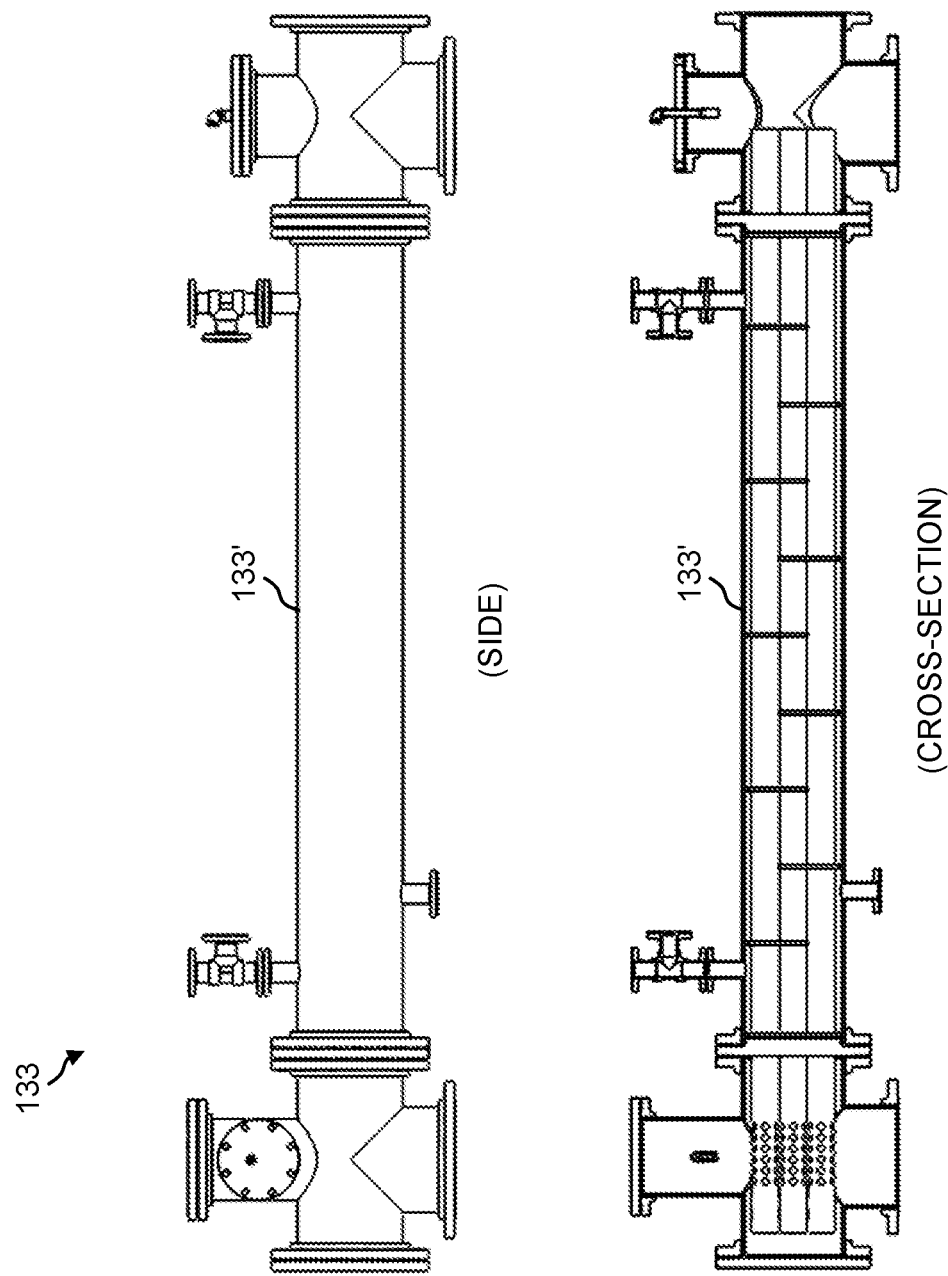
Figure 24:
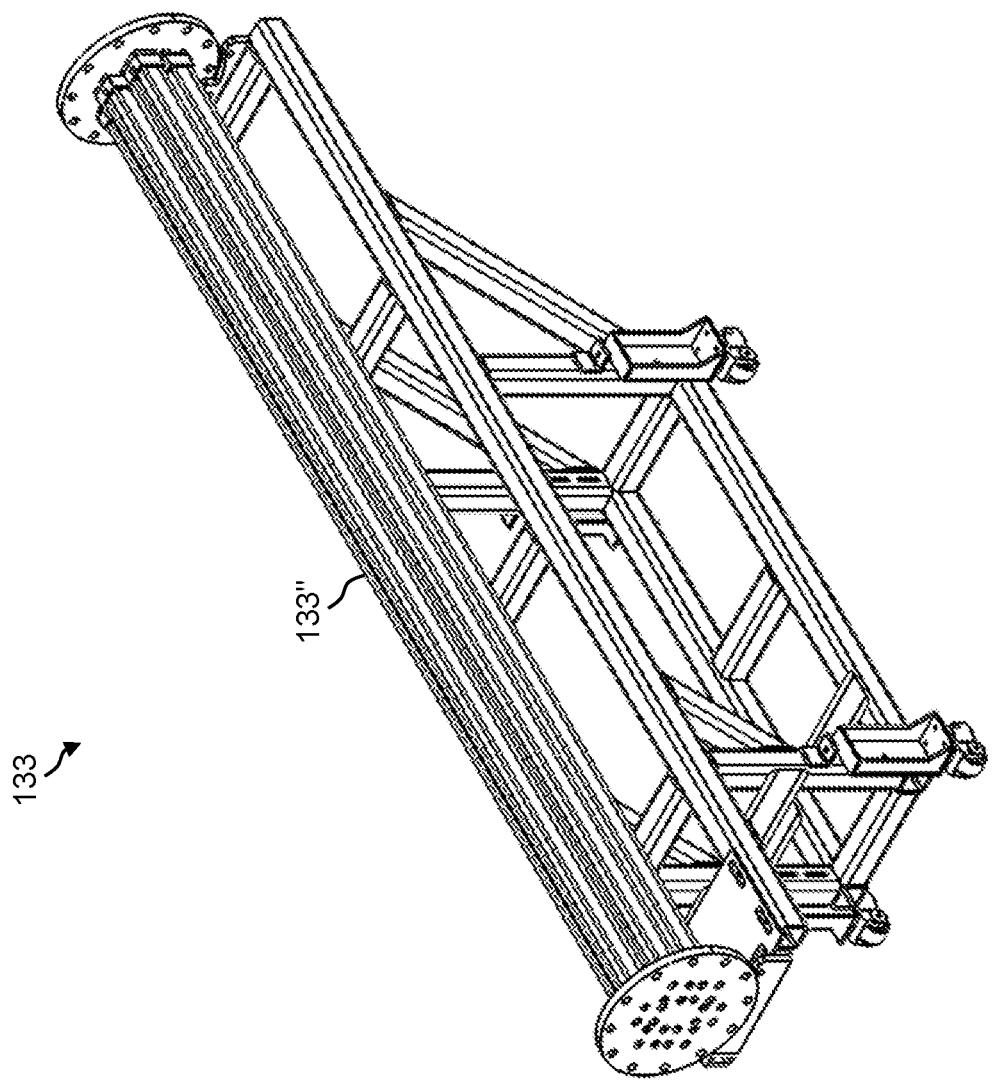
Figure 25:
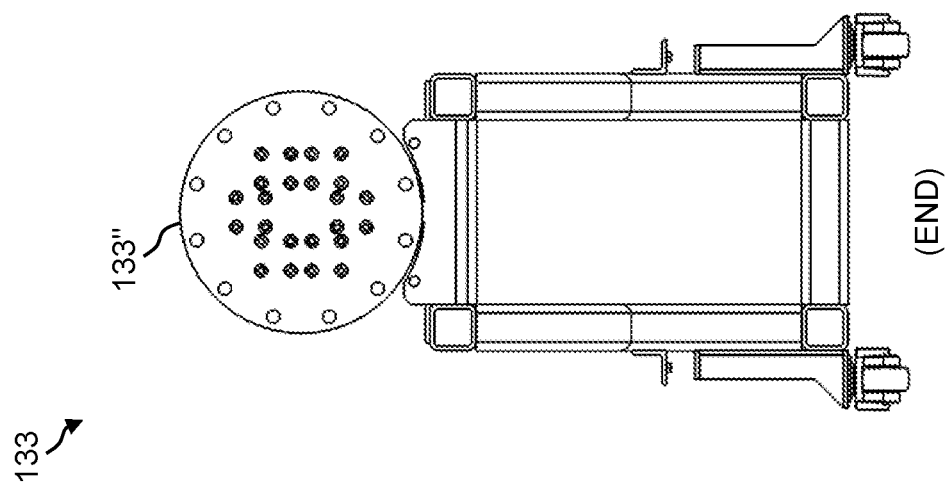

The multi-tube plunging condenser 133 of energy-conversion system 100 includes a condenser portion and a hydraulic or pneumatic plunging portion. For example, FIG. 22 shows an isometric view and FIG. 23 shows a side view and a cross-sectional view of a condensing unit 133' of multi-tube plunging condenser 133, while FIG. 24 and FIG. 25 show an isometric view and an end view, respectively, of a hydraulic or pneumatic plunging unit 133" (e.g., hydraulic cylinders) of multi-tube plunging condenser 133. Condensing unit 133' and hydraulic or pneumatic plunging unit 133" are arranged end-to-end to form multi-tube plunging condenser 133 (see FIG. 4, FIG. 5, and FIG. 6).

Referring now to FIG. 26 is a flow diagram of a method 400, which is an example of a method of operation of energy-conversion system 100 that includes shaftless auger 112 installed in reactor 110. Method 400 may include, but is not limited to, the following steps.

At a step 410, an energy-conversion system is provided that includes a shaftless auger. For example, energy-conversion system 100 is provided that includes shaftless auger 112 installed in reactor 110 and all heated using multi-zone heater 114.

At a step 415, feedstock material is supplied to energy-conversion system 100. For example, feedstock material, such as, but not limited to, any biomass (e.g., manure, coal, trash, rubber, and plastic), mining waste (e.g., mine tailings and water-based and/or oil-based drilling mud), and "sticky" feedstock (e.g., rubber and plastic), can be received and weighed at scale 116 and then fed into mixer 118 that ensures a homogenous mixture.

At a step 420, the feedstock material is processed and then supplied to the inlet of the reactor. For example, the feedstock material is fed into feedstock hopper metering stage 120 for metering the feedstock into reactor 110 at a certain rate. Namely, feedstock hopper metering stage 120 is used to pre-heat and dry the feedstock. Further, in-feed sensors 122 are used to automatically control feedstock bed-depth and rate into reactor 110. Feedstock hopper metering stage 120 supplies the feedstock to airlock 124 that is used to compress the feedstock material (i.e., remove the air from the feedstock).

At a step 425, the feedstock material is advanced through the reactor while the reactor facilitates a phase-change process of the feedstock from solid to liquid to vapor. For example, using shaftless auger 112, feedstock is advanced and processed through reactor 110, wherein reactor 110 facilitates the phase-change process of the feedstock from solid to liquid to vapor. Namely, multi-zone heater 114 is activated and used to maintain accurate and consistent temperature within reactor 110. Increased heat transfer rates are achieved by the large amount of surface contact created by the increased density of feedstock with liquid increasing the phase-change process to vapor. Continuous process vapor is mixed throughout the process and equalized prior to reaching the outlets. Pressure is maintained within reactor 110 with vapor created in phase change of the feedstock.

At a step 430, both char and vapor are discharged from respective outlets of the reactor. For example, char 160 is one output of reactor 110 of energy-conversion system 100 while vapor is another output of output of reactor 110 that is further processed.

At a step 435, particulates are removed from the vapor discharged from the reactor. For example, vapor that is at a critical heat temperature of, for example, from about 900° F. (about 482° C.) to about 1000° F. (about 538° C.) exits reactor 110 through ceramic hot gas filter 130, wherein ceramic hot gas filter 130 provides active vapor filtration to remove any particulate prior to condensing.

At a step 440, vapor quenching operations are performed wherein mechanisms are provided for preventing tar, grease, and/or wax build-ups. For example, quenching of vapor with produced liquid fraction product is accomplished using first quench stage 132 and second quench stage 134. Quenching promotes the elimination of tars, resins, and waxes (i.e., the heavy tars or oils) in gas fraction, removes particulate for the vapor stream, and allows for collection of specific fraction of condensable liquid. The vapor can be quenched using, for example, mineral oil or any other oil that can be used to absorb the tars, resins, and waxes.

At a step 445, after quenching, energy-conversion system 100 transitions from a positive pressure system to a negative pressure system. For example, after quenching, primary compensator 136 and secondary compensator 140 allow a continuous flow transition of the reactor vapor from positive pressure to negative pressure, acting as a system non-clogging or sticking pressure regulator.

At a step 450, the vapor is supplied to the vacuum buffer tank. For example, using primary compensator 136 and primary recirculator 138 followed by secondary compensator 140 and secondary recirculator 142, anything that is condensable is condensed so that vapor only moves on to vacuum buffer tank 144.

At a step 455, liquid is removed from the vapor and the vapor is cooled. For example, vapor passes from vacuum buffer tank 144 to vacuum pump 148 via regulator 146. Then, vacuum pump 148 is used to remove liquid from vapor and to cool gas on the pressure side of the vacuum. In vacuum pump 148, the fluid is chilled by heat exchange.

At a step 460, a filter-less quenching gas cleanup operation is performed and gas is discharged. For example, vacuum pump 148 supplies syngas buffer tank 150 which then supplies catalytic scrub 152. Catalytic scrub 152 performs a gas polishing operation that ensures high quality gas in which sulfur, chlorine, and other gas contaminants have been substantially eliminated. In this way, energy-conversion system 100 is used to produce high quality syngas, or synthesis gas, which is a fuel gas mixture consisting primarily of hydrogen, carbon, methane, propane, butane, carbon monoxide, and very often some carbon dioxide.

At a step 465, throughout all of the operations of method 400, energy-conversion system 100 is continuously balanced. For example, the combination of vacuum buffer tank 144 on the upstream side of vacuum pump 148 and the pressurized syngas buffer tank 150 on the downstream side of vacuum pump 148 provides a control loop for balancing the system. In another mechanism, primary compensator 136 and secondary compensator 140 in combination with the vacuum buffer tank 144—vacuum pump 148—syngas buffer tank 150 loop is the mechanism used to control the pressure inside reactor 110. For example, this control loop can be used to hold the pressure inside reactor 110 at about 7 inches (about 17.78 cm) of water column.

FIG. 27 through FIG. 56 show various views of one example instantiation of the drag conveyor-based energy-conversion system 200 shown in FIG. 2. Namely, FIG. 27, FIG. 28, FIG. 29, and FIG. 30 show an isometric view, a top down view, a side view, and an end view, respectively, of energy-conversion system 200 in its entirety. FIG. 31, FIG. 32, FIG. 33, and FIG. 34 show the same views of energy-conversion system 200 as shown in FIG. 27, FIG. 28, FIG. 29, and FIG. 30, respectively, but simplified.

Figure 35:
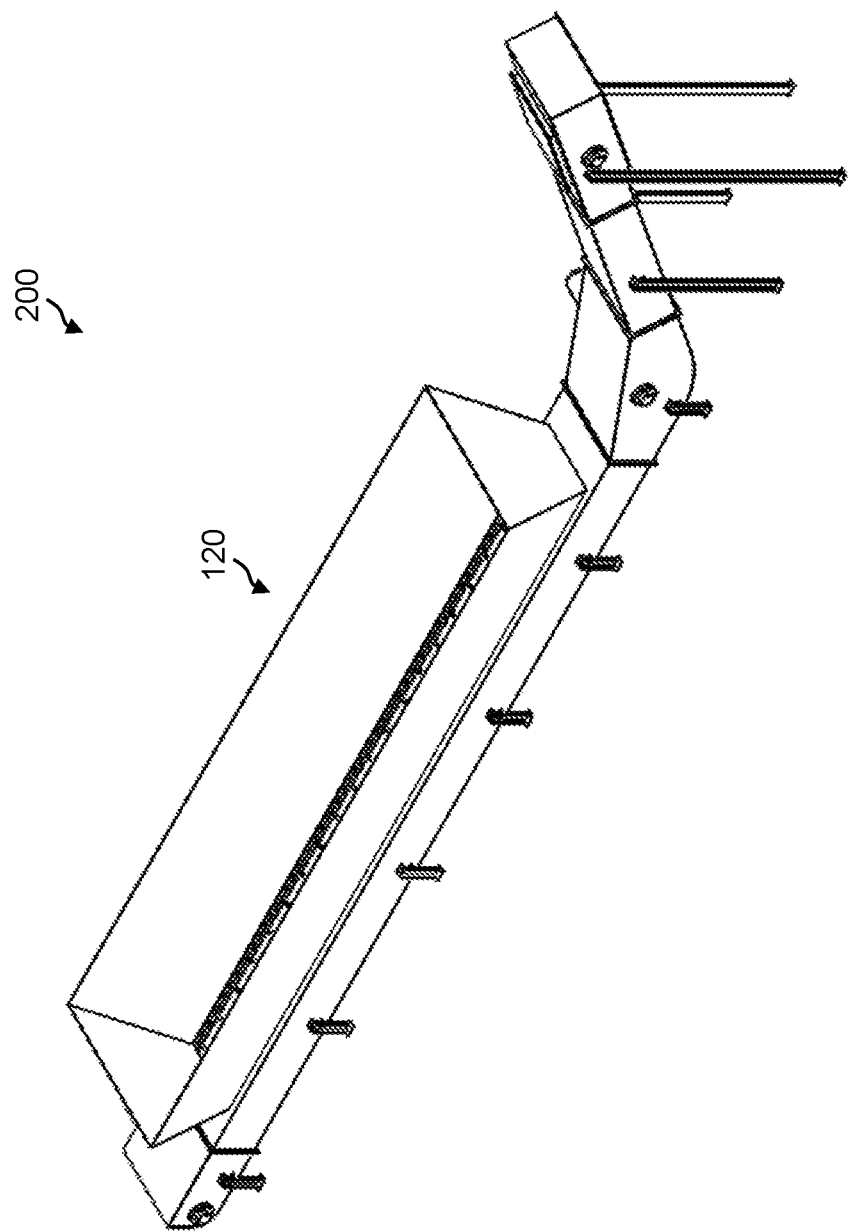
Figure 36:
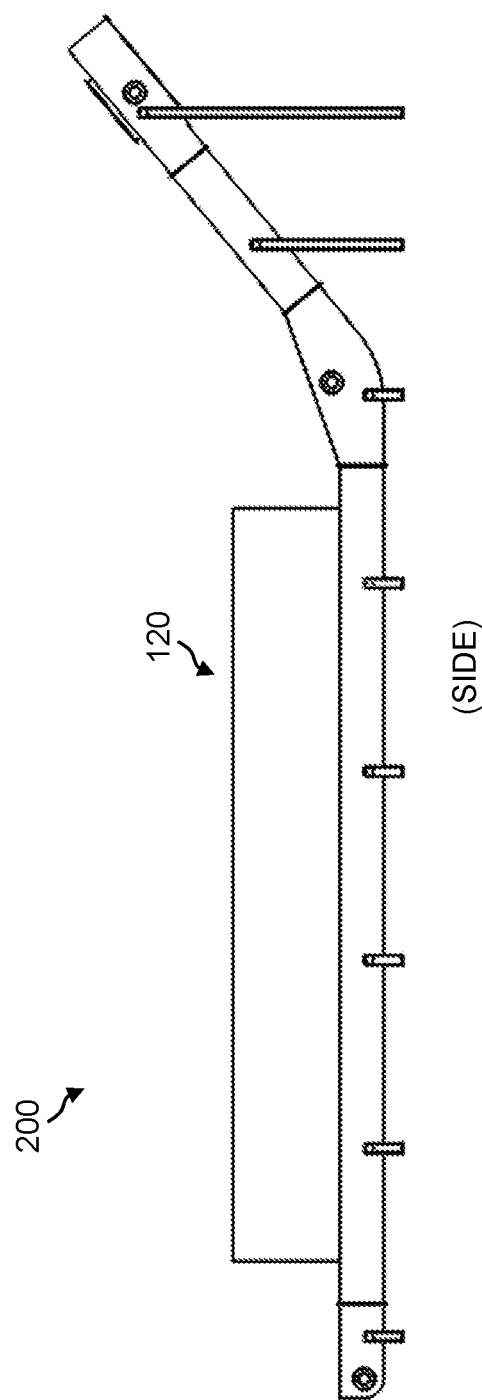
Figure 37:
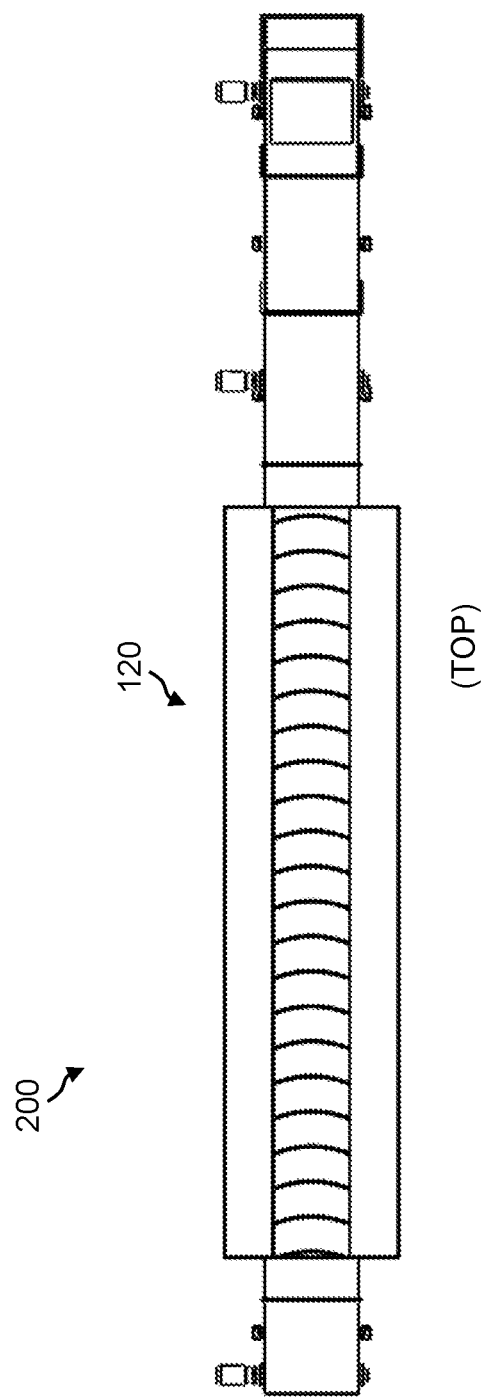
Figure 38:
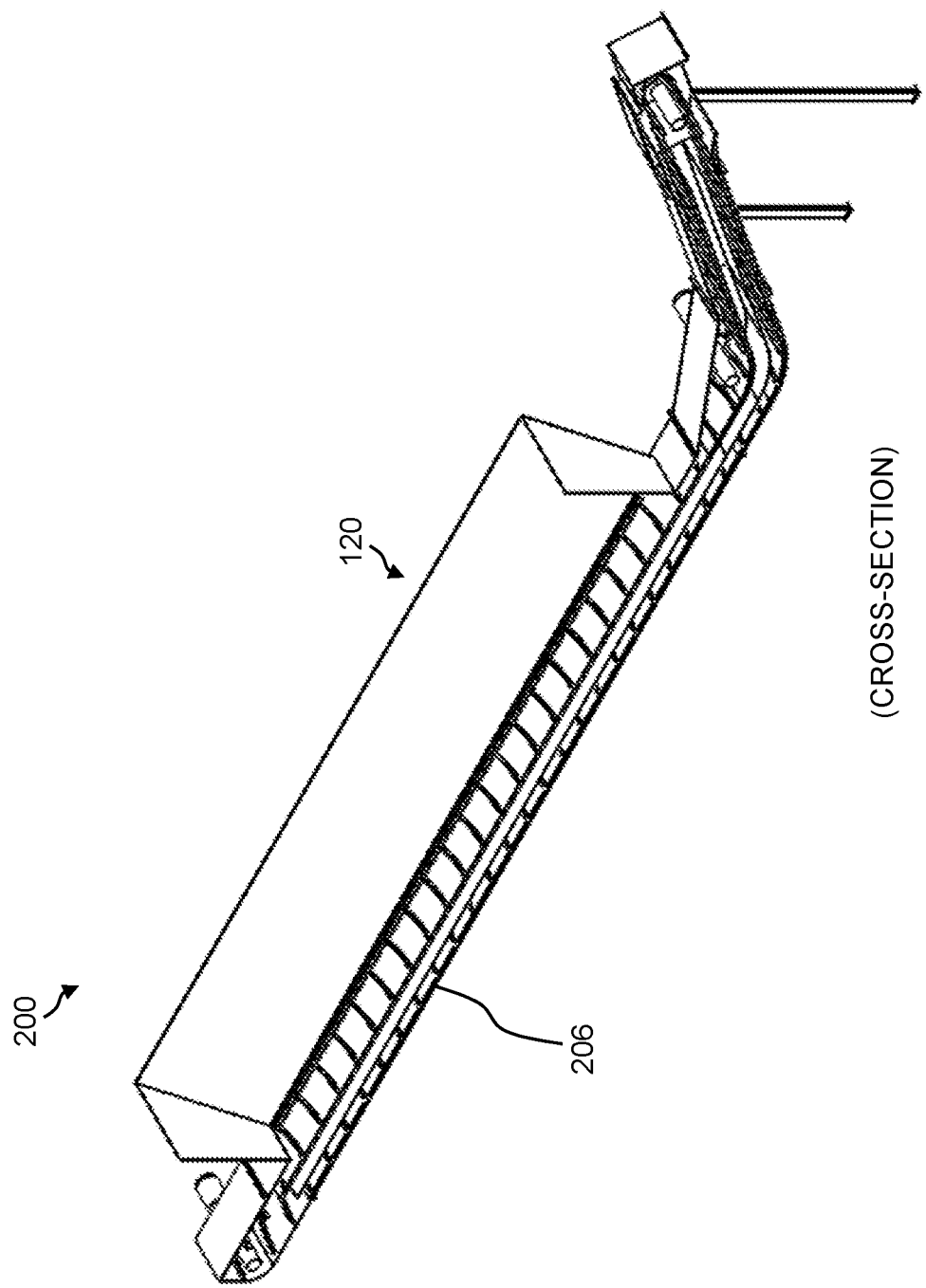
Figure 39:
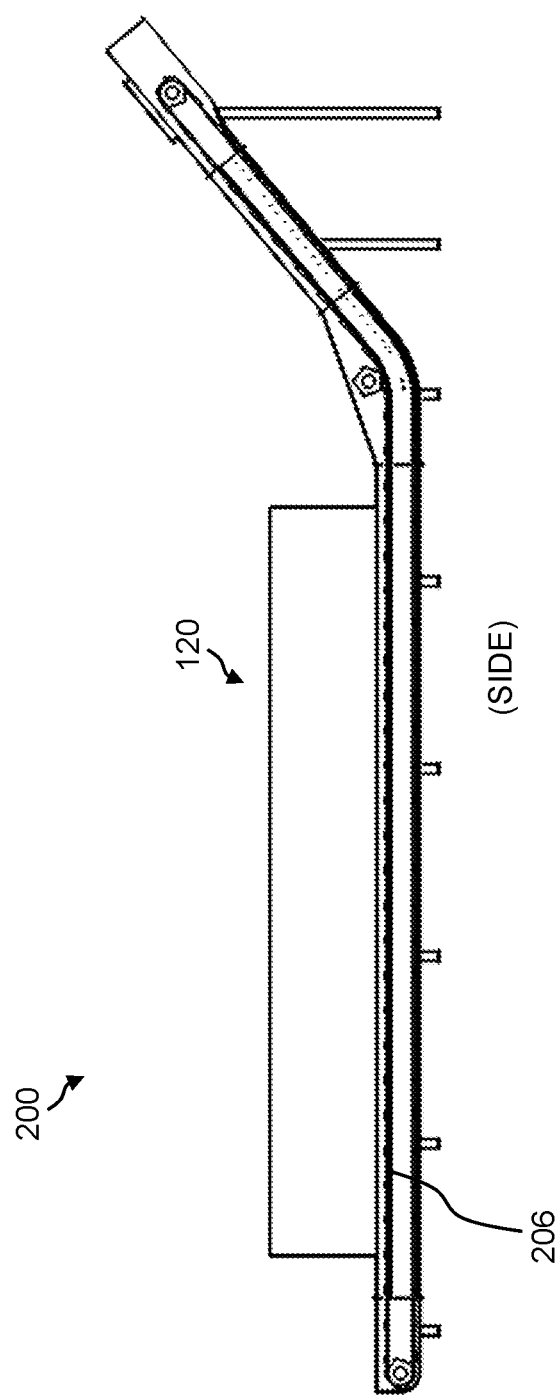

In energy-conversion system 200, feedstock hopper metering stage 120 includes a dryer and a drag conveyor, as shown in FIG. 35 through FIG. 39. Namely, FIG. 35, FIG. 36, and FIG. 37 show an isometric view, a side view, and a top down view, respectively, of the feedstock hopper metering stage 120—potion of energy-conversion system 200. FIG. 38 and FIG. 39 show cross-sectional views of the feedstock hopper metering stage 120—potion of energy-conversion system 200 and now showing a drag conveyor 206 enclosed therein.

Figure 40:
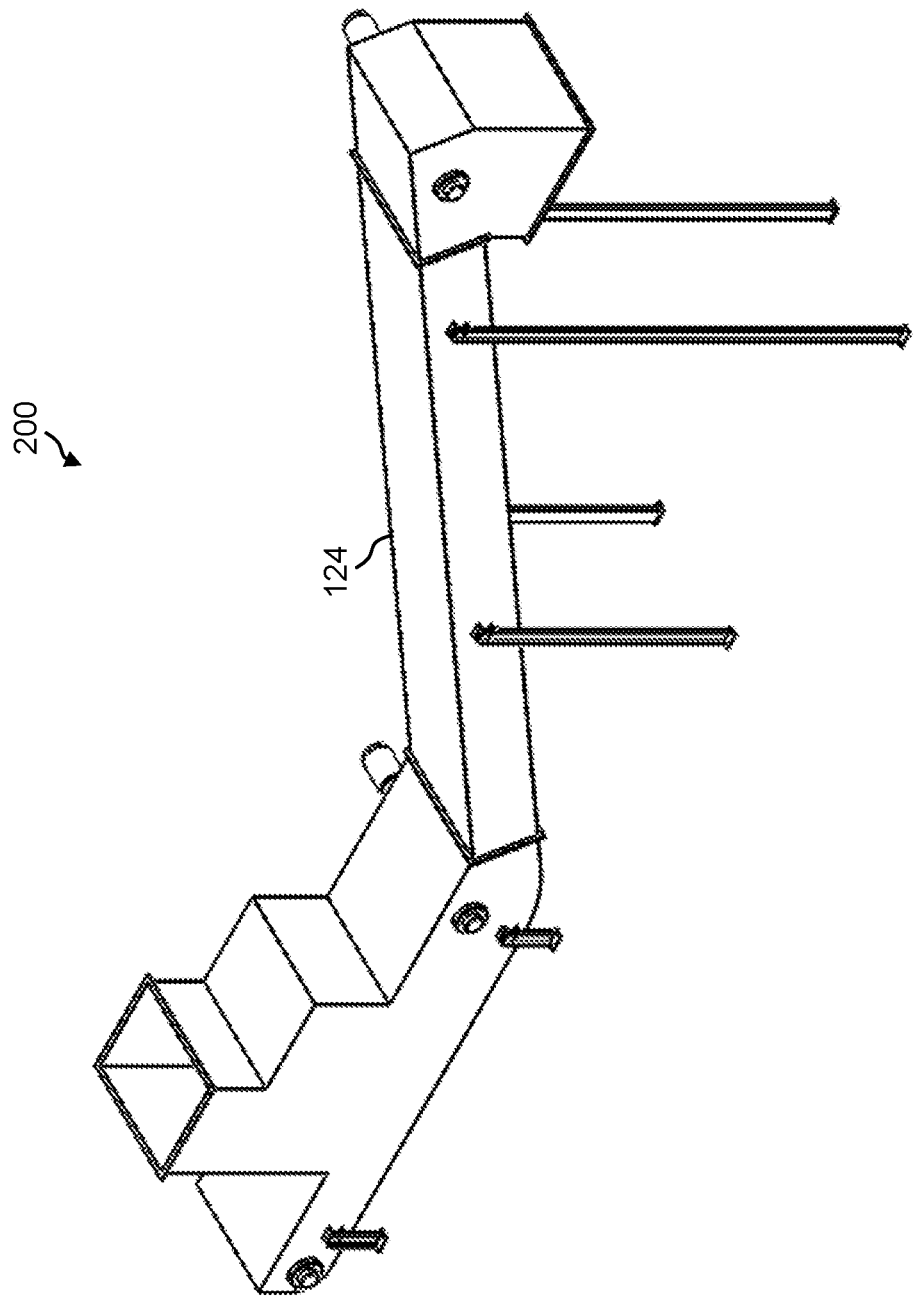
Figure 41:
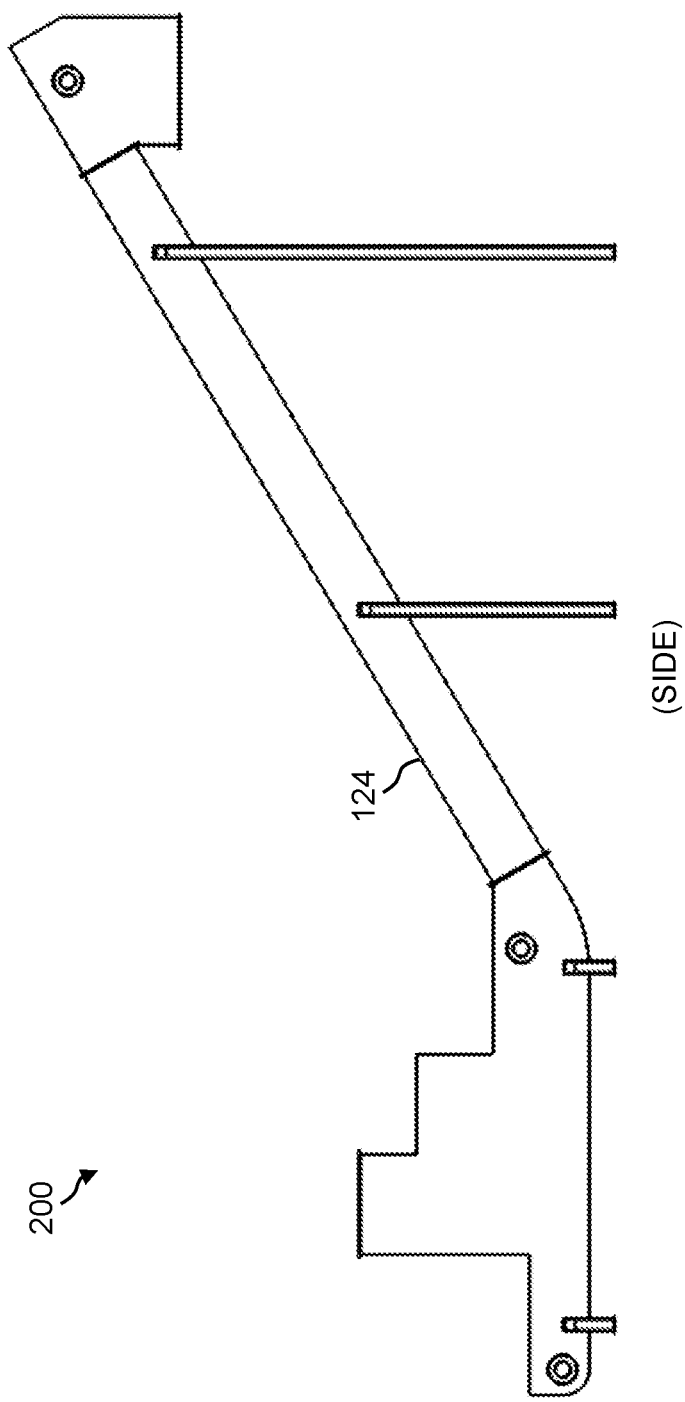
Figure 42:
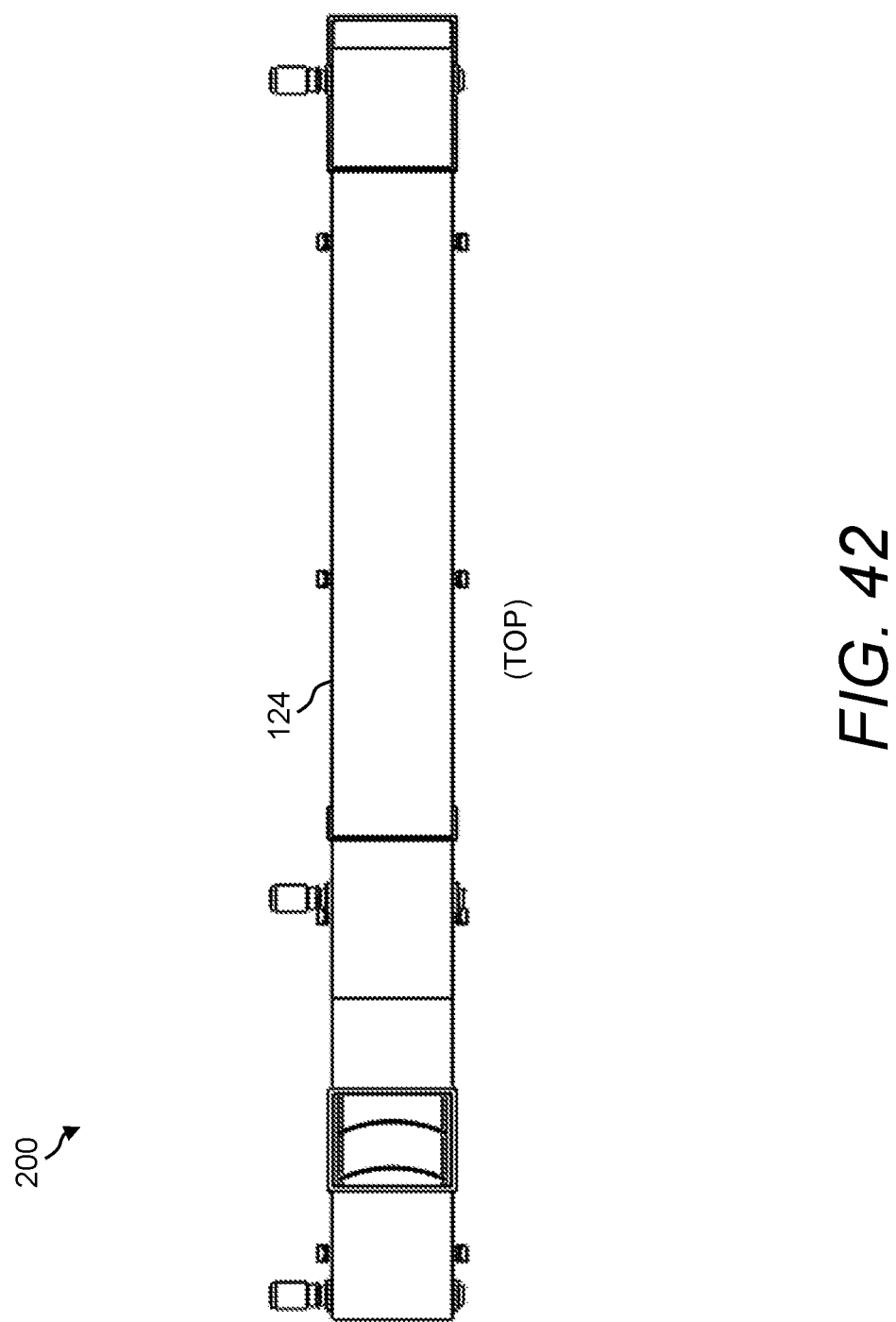
Figure 43:
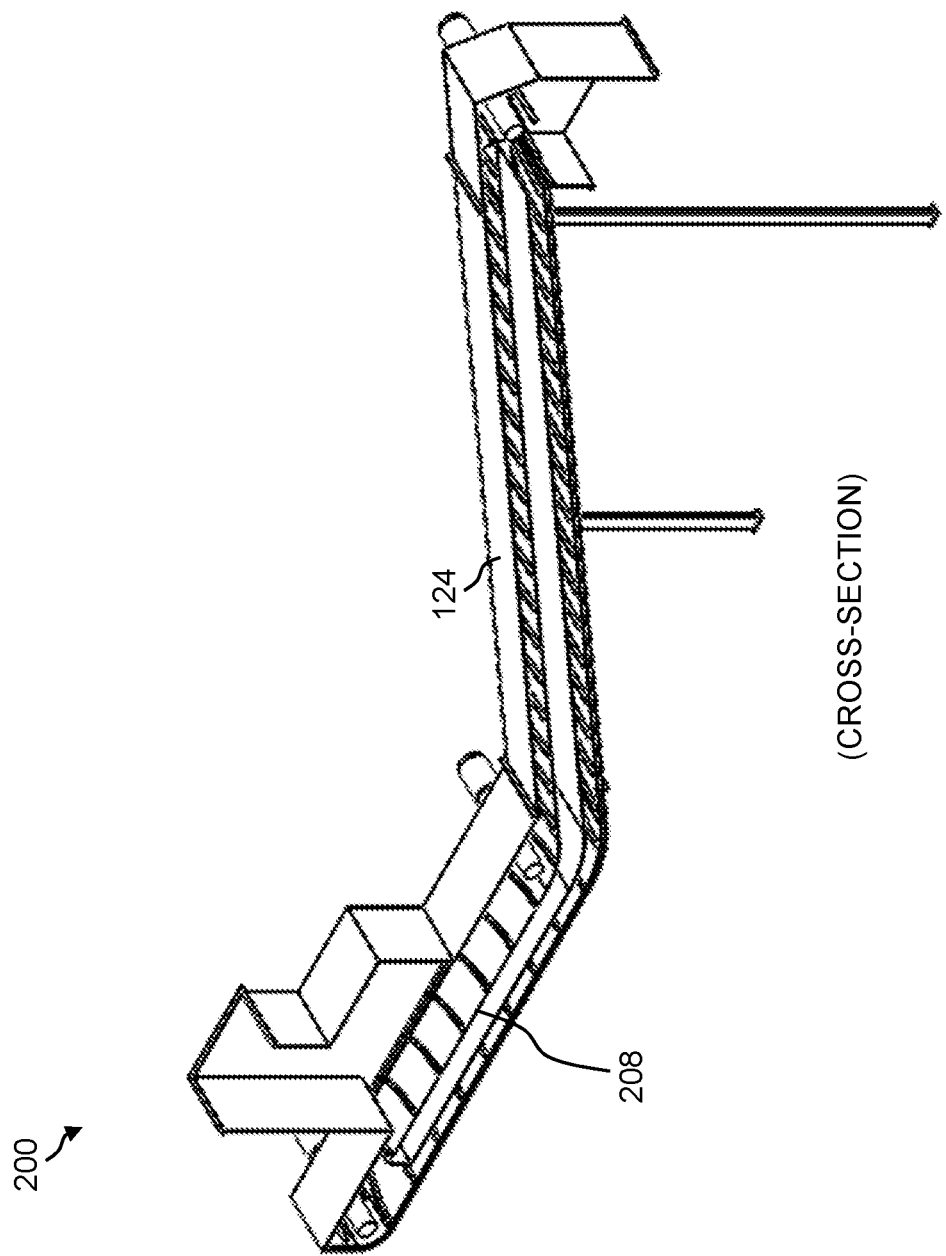
Figure 44:
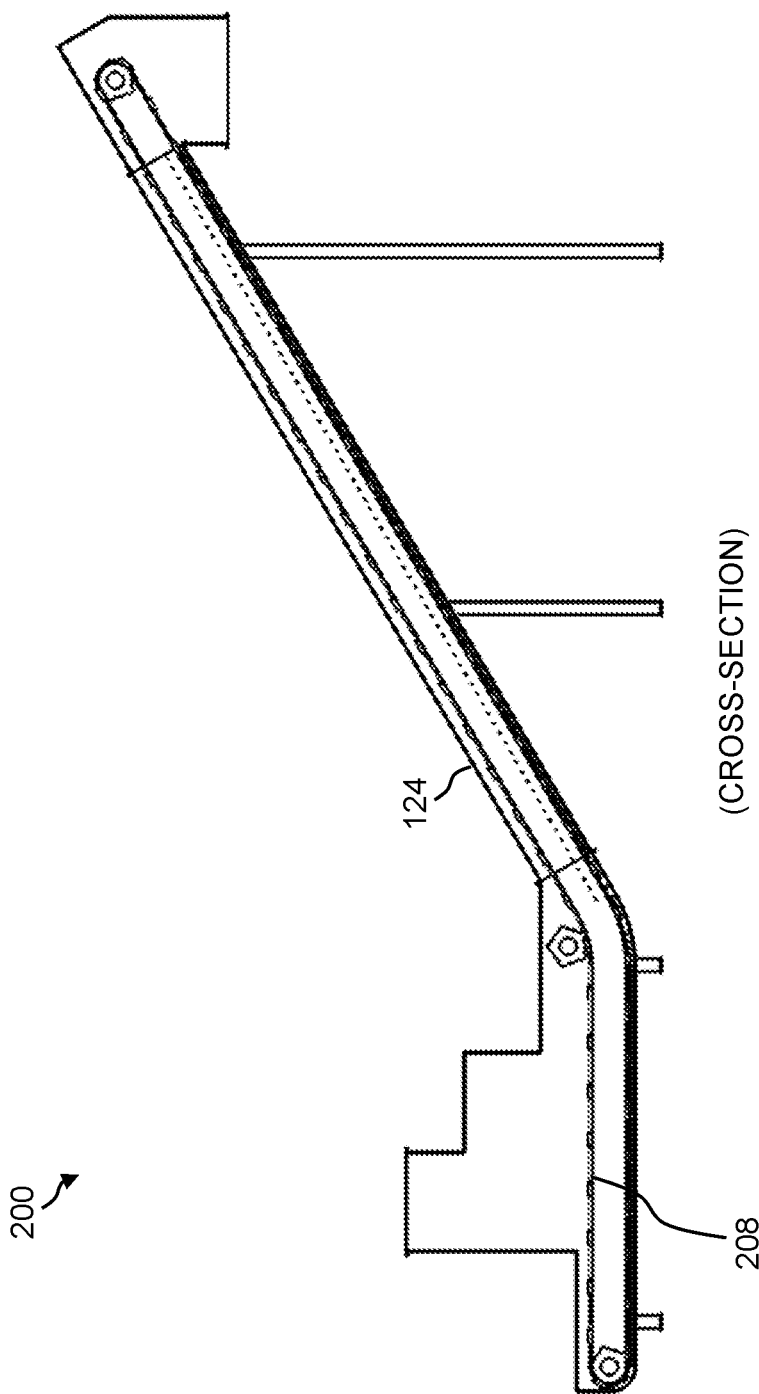

FIG. 40, FIG. 41, and FIG. 42 show an isometric view, a side view, and a top down view of the airlock 124—potion of energy-conversion system 200. FIG. 43 and FIG. 44 show cross-sectional views of the airlock 124—potion of energy-conversion system 200 and now showing a drag conveyor 208 enclosed therein.

Figure 45:
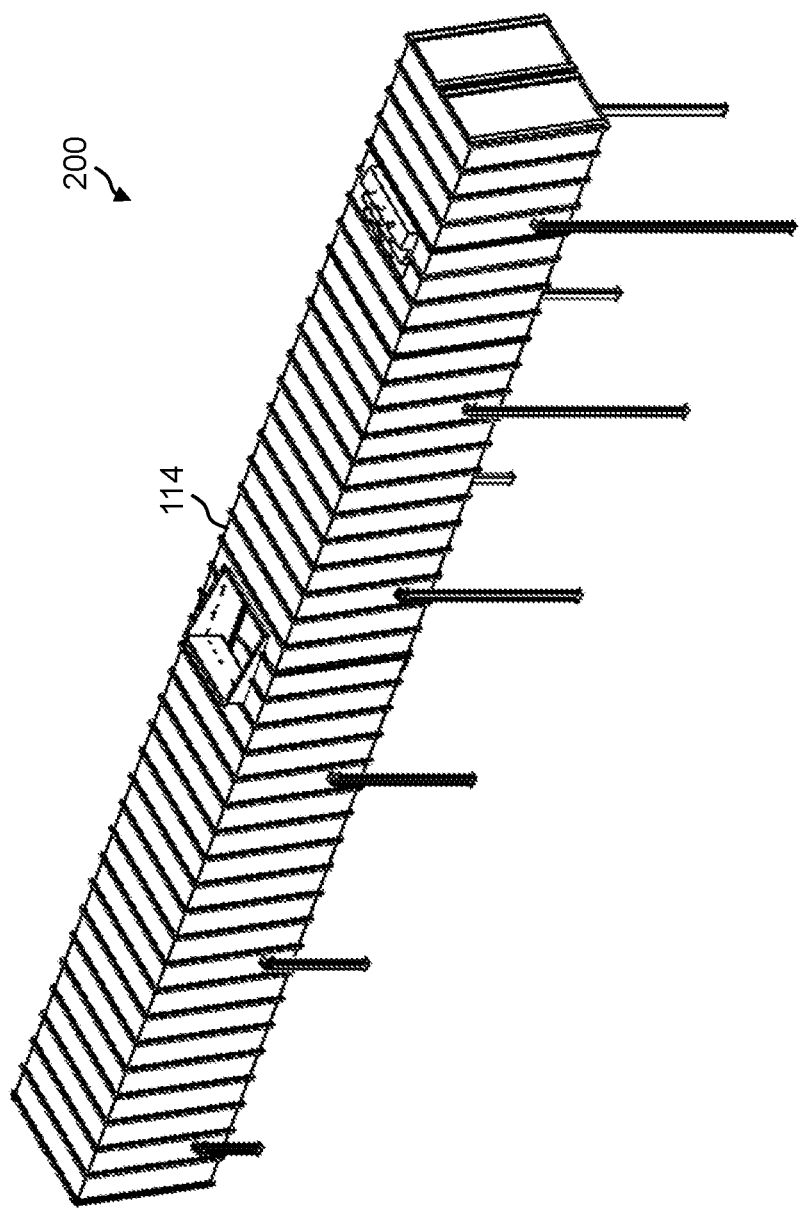
Figure 46:
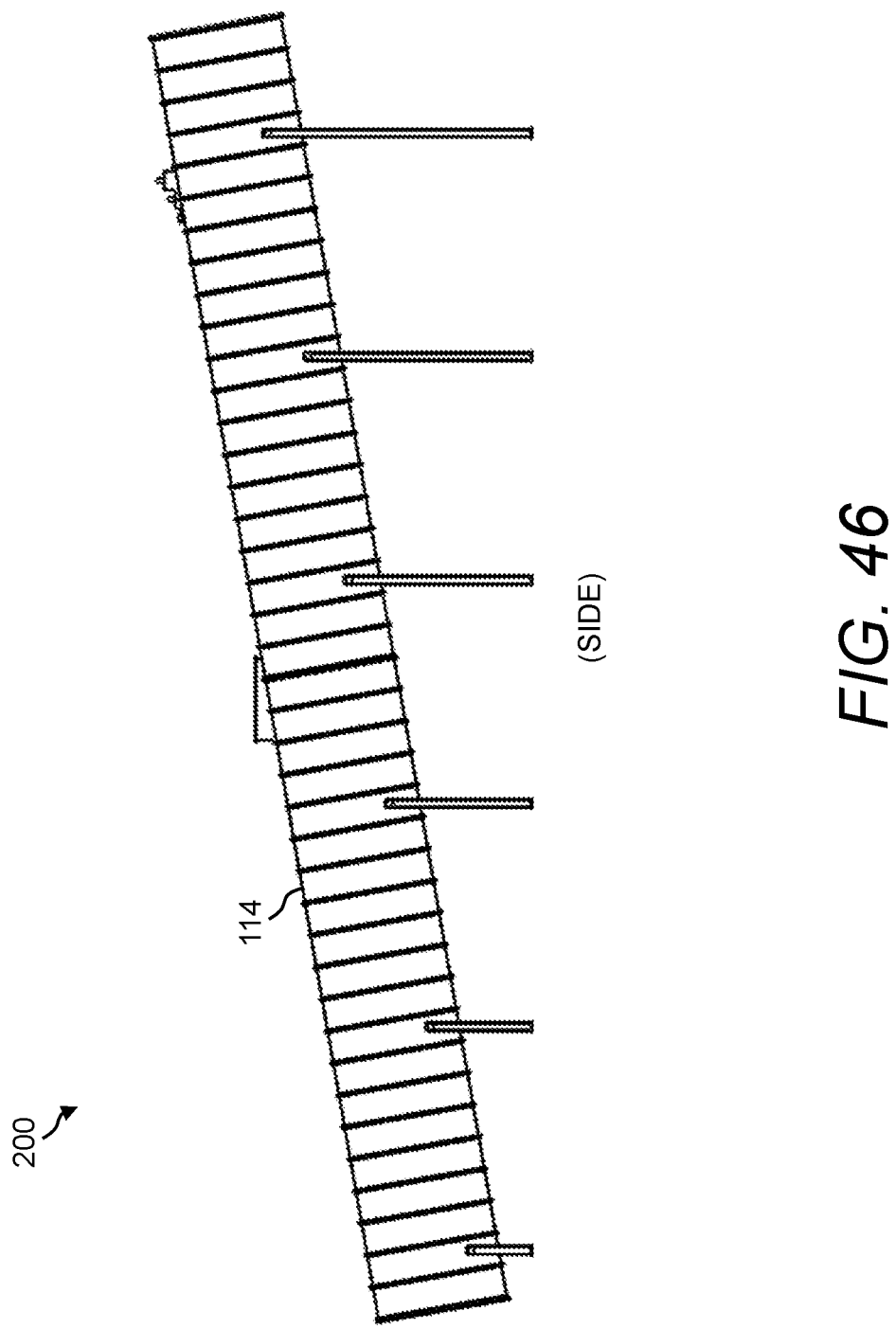
Figure 47:
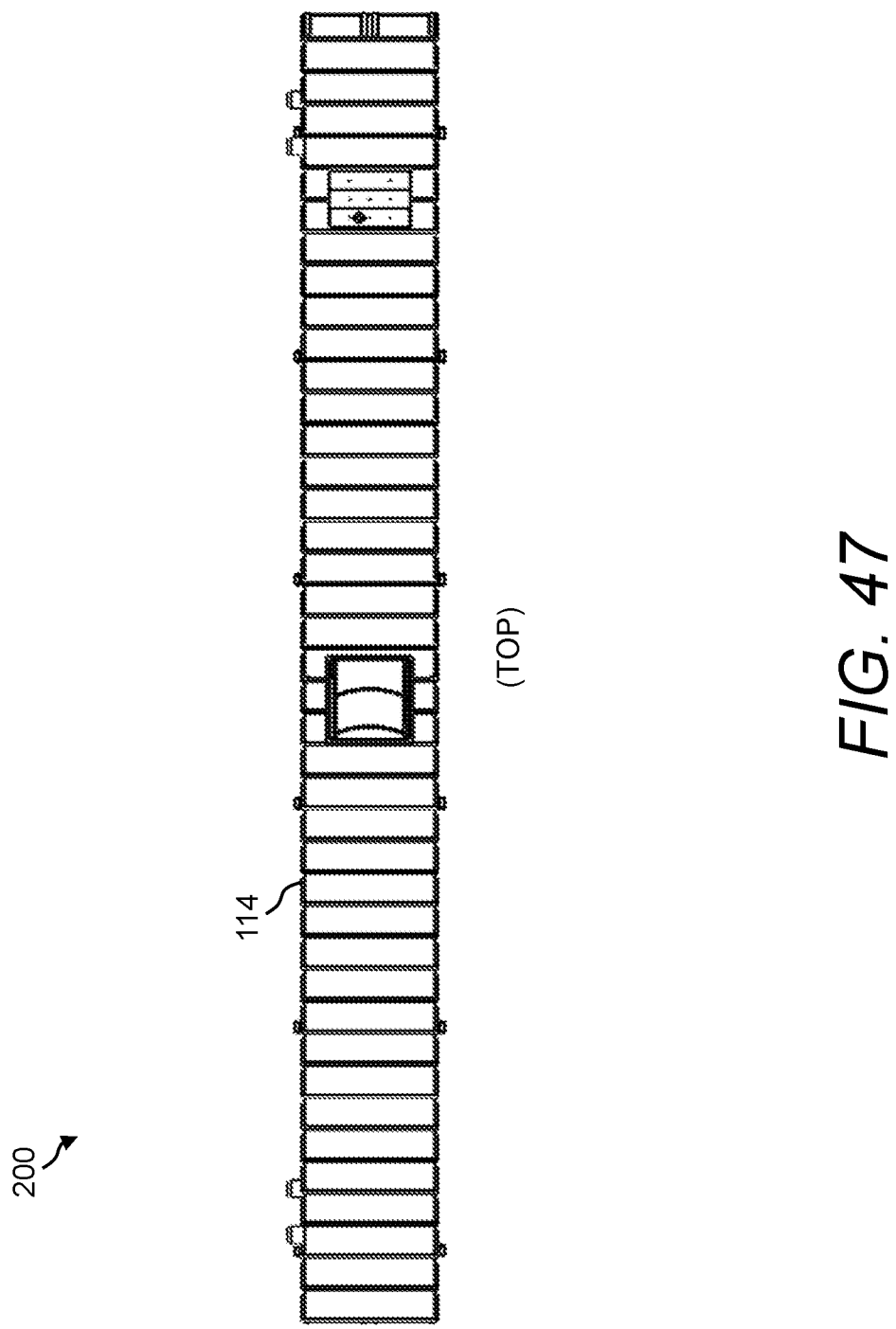
Figure 48:
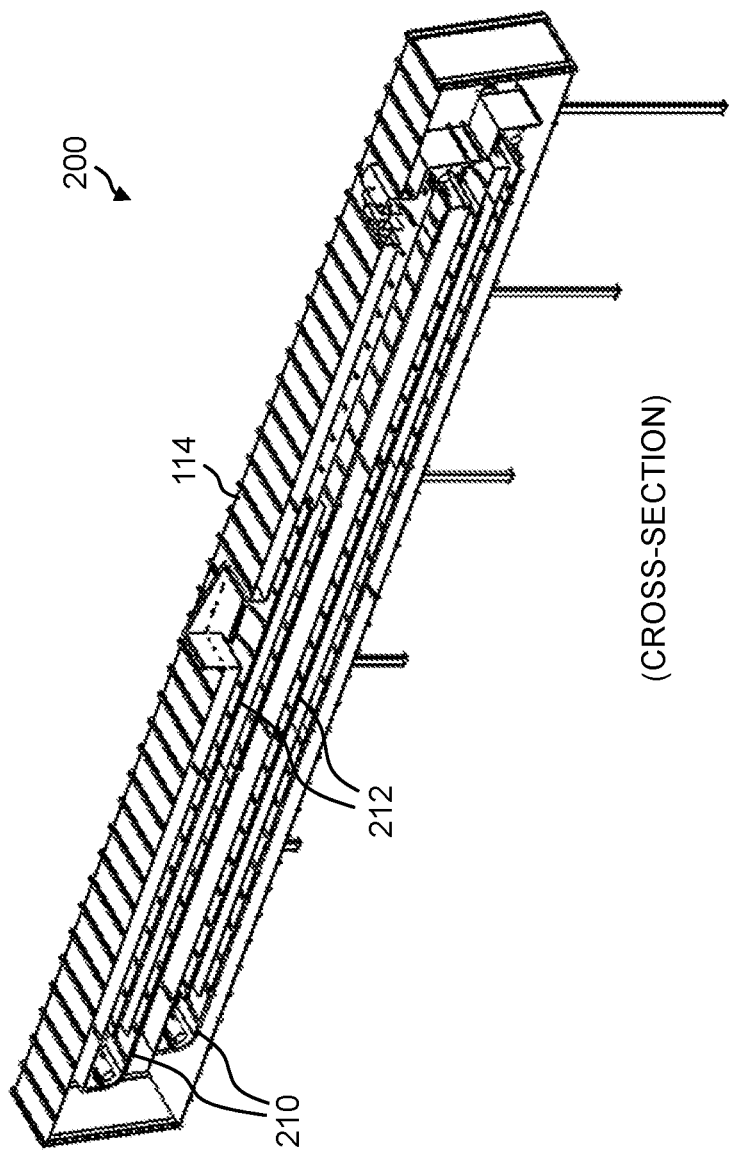
Figure 49:
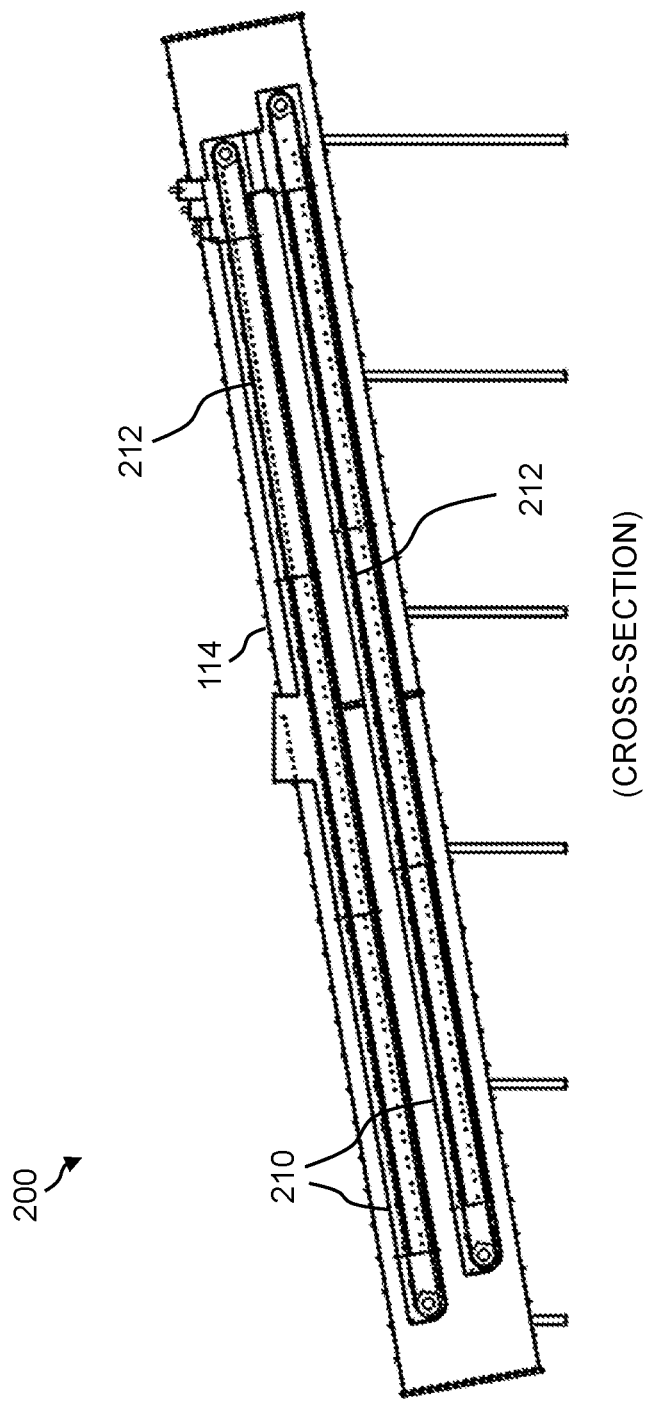
Figure 50:
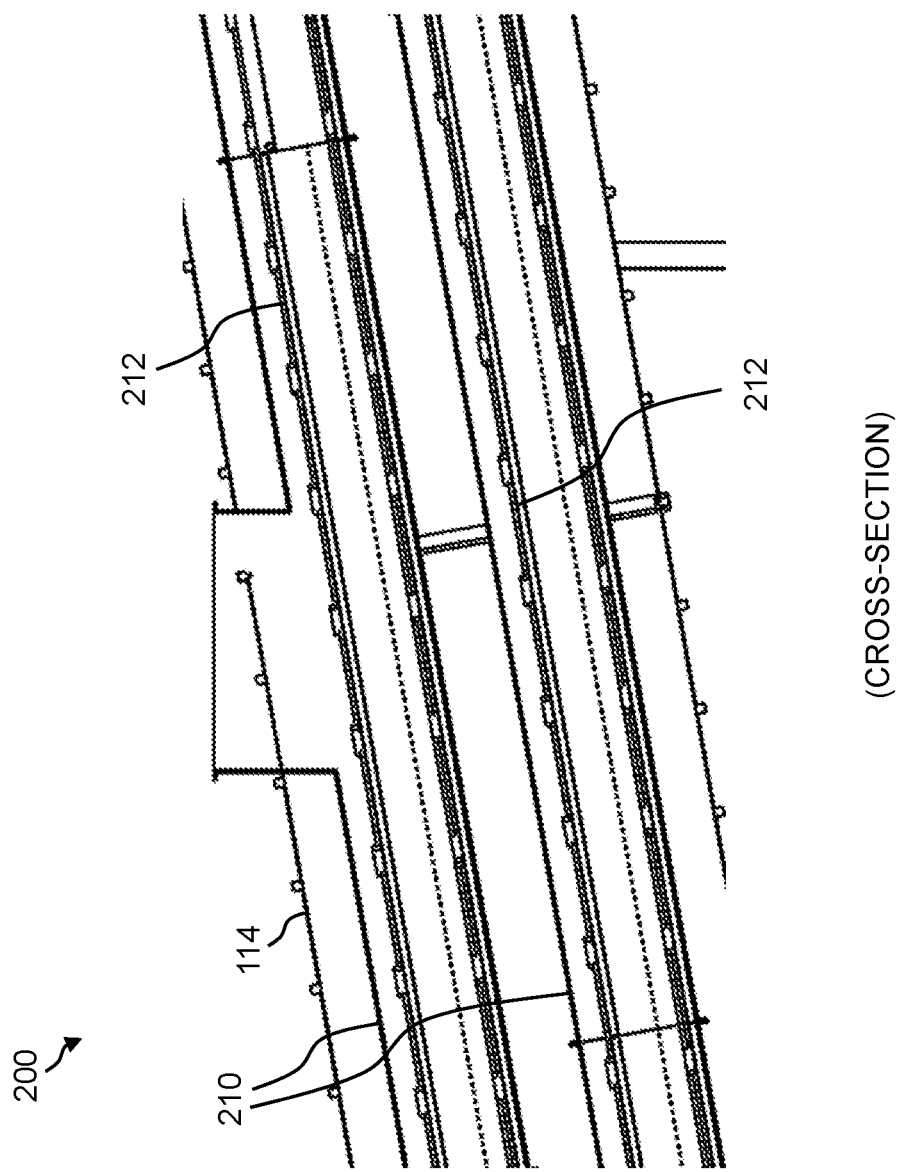
Figure 51:
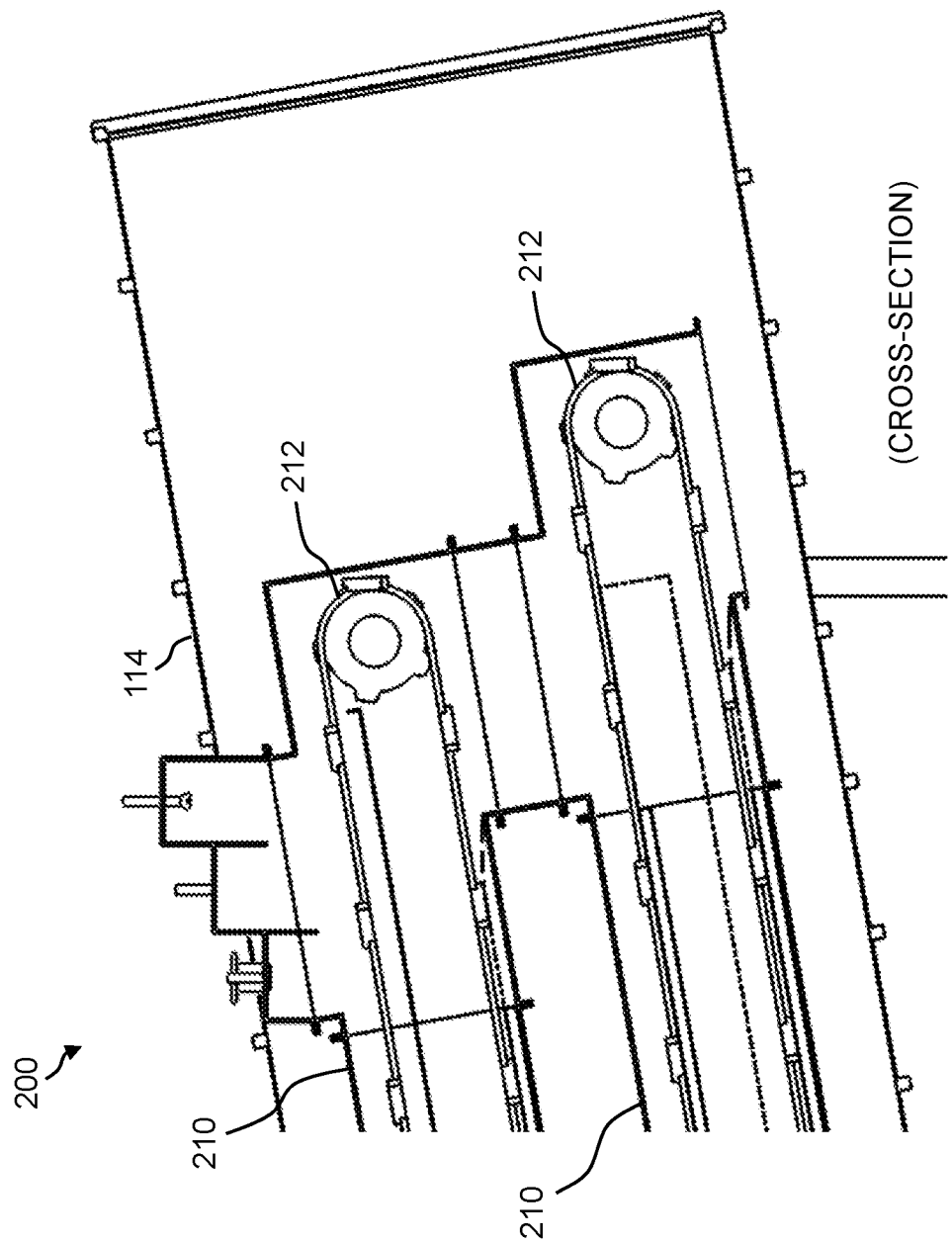
Figure 52:
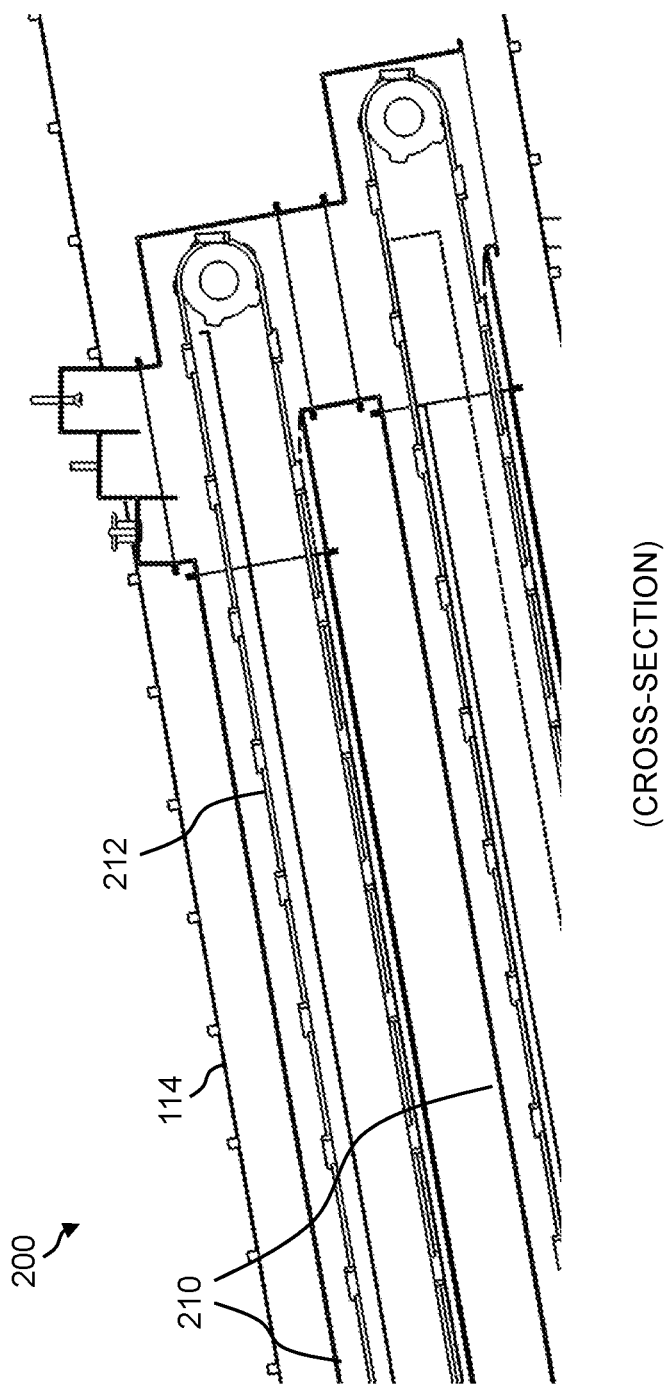
Figure 53:
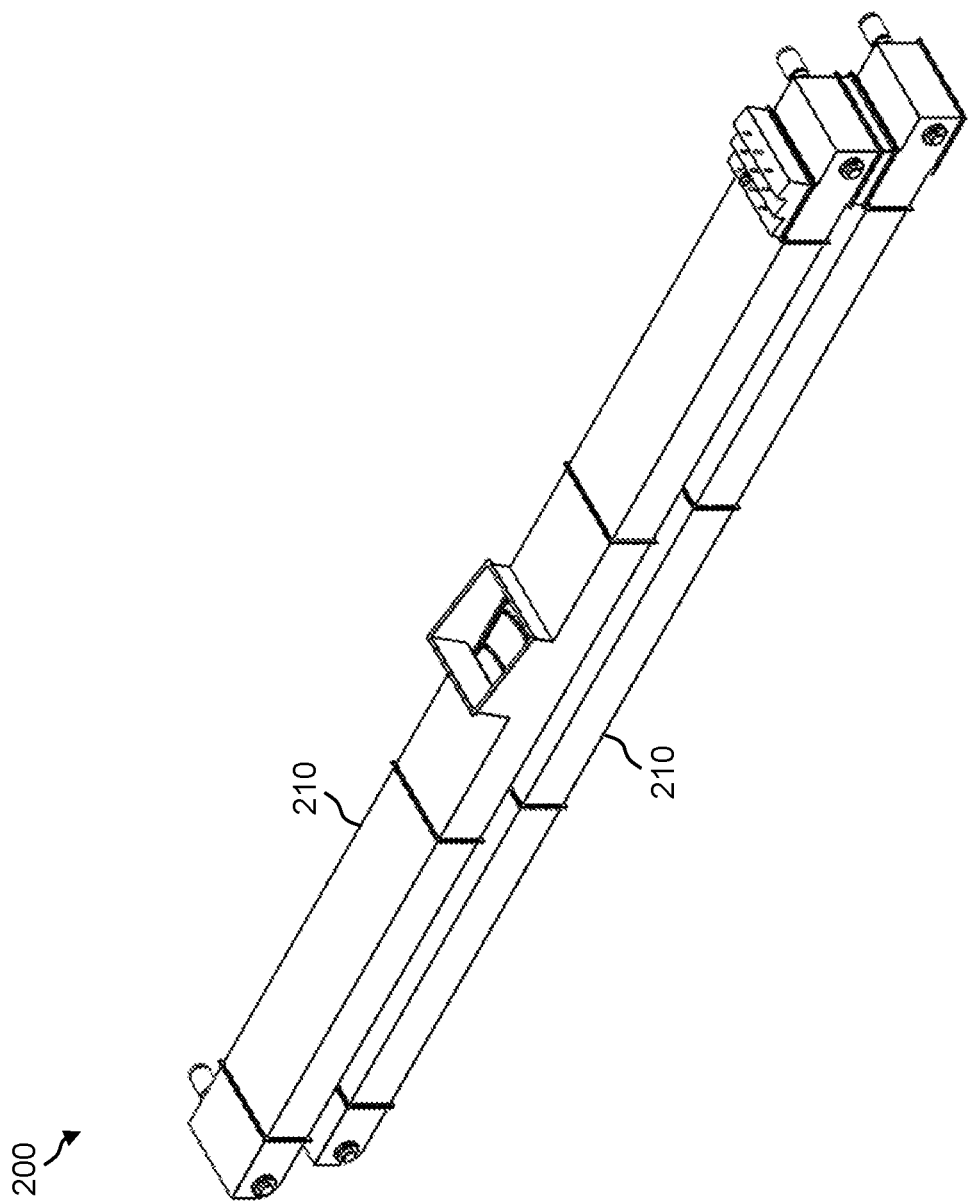
Figure 54:
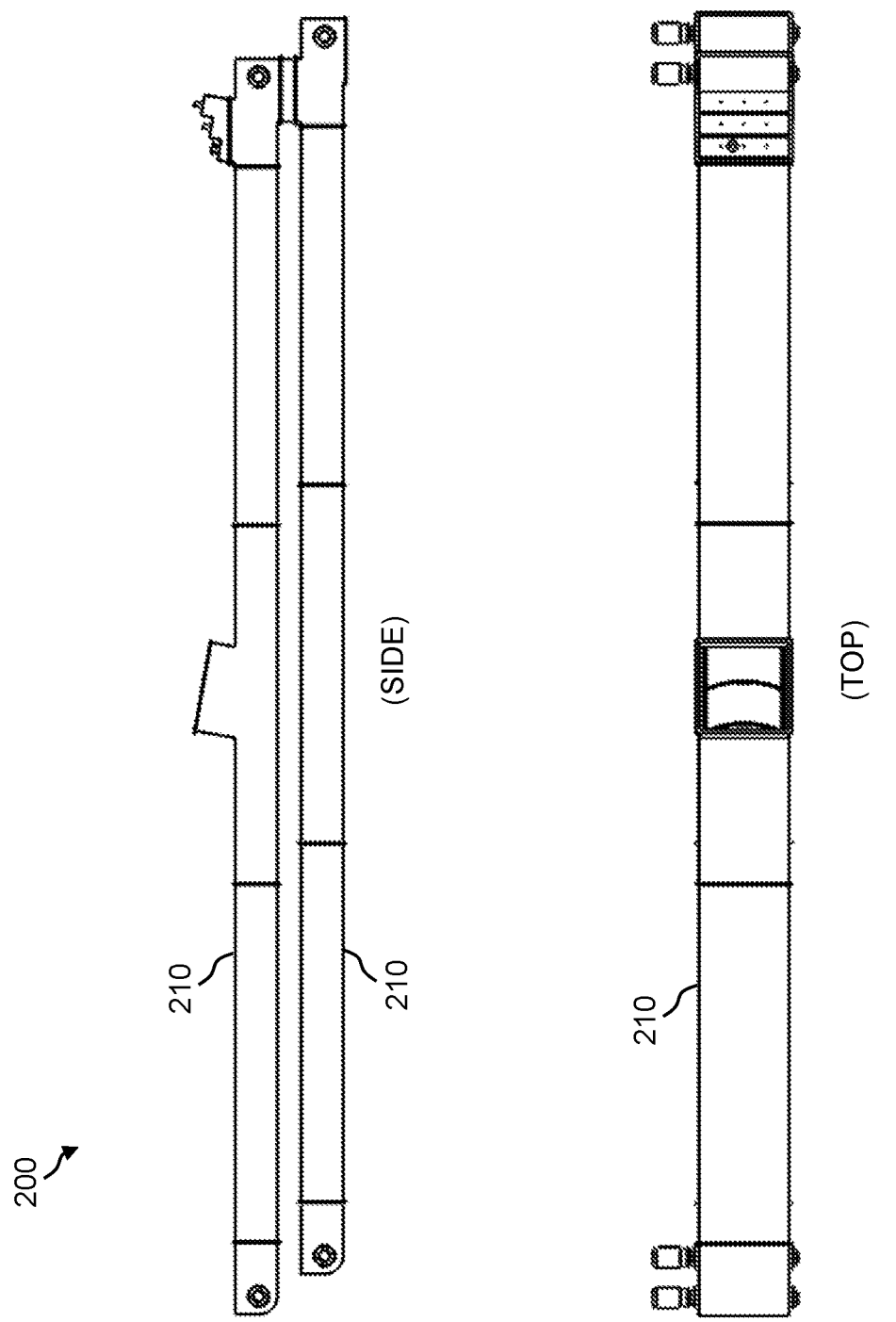
Figure 55:
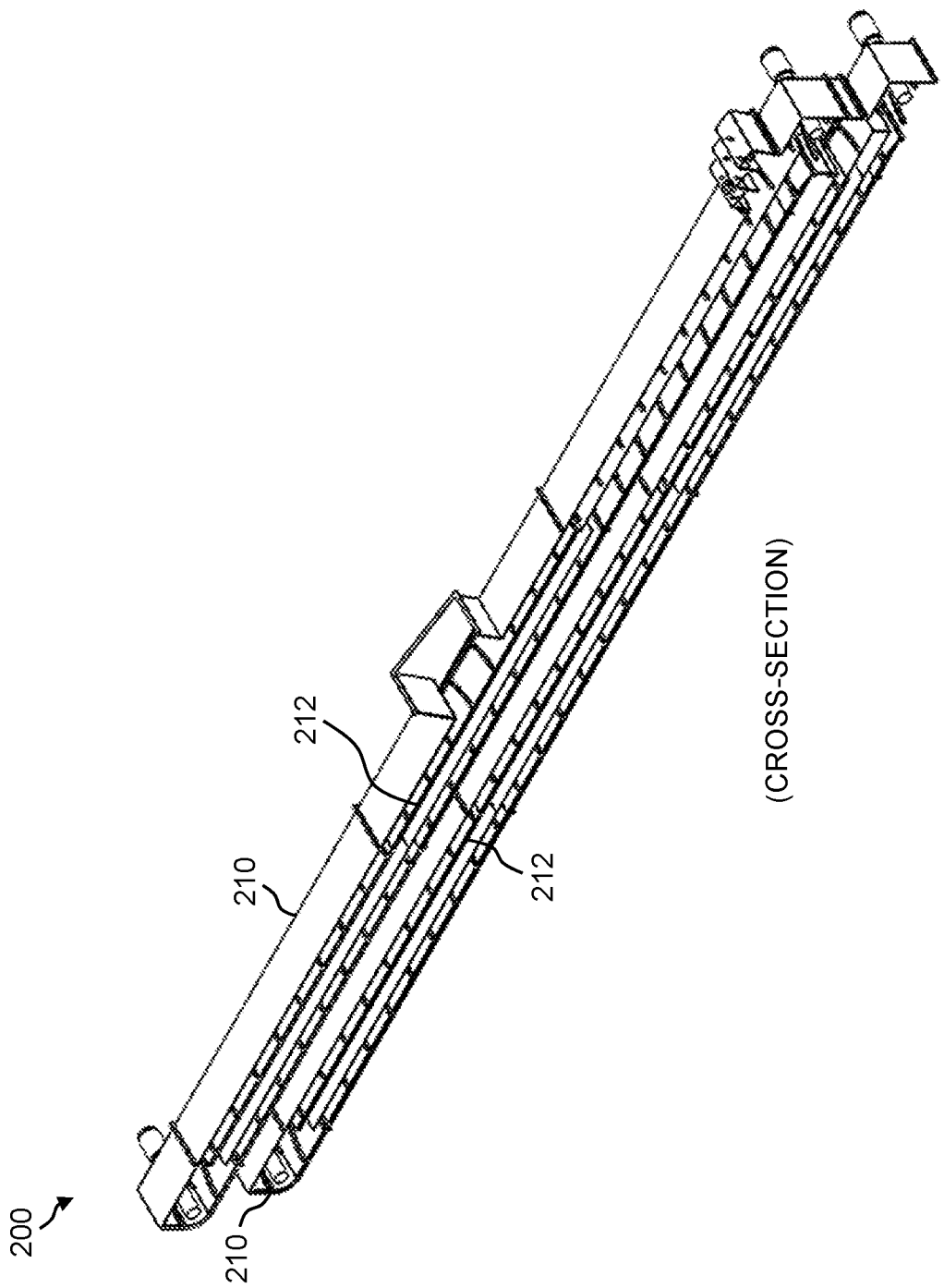
Figure 56:
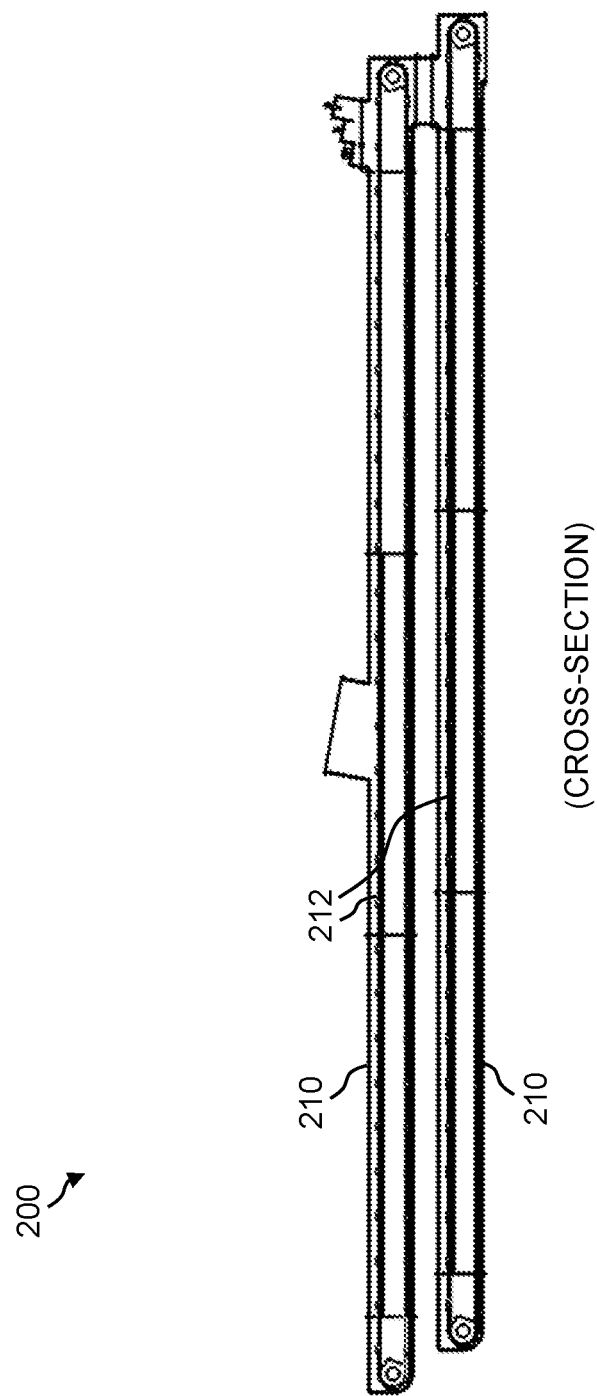

FIG. 45, FIG. 46, and FIG. 47 show an isometric view, a side view, and a top view, respectively, of multi-zone heater 114 of energy-conversion system 200, wherein reactor 210 (not visible) is enclosed within multi-zone heater 114. Further, FIG. 48 and FIG. 49 show cross-sectional views of multi-zone heater 114 and showing reactor 210, wherein drag conveyor 212 is arranged within reactor 210. Additionally, FIG. 50, FIG. 51, and FIG. 52 show close-up cross-section views of a portion of multi-zone heater 114 and showing more details of reactor 210 and drag conveyor 212. Further, FIG. 53 shows an isometric view and FIG. 54 shows a side view and a top down view of reactor 210 absent multi-zone heater 114. Similarly, FIG. 55 and FIG. 56 show cross-sectional views of reactor 210 and drag conveyor 212 absent multi-zone heater 114.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the invention.

That which is claimed:

1. A system for converting energy comprising:
   a controller;
   a reactor having inner walls operated by the controller;
   a drag conveyor in the reactor, the drag conveyor including a multi-pass drag chain adapted to allow a feedstock material to advance in opposing directions on the same drag chain; and
   a multi-zone heater surrounding the reactor and the drag conveyor.

2. The system of claim 1, further comprising an airlock having a steric acid high-temperature fluid bath forming a closed loop with the reactor.

3. The system of claim 2, wherein the closed loop further comprises a multi-zone quench station having a quench oil filter and an oil preheated stage.

4. The system of claim 3, wherein the closed loop further comprises an atmospheric fractioning unit.

5. The system of claim 4, wherein the atmospheric fractioning unit comprises a heavy oil fractioning process, a re-boiler, a diesel storage, and an asphalt storage, wherein the multi-zone quench station includes a supply of diluting oil.

6. A method for converting energy, comprising the steps of:
   providing an energy conversion system according to claim 1;
   supplying feedstock material to the energy-conversion system;
   processing the feedstock material;
   supplying the processed feedstock material to the inlet of the reactor;
   advancing the processed feedstock through the reactor while the reactor facilitates a phase-change process of the feedstock from solid to liquid to vapor;
   maintaining through the heater accurate and consistent temperature within reactor;
   maintaining a positive pressure in the energy-conversion system;
   discharging from reactor outlets char and vapor obtained from the reacted feedstock;
   removing particulates from the discharged vapor;
   quenching the discharged vapor to prevent tar, grease, and/or wax build-ups;
   after the quenching step, transitioning from the positive pressure to a negative pressure in the energy-conversion system; and
   supplying the quenched vapor to a vacuum buffer tank.

7. The method of claim 6, further comprising the steps of:
   advancing the supplied vapor to a regulator;
   removing liquid from the advanced vapor;
   cooling the advanced vapor; and
   performing a filter-less quenching gas clean-up operation on the advanced vapor; and
   forming and discharging syngas.

8. The method of claim 6, further comprising the step of advancing the reacted feedstock to a quench station.

9. The method of claim 8, further comprising the step of advancing the quenched feedstock to an atmospheric fractioning unit.

10. The method of claim 6, further comprising the steps of advancing the reacted feedstock to an automated plunging system.

* * * * *